US012608662B2

(12) United States Patent
Babu

(10) Patent No.: US 12,608,662 B2
(45) Date of Patent: Apr. 21, 2026

(54) INTELLIGENT VIRTUALIZATION OF MERCHANTS

(71) Applicant: Block, Inc., Oakland, CA (US)

(72) Inventor: Ramya Babu, Millbrae, CA (US)

(73) Assignee: Block, Inc., Oakland, CA (US)

( * ) Notice: Subject to any disclaimer, the term of this patent is extended or adjusted under 35 U.S.C. 154(b) by 0 days.

(21) Appl. No.: 18/393,546

(22) Filed: Dec. 21, 2023

(65) Prior Publication Data

US 2024/0193502 A1     Jun. 13, 2024

Related U.S. Application Data

(63) Continuation of application No. 17/727,219, filed on Apr. 22, 2022, now abandoned, which is a continuation of application No. 16/893,056, filed on Jun. 4, 2020, now Pat. No. 11,334,821.

(51) Int. Cl.
| | |
|---|---|
| *G06Q 10/00* | (2023.01) |
| *G06F 16/00* | (2019.01) |
| *G06F 16/955* | (2019.01) |
| *G06Q 10/02* | (2012.01) |
| *G06Q 10/0631* | (2023.01) |

(52) U.S. Cl.
CPC ..... *G06Q 10/06311* (2013.01); *G06F 16/955* (2019.01); *G06Q 10/02* (2013.01); *G06Q 10/06314* (2013.01)

(58) Field of Classification Search
None
See application file for complete search history.

(56) References Cited

U.S. PATENT DOCUMENTS

| | | | |
|---|---|---|---|
| 11,334,821 B1 | 5/2022 | Babu et al. | |
| 2010/0269055 A1* | 10/2010 | Daikeler ............ | A63B 71/0622 |
| | | | 715/757 |

(Continued)

OTHER PUBLICATIONS

Sterling R, LeRouge C. On-Demand Telemedicine as a Disruptive Health Technology: Qualitative Study Exploring Emerging Business Models and Strategies Among Early Adopter Organizations in the United States J Med Internet Res 2019;21(11):e14304 (Year: 2019).*

(Continued)

*Primary Examiner* — Matheus Ribeiro Stivaletti
(74) *Attorney, Agent, or Firm* — Lee & Hayes, P.C.

(57) ABSTRACT

Systems and methods that, in an example, include receiving, by servers of a service provider, interaction data indicative of interactions between merchants and the service provider via a network; accessing, from a data store associated with the system, inventory data of a merchant; determining, based at least in part on the interaction data and the inventory data, that the merchant is a candidate for conversion between different types of appointments, wherein the different types of appointments comprise in-person and virtual; identifying one or more appointments associated with the merchant; determining that an appointment of the one or more appointments is a first type of appointment, wherein the first type is one of in-person or virtual; and converting the appointment to a second type of appointment, wherein the second type is a different one of in-person or virtual than the first type.

20 Claims, 13 Drawing Sheets

(56) References Cited

U.S. PATENT DOCUMENTS

| | | | |
|---|---|---|---|
| 2011/0224999 A1* | 9/2011 | Baccarella-Garcia | ....................... H04N 21/2187 705/2 |
| 2014/0128040 A1 | 5/2014 | Guglielmo et al. | |
| 2015/0287084 A1 | 10/2015 | Gura et al. | |
| 2017/0329922 A1 | 11/2017 | Eberting et al. | |
| 2018/0012255 A1 | 1/2018 | Tulk | |
| 2018/0336606 A1* | 11/2018 | Ellis | ....................... G06Q 40/00 |
| 2019/0143194 A1 | 5/2019 | Evancha et al. | |
| 2021/0174945 A1* | 6/2021 | Cooper | .................. G16H 10/60 |
| 2021/0319914 A1 | 10/2021 | Roh | |
| 2021/0326939 A1 | 10/2021 | Navar | |
| 2021/0342952 A1 | 11/2021 | Putnam et al. | |
| 2022/0101240 A1 | 3/2022 | Kassam et al. | |
| 2022/0366335 A1 | 11/2022 | Babu | |

OTHER PUBLICATIONS

Sterling et al., "On-Demand Telemedicine as a Disruptive Health Technology: Qualitative Study Exploring Emerging Business Models and Strategies Among Early Adopter Organizations in the United States", published on Nov. 15, 2019, vol. 21, No. 11, 25 pages.

* cited by examiner

106

108 —

108 —

1200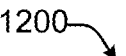

```
┌─────────────────────────────────────────┐
│   ACCESS DATA ASSOCIATED WITH MERCHANT(S) │
│                  1202                     │
└─────────────────────────────────────────┘
```

IS A MERCHANT A CANDIDATE FOR
VIRTUALIZATION?
1204

NO

YES

```
┌─────────────────────────┐
│  SEND A RECOMMENDATION TO │
│  A MERCHANT DEVICE OF THE │
│         MERCHANT          │
│           1208            │
└─────────────────────────┘
```

```
┌──────────────────┐
│ DO NOT SEND THE  │
│  RECOMMENDATION  │
│       1206       │
└──────────────────┘
```

IS A
REQUEST TO VIRTUALIZE
RECEIVED?
1210

YES

NO

```
┌─────────────────────────────┐
│  VIRTUALIZE THE MERCHANT     │
│  AND/OR ITEM(S) ASSOCIATED   │
│   WITH THE MERCHANT          │
│           1212               │
└─────────────────────────────┘
```

```
┌─────────────────────────────┐
│  DO NOT VIRTUALIZE THE       │
│  MERCHANT AND/OR ITEM(S)     │
│   ASSOCIATED WITH THE        │
│        MERCHANT              │
│           1214               │
└─────────────────────────────┘
```

FIG. 12

1300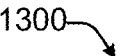
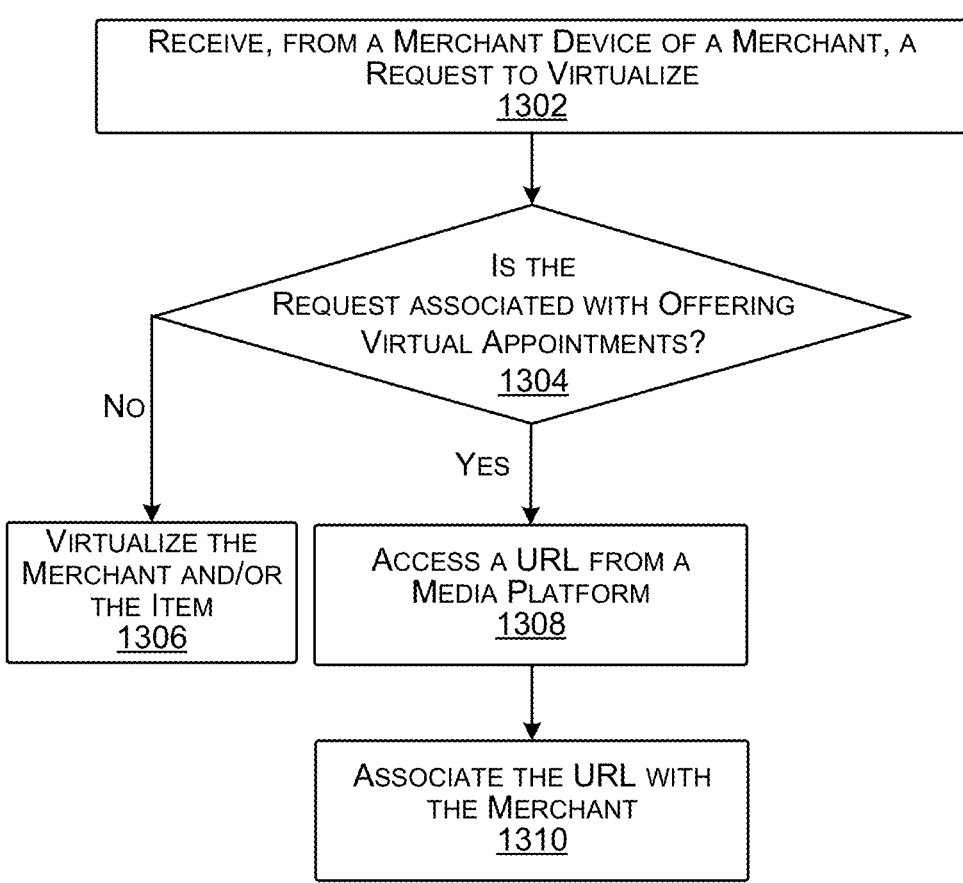
RECEIVE, FROM A MERCHANT DEVICE OF A MERCHANT, A REQUEST TO VIRTUALIZE
1302
IS THE REQUEST ASSOCIATED WITH OFFERING VIRTUAL APPOINTMENTS?
1304
NO
YES
VIRTUALIZE THE MERCHANT AND/OR THE ITEM
1306
ACCESS A URL FROM A MEDIA PLATFORM
1308
ASSOCIATE THE URL WITH THE MERCHANT
1310
FIG. 13

1400

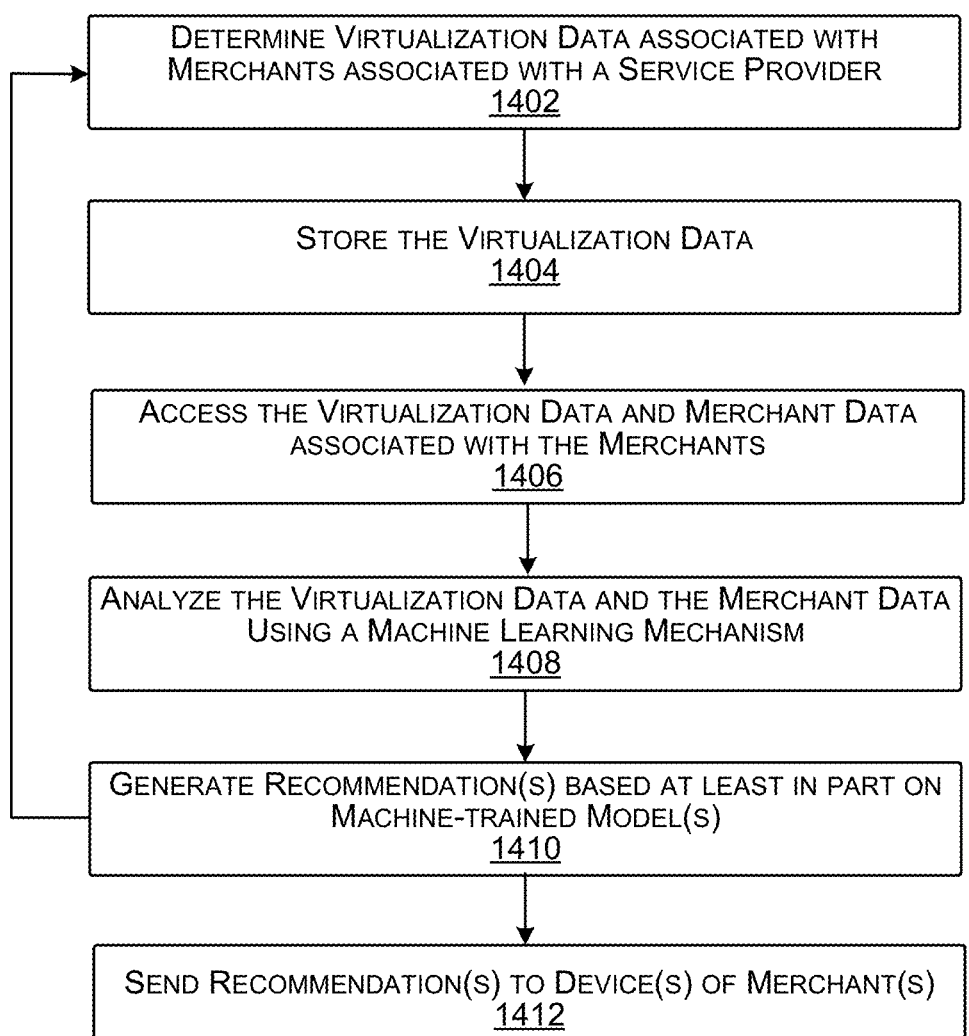

DETERMINE VIRTUALIZATION DATA ASSOCIATED WITH
MERCHANTS ASSOCIATED WITH A SERVICE PROVIDER
1402

STORE THE VIRTUALIZATION DATA
1404

ACCESS THE VIRTUALIZATION DATA AND MERCHANT DATA
ASSOCIATED WITH THE MERCHANTS
1406

ANALYZE THE VIRTUALIZATION DATA AND THE MERCHANT DATA
USING A MACHINE LEARNING MECHANISM
1408

GENERATE RECOMMENDATION(S) BASED AT LEAST IN PART ON
MACHINE-TRAINED MODEL(S)
1410

SEND RECOMMENDATION(S) TO DEVICE(S) OF MERCHANT(S)
1412

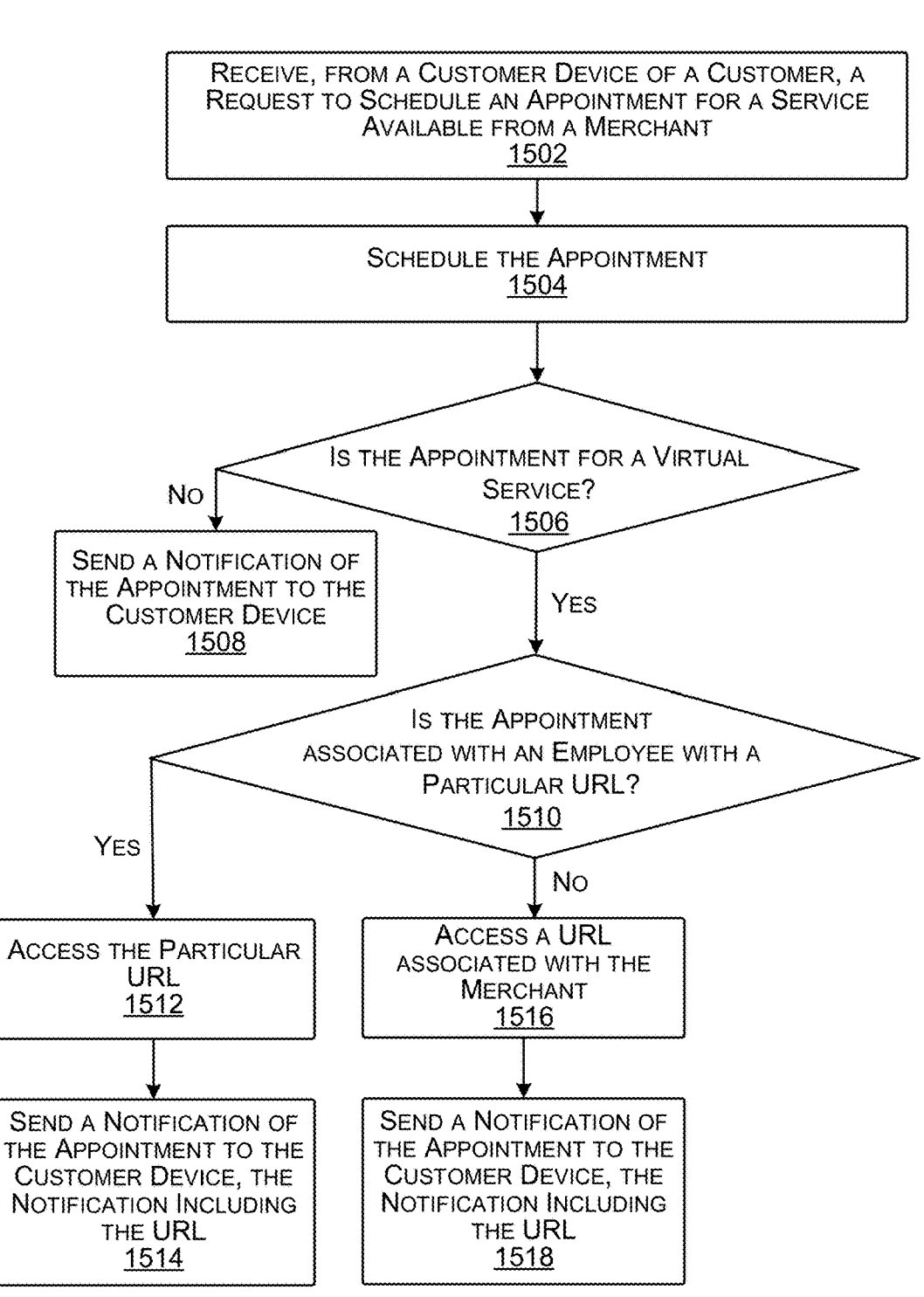

RECEIVE, FROM A CUSTOMER DEVICE OF A CUSTOMER, A REQUEST TO SCHEDULE AN APPOINTMENT FOR A SERVICE AVAILABLE FROM A MERCHANT
1502

SCHEDULE THE APPOINTMENT
1504

IS THE APPOINTMENT FOR A VIRTUAL SERVICE?
1506

No

SEND A NOTIFICATION OF THE APPOINTMENT TO THE CUSTOMER DEVICE
1508

YES

IS THE APPOINTMENT ASSOCIATED WITH AN EMPLOYEE WITH A PARTICULAR URL?
1510

YES

No

ACCESS THE PARTICULAR URL
1512

ACCESS A URL ASSOCIATED WITH THE MERCHANT
1516

SEND A NOTIFICATION OF THE APPOINTMENT TO THE CUSTOMER DEVICE, THE NOTIFICATION INCLUDING THE URL
1514

SEND A NOTIFICATION OF THE APPOINTMENT TO THE CUSTOMER DEVICE, THE NOTIFICATION INCLUDING THE URL
1518

FIG. 15

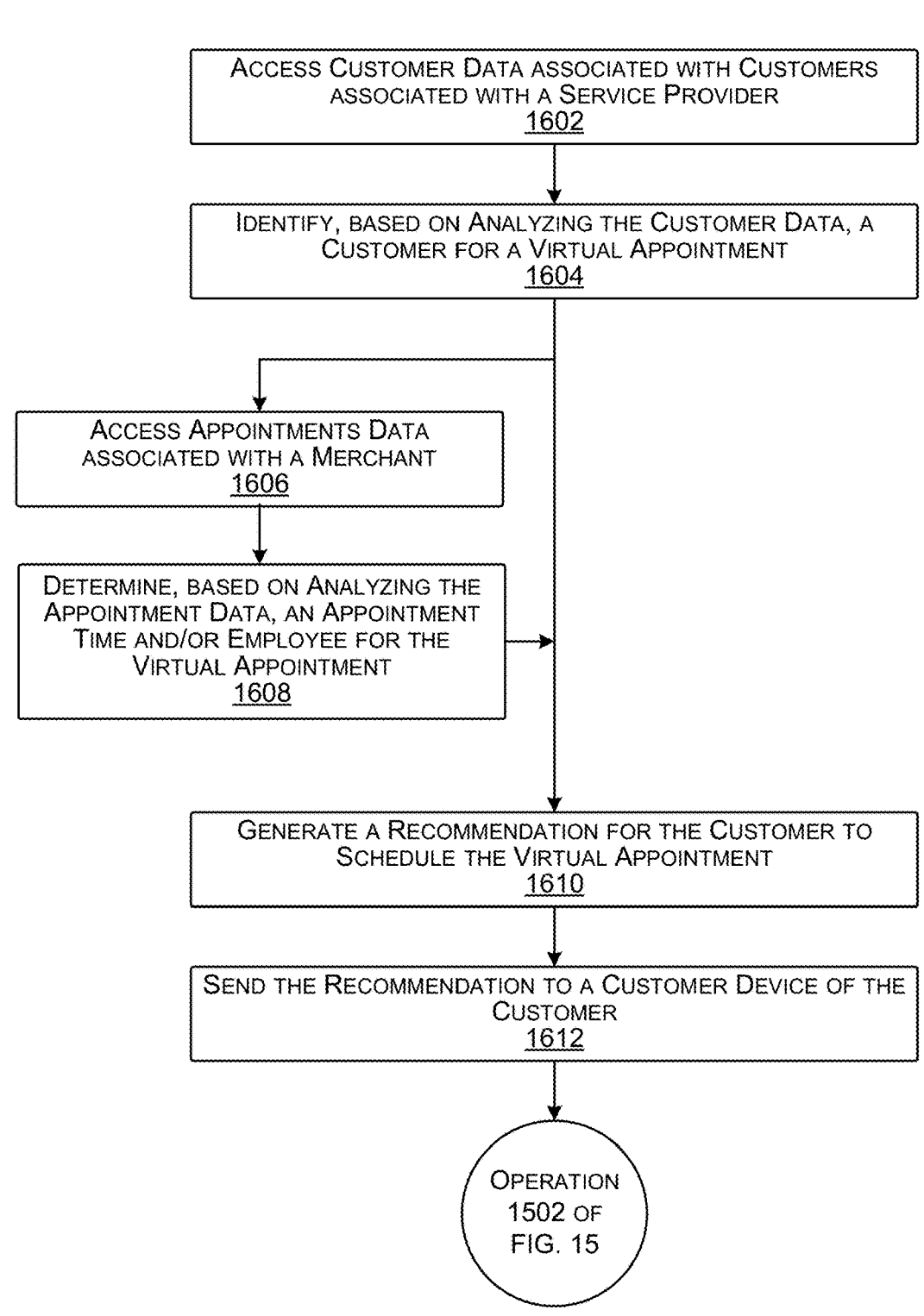

1600

ACCESS CUSTOMER DATA ASSOCIATED WITH CUSTOMERS ASSOCIATED WITH A SERVICE PROVIDER
1602

IDENTIFY, BASED ON ANALYZING THE CUSTOMER DATA, A CUSTOMER FOR A VIRTUAL APPOINTMENT
1604

ACCESS APPOINTMENTS DATA ASSOCIATED WITH A MERCHANT
1606

DETERMINE, BASED ON ANALYZING THE APPOINTMENT DATA, AN APPOINTMENT TIME AND/OR EMPLOYEE FOR THE VIRTUAL APPOINTMENT
1608

GENERATE A RECOMMENDATION FOR THE CUSTOMER TO SCHEDULE THE VIRTUAL APPOINTMENT
1610

SEND THE RECOMMENDATION TO A CUSTOMER DEVICE OF THE CUSTOMER
1612

OPERATION 1502 OF FIG. 15

FIG. 16

INTELLIGENT VIRTUALIZATION OF MERCHANTS

PRIORITY

This application is a continuation of, and claims priority to U.S. patent application Ser. No. 17/727,219, filed on Apr. 22, 2022, which is a continuation of U.S. patent application Ser. No. 16/893,056, filed on Jun. 4, 2020, and issued as U.S. Pat. No. 11,334,821 on May 17, 2022, which are fully incorporated by reference herein.

TECHNICAL FIELD

Merchants often offer items for sale via brick-and-mortar or virtual stores, both which can require merchants and/or their employees to be physically present in the brick-and-mortar store, fulfillment center, inventory storage facility, or the like. There are times when a merchant is required to shut down their in-person business operations, for example, due to state and local orders, health concerns, or the like. For many merchants, this can completely halt all business operations, which can be catastrophic to many small business owners. Technology is available to offer additional or alternative business opportunities, which can provide some reprieve or relief when in-person business operations are restricted and/or provide an additional commerce channel that can be leveraged by merchants to increase revenue and sales.

BRIEF DESCRIPTION OF THE DRAWINGS

Features of the present disclosure, its nature and various advantages, will be more apparent upon consideration of the following detailed description, taken in conjunction with the accompanying drawings.

FIG. 12 illustrates an example process for virtualizing a merchant and/or item(s) associated with the merchant, as described herein.

FIG. 13 illustrates an example process for associating a uniform resource locator (URL) with a merchant and/or an item, as described herein.

FIG. 14 illustrates an example process for generating recommendations, as described herein.

FIG. 15 illustrates an example process for scheduling a virtual appointment, as described herein.

FIG. 16 illustrates an example process for identifying a customer for an appointment and/or generating a recommendation for the customer to schedule the appointment, as described herein.

In the figures, the left-most digit(s) of a reference number identifies the figure in which the reference number first appears. The use of the same reference numbers in different figures indicates similar or identical items or features. The drawings are not to scale.

DETAILED DESCRIPTION

Figure 1:
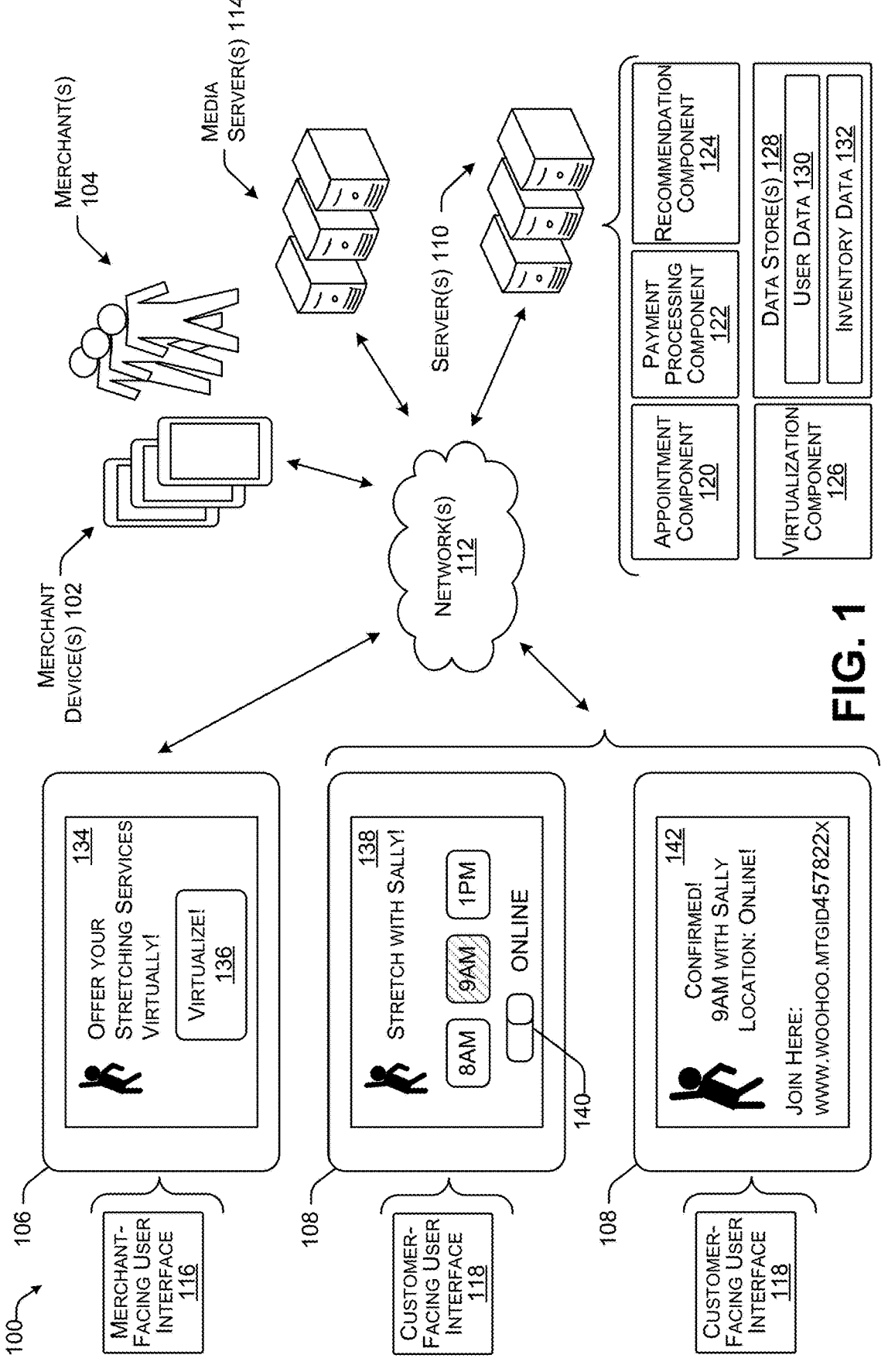
FIG. 1 illustrates an example environment for performing techniques described herein.

Techniques described herein are directed to intelligent virtualization of merchants and/or items (e.g., goods or services) offered for sale by such merchants. In at least one example, techniques described herein enable merchants to virtualize items and, accordingly, make them available on multiple acquisition channels. For example, virtualization of goods and services allows customers to book appointments and conduct such appointments over a video call facilitated by a media platform (e.g., a video conferencing platform), in addition to or instead of an in-person appointment. In additional or alternative examples, techniques described herein enable merchants to otherwise virtualize their items, for example by identifying opportunities to bundle items for do-it-yourself kits or other projects that can be accompanied with instructions, offer workshops, or otherwise provide goods or services to customers via reduced or no-contact. As such, when merchants are required to shut down their in-person business operations, for example, due to state and local orders, health concerns, or the like, merchants no longer need to cease all business operations, and instead can leverage technology to provide items to customers via virtualization techniques described herein. Such techniques can therefore provide some reprieve or relief when in-person business operations are restricted and/or provide an additional commerce channel that can be leveraged by merchants to increase revenue and sales (e.g., even when in-person business operations are not restricted).

Techniques described herein can leverage a distributed, network-based merchant ecosystem that comprises merchant devices, customer devices, and server computing devices, which can be associated with a service provider. In at least one example, the merchant devices and/or customer devices can have an application installed thereon, which can be provided by the service provider, thereby specially configuring the merchant devices and/or customer devices to exchange communications with the server computing devices over a network. In some examples, the merchant devices and/or customer devices can access services of the service provider via a web browser or other functional component that presents user interfaces as described herein. Data from merchant devices and/or customer devices can also help identify behavioral patterns within a specific ecosystem, or with respect to specific customer or merchant type, such that recommendations can be offered to a new merchant or a new customer on the platform using the behavioral patterns from historical data or through machine learning. Additional details are provided below.

In at least one example, the service provider can offer one or more services, which can include a payment processing service, an appointments service, an employee management service, and/or the like. In some examples, the service provider can leverage data generated from use of individual services to intelligently identify opportunities for merchants to virtualize their goods and/or services. That is, in some examples, the service provider can analyze data generated from the use of individual services offered by the service provider using machine-trained models. The machine-trained models can intelligently identify items that are candidates for virtualization and/or merchants that are candidates for virtualization. In some examples, the machine-trained models can determine pricing for virtualized items, timing associated with providing virtualized items (e.g., length of virtual appointment, when to offer a workshop, etc.), platforms for providing virtualized items, or the like. As such, the service provider can generate recommendations for recommending that a merchant virtualize one or more items, pricing for such virtualized items, timing associated with offering virtualized items, platforms for virtualizing items, and the like. Thus, techniques described herein are directed to intelligently generating recommendations based on data generated from use of individual services availed via the service provider to identify opportunities for merchants to virtualize their goods and/or services via a customized and/or personalized process.

In some examples, the distributed, network-based system is capable of applying the intelligence derived from an existing merchant to a new merchant, thereby making virtualization recommendations as described herein (e.g., via onboarding) for the new merchant personalized even though the new merchant is new to the service provider. Further, in some examples, the distributed, network-based system is capable of applying the intelligence derived from an existing merchant to another, different merchant that uses services of the service provider, thereby making virtualization recommendations using data that is not conventionally available and/or used for making virtualization recommendations. That is, as described herein, artificial intelligence, machine learning, and the like can be used to dynamically make determinations, recommendations, and the like, thereby adding intelligence and context-awareness to an otherwise one-size-fits-all scheme for virtualizing items and/or additional or alternative services described herein. This, therefore, offers an improvement to existing technological processes.

As described above, for the purpose of this discussion. "virtualization" can refer to offering and/or providing an item via a media platform (e.g., a video conferencing platform, etc.), identifying and/or providing opportunities for merchants to bundle items for do-it-yourself kits or other projects that can be accompanied with instructions, offering and/or providing workshops, or otherwise identifying and/or offering goods or services to customers via reduced or no-contact. Moreover. "virtualization" can also refer to conversion from in-person channels to online channels and vice versa, according to a predefined condition. For example, availability of an item can switch from one channel to another based on time of day, customer preference, and/or merchant preference. The conversion can be automatic and without merchant or customer intervention, for example the conversion can also be triggered based on what other, similar merchants are currently doing. Based at least in part on a merchant providing an indication to virtualize their business, a location of their business, an item, or the like, the service provider can effectuate such virtualization. That is, the service provider can receive an input indicating that a merchant desires to virtualize an item and the service provider can provide end-to-end service to streamline such virtualization. As such, techniques described herein reduce friction traditionally associated with virtualization and can provide a better user experience for users (e.g., merchants and customers alike).

As an example, a merchant can request to virtualize an item by offering the item via a video call on a video conferencing platform. For instance, a yoga studio can offer yoga classes in a virtual format, a counselor can offer counseling in a virtual format, a chef can offer a cooking class in a virtual format, a teacher can offer tutoring in a virtual format, a retailer can offer personal shopping in a virtual format, etc. If a merchant requests to virtualize an item by creating an virtual option for receiving a service (e.g., via a video call on a video conferencing platform), the service provider can obtain a URL for the merchant to provide the service via a video call, associate the URL with an indication of the merchant and/or the service, and integrate the URL into an appointment booking process so that when an appointment for the service is booked (e.g., using the appointment service of the service provider), the URL can be provided to the merchant and the customer. As such, when it is time for the customer to receive the service, the merchant and customer can actuate the URL to set up a video call, which can be hosted by a video conferencing platform or other media platform. The merchant can then provide the services via a video call. In some examples, the service provider can add interactive components to provide uni-directional or bi-directional interactivity between the merchant and the customer. In at least one example, the customer can purchase items virtually and/or provide payment for the service which can be processed by the payment processing service of the service provider. That is, techniques described herein enable streamlined integration of video conferencing technology into appointment scheduling, and payment processing, leveraging the distributed, network-based system described herein.

As another example, a merchant can request to virtualize an item by bundling the item with other items and offering the items as a do-it-yourself kit or project. For example, a merchant can bundle beads, wire, and fasteners to enable a customer to create a necklace, a merchant can bundle flowers to enable a customer to assemble their own bouquet, a merchant can bundle food items to enable a customer to prepare a meal, etc. In such an example, the service provider can generate a recommendation with respect to the bundled items (e.g., which can be based on an inventory that can be managed by inventory services of the service provider). In some examples, the service provider can automatically generate instructions for assembling the bundled items (e.g., the do-it-yourself instructions). In at least one example, the service provider can integrate the bundled items into selling channels (e.g., website, social media site, etc.), facilitate orders and shipping and/or pick-up, and process payment for the transaction using payment processing services.

As yet another example, a merchant can request to virtualize an item by offering a workshop associated with an item. In some examples, the service provider can generate a recommendation with respect to the item and/or workshop (e.g., which can be based on an inventory that can be managed by inventory services of the service provider, transaction data, appointment data, and/or the like). In additional or alternative examples, the service provider can determine when to recommend a workshop for using an item and/or a time for offering the workshop-in-person or virtually. In at least one example, the service provider can integrate workshops (e.g., offers for registering therefor) into selling channels (e.g., website, social media site, etc.), facilitate registration (e.g., using an appointments service), and process payment for the workshop using payment processing services.

As described above, techniques described herein can leverage the distributed, network-based system to offer end-to-end virtualization of items. Such end-to-end service is available due to the distributed, network-based system and components associated therewith that are specially configured for performing operations described herein. As such, techniques described herein offer improvements to existing technologies at least by leveraging unconventional network configurations and specially configured components.

Moreover, as described above, the techniques described herein enable creation of custom resource identifiers (e.g., such as URLs) to allow customers to interact with one merchant or several other merchants in the distributed, network-based system. Alternatively or additionally, techniques described herein enable a merchant to engage with several customers via a single URL, such that each customer session is a private session from the perspective of the customer. The customization of URLs also allows the customer to engage in bi-directional communication with the merchant (e.g., to facilitate on-the-fly discussion about an item) and/or initiate a private payment session to allow the merchant and customer to buy or sell items while the service is being offered virtually.

In some examples, techniques described herein enable automatic conversion of an existing in-person appointment to a virtual appointment and vice versa, for example, according to a predefined condition. For instance, as described above, availability of an item (e.g., whether the item is available virtually or in-person) can switch from one channel of acquisition (e.g., in-person or virtual) to another (e.g., virtual or in-person, respectively) based on time of day, customer preference, and/or merchant preference. The conversion can be automatic and without merchant or customer intervention, for example the conversion can also be triggered based on what other, similar merchants are currently doing. The techniques also allow a merchant to automatically convert multiple existing in-person appointments into virtual appointments and vice versa based at least in part on time of day, customer preference, and/or merchant preference. In some examples, such a conversion can be automatic, as described above. This automatic conversion can reduce interaction between merchants and/or customers when needing to convert a large number of in-person appointments to virtual appointments or vice versa, quickly. That is, instead of opening an appointment, modifying the appointment from a first channel to a second channel, saving the appointment, and the like, such techniques enable such a conversion via a single interaction or, in some examples, without any intervention of the merchant or customer. As such, techniques described herein offer improvements to existing appointments technology.

As described above, data from merchant devices and customer devices also helps identify behavioral patterns within the distributed, network-based system, or with respect to specific customer or merchant type, such that recommendations can be offered to a new merchant or a new customer on the platform using the behavioral patterns from historical data or through machine learning. That is, in some examples, the distributed, network-based system is capable of applying the intelligence derived from an existing merchant to a new merchant, thereby making virtualization recommendations as described herein (e.g., via onboarding) for the new merchant personalized even though the new merchant is new to the service provider. Further, in some examples, the distributed, network-based system is capable of applying the intelligence derived from an existing merchant to another, different merchant that uses services of the service provider, thereby making virtualization recommendations using data that is not conventionally available and/or used for making virtualization recommendations. That is, as described herein, artificial intelligence, machine learning, and the like can be used to dynamically make determinations, recommendations, and the like, thereby adding intelligence and context-awareness to an otherwise one-size-fits-all scheme for virtualizing items and/or additional or alternative services described herein. This, therefore, offers an improvement to existing technological processes.

FIG. 1 illustrates an example environment 100 for performing techniques described herein. As described above, techniques described herein can leverage a distributed, network-based merchant ecosystem that comprises merchant devices, customer devices, and server computing devices, which can be associated with a service provider. The example environment 100 illustrates such a distributed, network-based merchant ecosystem. For instance, the example environment 100 can include merchant device(s) 102, which can be operable by merchant(s) 104. In FIG. 1, a plurality of merchant devices 102 are illustrated. In at least one example, merchant device 106 can be one of the merchant device(s) 102. Furthermore, the example environment can include one or more customer devices 108. While a single customer device 108 is illustrated, any number of customer devices can be included in the example environment 100. Customer devices can be operable by customers.

In at least one example, the example environment 100 can include one or more server computing devices (e.g., server(s) 110), which can be associated with a service provider and which can communicate with the merchant device(s) 102 and/or 106 and/or the customer device 108 via network(s) 112. In some examples, the server(s) 110, the merchant device(s) 102 and/or 106, and/or the customer device 108 can communicate with media server(s) 114 to facilitate video calls or other virtual communication mechanisms. In some examples, the media server(s) 114 can be associated with a third-party that is separate and distinct from the service provider. In other examples, the media server(s) 114 can be associated with the service provider. While "video conferencing" and "video calls" are described herein, any type of virtual communication mechanism that facilitates a remote communication between two or more user devices can be utilized for providing virtual appointments as described herein.

In at least one example, the merchant device(s) 102 and/or 106 and/or the customer device 108 can have application(s) installed thereon, which can be provided by the service provider, and can specially configure the merchant device(s) 102 and/or 106 and/or the customer device 108 to exchange communications with the server(s) 110 over the network(s)

112. In at least one example, the merchant device 106 can have an instance of an application, which can be a desktop application, a web browser application, or a dedicated application (e.g., provided by a service provider, provided by a third-party, etc.), installed thereon which can specially configure the merchant device 106 to exchange communications with the server(s) 110 over the network(s) 112. In some examples, the application can present a merchant-facing user interface 116 with which a merchant can interact with for, among other things, virtualizing items of the merchant. In at least one example, the customer device 108 can have an instance of an application, which can be a desktop application, a web browser application, or a dedicated application (e.g., provided by a service provider, provided by a third-party, etc.), installed thereon which can specially configure the customer device 108 to exchange communications with the server(s) 110 over the network(s) 112. In some examples, the application can present a customer-facing user interface 118 with which a customer can interact with for, among other things, virtualizing items of the customer. In some examples, a web browser or other functional component can present the user interfaces as described herein. Examples of graphical user interfaces (GUIs) that can be presented via the user interfaces 116 or 118 are described below with reference to FIGS. 2-11.

In at least one example, the server(s) 110 can be associated with one or more functional components. Functional components can comprise instructions or programs that are executable by processor(s) associated with the server(s) 110 to implement operational logic for performing the actions and services attributed above to the server(s) 110. In at least one example, the functional components can include an appointment component 120, a payment processing component 122, a recommendation component 124, and a virtualization component 126. In some examples, the server(s) 110 can include data store(s) 128, which can store user data 130 and inventory data 132 (or "inventory").

In at least one example, the appointment component 120 can facilitate the scheduling of appointments. For example, the appointment component 120 can store and/or manage an electronic calendar of a merchant and can schedule appointments for customers of the merchant. In some examples, the appointment component 120 can receive a request for an appointment with a merchant from the customer device 108 and can determine whether the merchant can accommodate the request (e.g., whether the merchant is available per the electronic calendar and/or other appointment data). In some examples, the request is associated with a particular employee, a date, a time, a location, or the like. In such examples, the appointment component 120 can determine whether the particular employee, date, time, location, or the like is available. Based at least in part on determining that the merchant can accommodate the customer's request, the appointment component 120 can schedule the appointment by adding an indication of such in the electronic calendar of the merchant. In some examples, the appointment component 120 can send an indication of the appointment to the merchant device 106 and/or the customer device 108. In some examples, an appointment can be associated with an in-person appointment. In other examples, an appointment can be associated with a virtual appointment, wherein services are rendered via a video call or other virtual connection mechanism. In such an example, a Uniform Resource Locator (URL) or other connection mechanism can be associated with the notification to enable the merchant and/or customer to access the services associated with the virtual appointment, which can be provided by the media server(s) 114. In some examples, the appointment component 120 can facilitate rescheduling appointments, sending reminders associated with scheduling appointments, and the like.

In at least one example, the payment processing component 122 can receive transaction data, which can include payment data, from the merchant device 106 (and/or other merchant device(s) of the merchant device(s) 102). In some examples, the transaction data can be associated with payments for services rendered (e.g., in-person or virtually), goods purchased, or the like. In some examples, the payment data can be received via a reader device associated with the merchant device 106, as described below, and/or via a payment GUI presented via the merchant-facing user interface 116. In some examples, payment processing functionality can be integrated into media service(s) available via that media server(s) 114 such that a merchant and/or customer can interact with content presented via the media server(s) 114 (e.g., via a widget or other integration) to enable the merchant to charge the customer for an item and/or to collect payment from the customer for an item, which can be before, during, or after a virtual appointment. In at least one example, the payment processing component 122 can transmit requests (e.g., authorization, capture, settlement, etc.) to payment service server computing device(s) to process payments for transactions between the merchant and customer(s). The payment processing component 122 can communicate the successes or failures of payments of such transactions to the merchant device 106. In some examples, the payment processing component 122 can receive transaction data from other payment mechanisms such as virtual payment portals, or the like.

In at least one example, the recommendation component 124 can generate recommendations based at least in part on appointment data received and/or generated by the appointment component 120, transaction data received and/or generated by the payment processing component 122, user data 130 (described below), inventory data 132 (described below), and/or any other data received and/or generated in association with services provided by the service provider. In some examples, the recommendation component 124 can analyze data utilizing machine-trained data models. In at least one example, the recommendation component 124 can identify a merchant and/or item that is a candidate for virtualization. In such an example, the recommendation component 124 can send a recommendation to a merchant device, such as the merchant device 106. Such a recommendation can be presented via the merchant-facing user interface 116. In some examples, the recommendation can be presented via a GUI and can include a control to enable the merchant to virtualize one or more items. A non-limiting example of such a GUI 134, which can present a recommendation as generated by the recommendation component 124, is illustrated in FIG. 1. The GUI 134 includes such a control 136, and in some examples, actuation of the control 136 can send an indication to the virtualization component 126 for the virtualization component 126 to virtualize the one or more items, as described below. The recommendation component 124 can select one item over other items available on the merchant platform to surface for virtualization, e.g., based on popularity, ease of virtualization, etc. In some examples, the recommendation component 124 can generate recommendations associated with pricing for virtualized items, timing associated with providing virtualized items, platforms for providing virtualized items, or the like. In some examples, the recommendation component 124 can generate recommendations associated with customers who are candidates for receiving virtualized items, etc. Additional details associated with generating recommendations are described below with reference to FIG. 14.

In at least one example, the virtualization component 126 can virtualize merchants and/or items for merchants. In at least one example, the virtualization component 126 can virtualize a merchant based at least in part on activating a setting associated with the merchant to indicate that the merchant has virtualized item(s) available. In at least one example, such a setting can be maintained, or otherwise associated with, a merchant profile of the merchant. In some examples, the virtualization component 126 can update user data 130 and/or inventory data 132 to indicate whether a merchant is able to provide virtualized item(s) and/or which item(s) are available as virtualized item(s).

In at least one example, based at least in part on receiving a request to virtualize a merchant and/or items for merchants by offering item(s) via a video conference, the virtualization component 126 can access a URL of a merchant and associate the URL with an indication of the merchant and/or a particular item in the data store(s) 128. In some examples, the merchant can provide credentials associated with a video conferencing platform, or other media platform, to enable the virtualization component 126 to access data associated with the merchant as it pertains to the video conferencing platform. If a merchant is not associated with a video conferencing platform and/or has not provided such credentials, the virtualization component 126 can prompt the merchant to provide such data and/or otherwise create an account with the video conferencing platform. In some examples, where individual employees (or other entities performing services on behalf of a merchant) are associated with individual URLs, the virtualization component 126 can associate such URLs with indications of individual employees.

For the purpose of this discussion, virtualization can be achieved via generation and/or association of a URL with an appointment. In some examples, the URL can enable access to a resource including but not limited to, a website, a landing page, a forum, a video platform, a media platform, a social network platform, a pre-recorded video, an ecommerce page (e.g., to purchase an item prior to an appointment), a live streaming platform, etc.

In some examples, a URL can be unique to the merchant or an employee of the merchant. In some examples, the virtualization component 126 can use the same URL to enable virtual appointments of a merchant and/or employee but redirect to different appointments based on appointments associated with their electronic calendar.

In at least one example, a URL can be unique and customized for a customer so that only that customer can use the URL and, in some examples, the URL can enable bi-directional or uni-directional communication between the customer and the merchant such that the customer can ask questions to the merchant prior to, during, or after the appointment (e.g., "where can I buy yoga mats?"). In some examples, a URL can be associated with a purchase session to facilitate a transaction for an item (e.g., to purchase a yoga mat).

In some examples, a URL can be unique to a specific customer or a set of customers such that the merchant interacts with the set of customers at the same time, but the customers cannot interact with other customers or be privy to the direct communication between the merchant and another customer. This kind of logical separation, via URLs, allows a single communication channel for delivery of information when viewed from merchant's perspective, but multiple communication channels for interaction when viewed from merchant's and customer's perspective. In some examples, the multiple customers can be participating in a virtual appointment at a same time with a same merchant, but such a unique and customized URL can enable one-on-one interactions with the merchant and the customer, even though several customers may be taking the class at the same time.

In some examples, such a URL can be specific to a customer so that the URL can remain the same for each virtual appointment with a merchant (or with any merchant associated with the service provider). In such an example, the customer can use the same URL to access virtual appointments but can be redirected to different appointments based on appointments associated with their electronic calendar. In some examples, the virtualization component 126 can associate different URLs with a customer based on characteristics of the customer. For instance, the virtualization component 126 can change based on a geographical location of the customer. That is, in some examples, there may be geographical limitations to where the URL can be used. As such, based on detecting a change in a geographical limitation of a customer, the virtualization component 126 can generate a different URL for the customer, associate the new URL with an existing appointment, and, in some examples, can notify the customer and/or the merchant regarding the new URL.

While reference herein is made to URLs, any such personal identifier giving access to a resource (e.g., website, landing page, forum, video platform, media platform, social network platform, pre-recorded videos, ecommerce page, live streaming platform, etc.) for a merchant to perform virtual appointments.

In some examples, where virtualization comprises bundling items for selling as a do-it-yourself kit or project, the virtualization component 126 can add indicators to individual items in the inventory data 132 to indicate that such items are associated with a bundle. In some examples, the virtualization component 126 can generate instructions for assembling and/or otherwise using items associated with the bundle. In at least one example, the virtualization component 126 can generate a listing or other content that can be used to advertise and/or sell such bundled items.

In some examples, where virtualization comprises associating an item with a workshop and/or otherwise generating a workshop offering (e.g., that can be offered in-person or virtual), the virtualization component 126 can add indicators to individual items in the inventory data 132 to indicate that such an item is associated with a workshop and/or can add an indication of a workshop to the inventory data 132. In some examples, the virtualization component 126 can generate a listing or other content that can be used to advertise and/or sell such workshops.

As described above, in some examples, the server(s) 110 can include data store(s) 128, which can store user data 130 and inventory data 132 (or "inventory"). In some examples, the data store(s) 128 can be integrated with the other functional components. In some examples, the data store(s) 128 can be remotely located from the server(s) 110 and can be accessible to the server(s) 110.

In at least one example, the user data 130 can be associated with user profiles, which can include, for example, profiles of merchants and customers.

Merchant profiles can store, or otherwise be associated with, data associated with merchants. For instance, a merchant profile can store, or otherwise be associated with, data about a merchant (e.g., name of the merchant, geographic location of the merchant, operating hours of the merchant, employee data, etc.), settings data associated with the merchant (e.g., virtualized, etc.), a merchant category classification (MCC), item(s) offered for sale by the merchant, hardware (e.g., device type) used by the merchant, transaction data associated with the merchant (e.g., transactions conducted by the merchant, payment data associated with the transactions, items associated with the transactions, descriptions of items associated with the transactions, itemized and/or total spends of each of the transactions, parties to the transactions, dates, times, and/or locations associated with the transactions, etc.), loan data associated with the merchant (e.g., previous loans made to the merchant, previous defaults on said loans, etc.), risk data associated with the merchant (e.g., indications of risk, instances of fraud, chargebacks, etc.), appointment data (e.g., previous appointments, upcoming (scheduled) appointments, timing of appointments, lengths of appointments, in-person or virtual appointments, etc.), payroll data (e.g., employees, payroll frequency, payroll amounts, etc.), employee data, permission data (e.g., indications of which operations are associated with permission(s), which employees have said permission(s), etc.), reservations data (e.g., previous reservations, upcoming (scheduled) reservations, interactions associated with such reservations, etc.), inventory data, customer service data, etc. The merchant profile can securely store bank account data as provided by a merchant.

In some examples, if a merchant has virtualized their services, a merchant profile can be associated with one or more URLs which can facilitate virtual appointments (e.g., establish video calls) with customers. In some examples, the merchant can be associated with a single URL. In other examples, the merchant can be associated with multiple URLs. In some examples, individual of the URLs can be associated with individual employees of the merchant, individual items of the merchant, or the like. In some examples, credentials associated with the merchant can be stored in a merchant profile of the merchant, which can be used for facilitating communications with the media server(s) 114, for example, via an application programming interface (API) integration or the like.

Customer profiles can store customer data including, but not limited to, customer data (e.g., name, phone number, address, email address, banking data, etc.), customer preferences (e.g., learned or customer-specified), purchase history data (e.g., identifying one or more items purchased (and respective item data), payment instruments used to purchase one or more items, returns associated with one or more orders, statuses of one or more orders (e.g., preparing, packaging, in transit, delivered, etc.), etc.), appointment data (e.g., previous appointments, upcoming (scheduled) appointments, timing of appointments, lengths of appointments, etc.), payroll data (e.g., employers, payroll frequency, payroll amounts, etc.), reservations data (e.g., previous reservations, upcoming (scheduled) reservations, reservation duration, interactions associated with such reservations, etc.), customer service data, location data (e.g., where the customer is at any point in time, location preferences, etc.), etc.

The inventory data 132 can store the inventory records associated with individual items of inventory available for acquisition from the merchant(s) 104. In at least one example, an inventory record can be associated with item data, an indication of whether the item is available via a virtual appointment, online store, brick-and-mortar store, in a bundle, via a workshop, or the like. In some examples, an inventory record associated with a service can be associated with an employee capable of providing such a service and, if the service is available via a virtual appointment, a URL or other mechanism for facilitating the virtual appointment. In some examples, the URL can be particular to an employee, an item, and/or a merchant.

In at least one example, a customer can interact with the customer device 108 to at least one of schedule an appointment for a virtualized item and/or purchase a virtualized item. In at least one example, the customer-facing user interface 118 can present a GUI that can enable the customer to schedule an appointment for a virtualized service. A non-limiting example of such a GUI. GUI 138, is provided in FIG. 1. In at least one example, the GUI 138 can include one or more user interface elements that enable the customer to specify details of the appointment, such as a service associated with an appointment, a time associated with an appointment, an employee associated with an appointment, or the like. In at least one example, if the merchant and/or the service associated with the appointment is available virtually (e.g., via a video call), the GUI 138 can include a user interface element 140 that enables the customer to indicate whether they want the appointment to be in-person or virtual. If one option or the other is not available, the user interface element 140 can be locked in one position or the other. For instance, if in-person appointments are not available, the user interface element 140 can be locked in the position indicating that the appointment is only available virtually (e.g., via a video call or other virtual platform). That is, in examples where in-person appointments are not available, the customer may not be able to toggle between virtual and in-person options.

In at least one example, when the appointment is scheduled (e.g., by the appointment component 120), the appointment component 120 can send a confirmation of the appointment to the customer device 108. The customer device 108 can present another GUI via the customer-facing user interface 118, which can include the URL to set-up the video call for the appointment and one or more appointment details, such as a time, an employee with whom the appointment is scheduled, a location (e.g., online), or the like. In FIG. 1, a non-limiting example of such a GUI, the GUI 142, is provided. In at least one example, the customer can actuate the link at the time of the appointment to set-up and/or join a video call for receiving a service virtually (e.g., "online").

Additional details associated with the computing devices and/or functional components described herein are described below with reference to FIGS. 17 and 18. Additional examples of GUIs that can be presented using techniques described herein are described below with reference to FIGS. 2-11.

FIGS. 2-11 are diagrams showing example GUIs that can be presented via respective user interfaces, for example the merchant-facing user interface 116 or the customer-facing user interface 118, described above with reference to FIG. 1. The GUIs illustrated in FIGS. 2-11 are non-limiting examples. Additional or alternative data can be presented via GUIs described herein. Further, additional or alternative designs, configurations, or the like can be presented via GUIs described herein. The GUIs are described as including "user interface elements." which for the purpose of this discussion, can include text, graphics, symbols, images, objects, or any other element that can be presented via a GUI. In some examples, a user interface element can be associated with an actuation mechanism such that when a user interacts with the user interface element, the respective user interface can detect an input and present additional data, if applicable. Additional details are described below.

Figure 2:
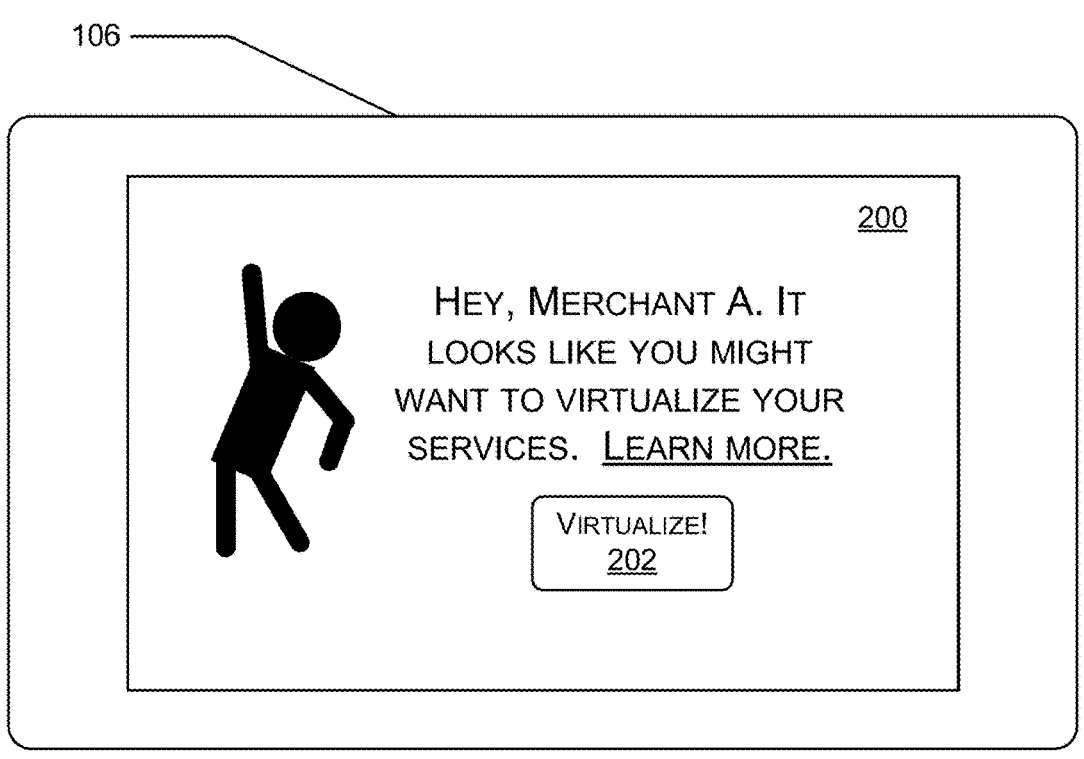
FIG. 2 illustrates an example graphical user interface (GUI) that can be presented by a merchant-facing user interface of a merchant device, as described herein.

FIG. 2 illustrates an example GUI 200 that can be presented via the merchant-facing user interface 116. As described above, in some examples, the recommendation component 124 can generate a recommendation for a merchant to virtualize at least one item. As illustrated in FIG. 2, the recommendation component 124 can send a recommendation to the merchant device 106 and the merchant device 106 can present the recommendation via the merchant-facing user interface 116. In at least one example, the recommendation can suggest the merchant virtualize (e.g., offer their services virtually) and/or can suggest individual items for the merchant to virtualize. In at least one example, the GUI 200 can include a control 202, or other actuation mechanism, that when actuated, can cause the merchant-facing user interface 116 to detect an input and send a request to the virtualization component 126 to virtualize the merchant and/or item(s) associated with the merchant.

In some examples, instead of, or in addition to, receiving a recommendation to virtualize, a merchant can interact with a dashboard—a GUI that aggregates data associated with a merchant and/or services utilized by the merchant—to request to virtualize and/or designate item(s) offered by the merchant to be virtualized. In such an example, a dashboard can include a control, similar to the control 202, that when actuated, can cause the merchant-facing user interface 116 to detect an input and send a request to the virtualization component 126 to virtualize the merchant and/or item(s) associated with the merchant. Furthermore, in some examples, the virtualization component 126 can cause an option (and/or recommendation) to virtualize services during an onboarding flow associated with onboarding a new merchant. In such examples, an onboarding GUI can include a control, similar to the control 202, that when actuated, can cause the merchant-facing user interface 116 to detect an input and send a request to the virtualization component 126 to virtualize the merchant and/or item(s) associated with the merchant.

In at least one example, responsive to receiving a request to virtualize, the virtualization component 126 can associate an indication of virtualization with a merchant profile of the merchant. In at least one example, such an indication can activate a setting, indicating that virtualized items are available, and in some examples, can cause a modification to appointment settings, thereby enabling virtual appointments. As such, when a customer or merchant schedules an appointment, and indicates a virtual appointment, the virtualization component 126 can populate appointment details with a URL and/or provide a mechanism through which a merchant can add a URL to appointment details of an appointment. In some examples, the virtualization component 126 can cause one or more GUIs to be presented to enable the merchant to customize which items to virtualize, select locations for virtualization, assign employees to virtualized services, or the like.

Figure 3:
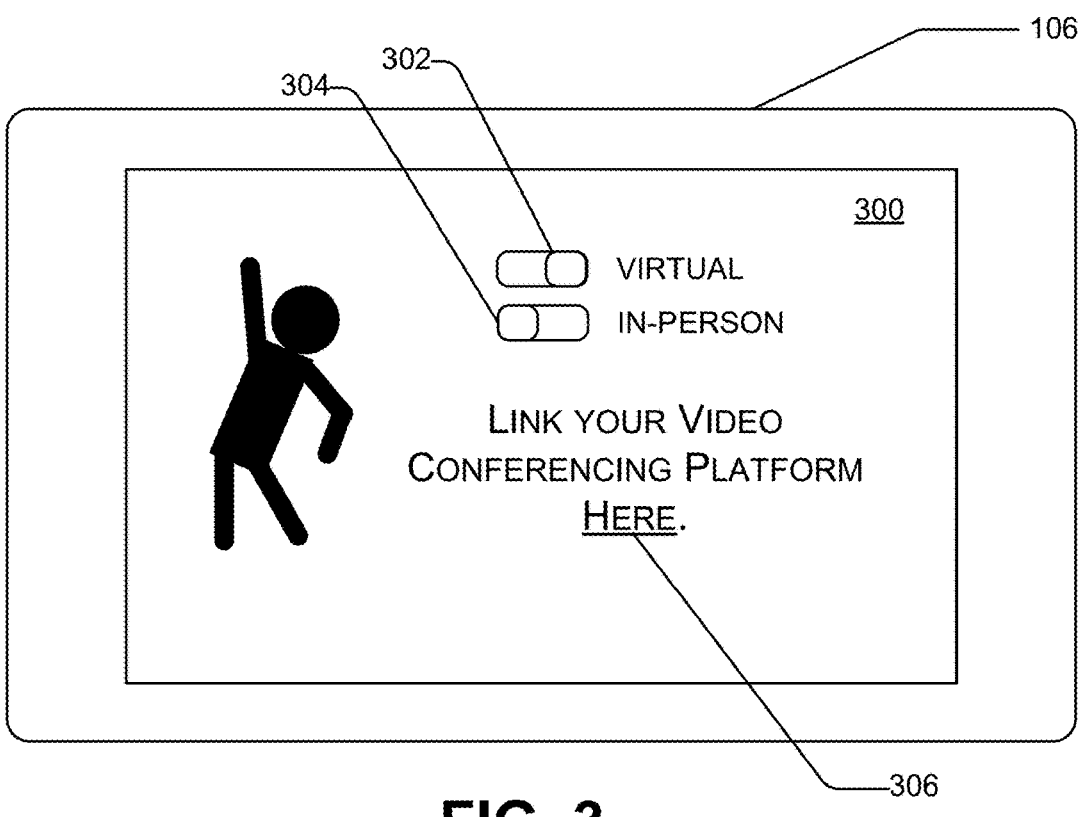
FIG. 3 illustrates another example GUI that can be presented by a merchant-facing user interface of a merchant device, as described herein.

FIG. 3 illustrates an example GUI 300 that can be presented via the merchant-facing user interface 116, which can enable the merchant to virtualize their business (e.g., turn on or off virtual appointments via an interaction with the GUI 300). In at least one example, the merchant-facing user interface 116 can present the GUI 300 to enable the merchant to opt to virtualize their business by toggling on (or off) a user interface element 302. In some examples, by toggling on the user interface element 302, the merchant can enable items to be provided via virtual mechanisms (e.g., virtual appointments). In at least one example, the GUI 300 can include another user interface element 304, which the merchant can toggle on (or off) to indicate whether items are available in-person.

In some examples, based at least in part on the merchant toggling on the user interface element 302 (e.g., activating virtual appointments) and off the user interface element 304 (e.g., prohibiting in-person appointments), such an input can trigger the appointment component 120 to access an electronic calendar of the merchant to find existing appointments and convert individual of the existing in-person appointments to virtual appointments. In some examples, the appointment component 120 can send a notification to the customer device 108 and/or the merchant device 106 to notify the customer and/or the merchant of the change to the channel of delivery (e.g., in-person to virtual) In some examples, the reverse can be true—that is, the appointment component 120 can convert virtual appointments into in-person appointments if the user interface element 302 is toggled off and the user interface element 304 is toggled on. In examples where both options are available, but one option becomes available after an appointment is scheduled, the appointment component 120 can access the electronic calendar and identify appointments that can be converted to the newly available channel (e.g., virtual to in-person or in-person to virtual). In such an example, the appointment component 120 can send a notification to the customer device 108 and/or the merchant device 106 to notify the customer and/or the merchant that a change to the channel of delivery is available.

In at least one example, the GUI 300 can include a mechanism 306 through which the merchant can link to a video conferencing platform, or other media platform. That is, in at least one example, the merchant can actuate the mechanism 306 for providing credentials associated with a video conferencing platform (e.g., which can be provided by the media server(s) 114). In at least one examples, such credentials can be stored in association with a merchant profile in the user data 130, described above. As such, the virtualization component 126 can access the stored credentials to obtain a URL from the video conferencing platform. The URL can be stored in association with the merchant profile or can be provided on demand (e.g., in real time and/or near-real time), for example, when an appointment is scheduled, through an integration with the video conferencing platform.

In some examples, if a merchant does not have an account with a video conferencing platform, the virtualization component 126 can prompt the merchant to set up an account and provide their credentials. As such, the virtualization component 126 can access the stored credentials to obtain a URL from the video conferencing platform. The URL can be stored in association with the merchant profile or can be provided on demand (e.g., in real time and/or near-real time), for example, when an appointment is scheduled, through an integration with the video conferencing platform. In some embodiments, the virtualization may happen through connections to other media platforms, social network platforms, or text support. For example, a customer may prefer a text based bi-directional interactive service with the hair salon for hair maintenance support.

As described above, while reference herein is made to URLs, any such personal identifier giving access to a resource (e.g., website, landing page, forum, video platform, media platform, social network platform, pre-recorded videos, ecommerce page, live streaming platform, etc.) for a merchant to perform virtual appointments. In some examples, the URLs or other identifiers (i.e., "links") are therefore unique to the merchant. In other examples, however. URLs or other identifiers (i.e., "links") can be unique to a specific customer or a set of customers such that the merchant interacts with the set of customers at the same time, but the customers cannot interact with other customers or be privy to the direct communication between the merchant and another customer. This kind of logical separation, via URLs, allows a single communication channel for delivery of information when viewed from merchant's perspective, but multiple communication channels for interaction when viewed from merchant's and customer's perspective.

While FIG. 3 illustrates an example GUI 300 that enables a merchant to indicate whether their business is available via in-person and/or virtually, in some examples, the merchant can indicate whether individual business locations of the merchant are offering items in-person and/or virtually via an additional or alternative GUI. Furthermore, as described herein, the merchant can interact with a GUI to designate individual items as available in-person or virtually. Additional details are described below with respect to FIG. 4.

Figure 4:
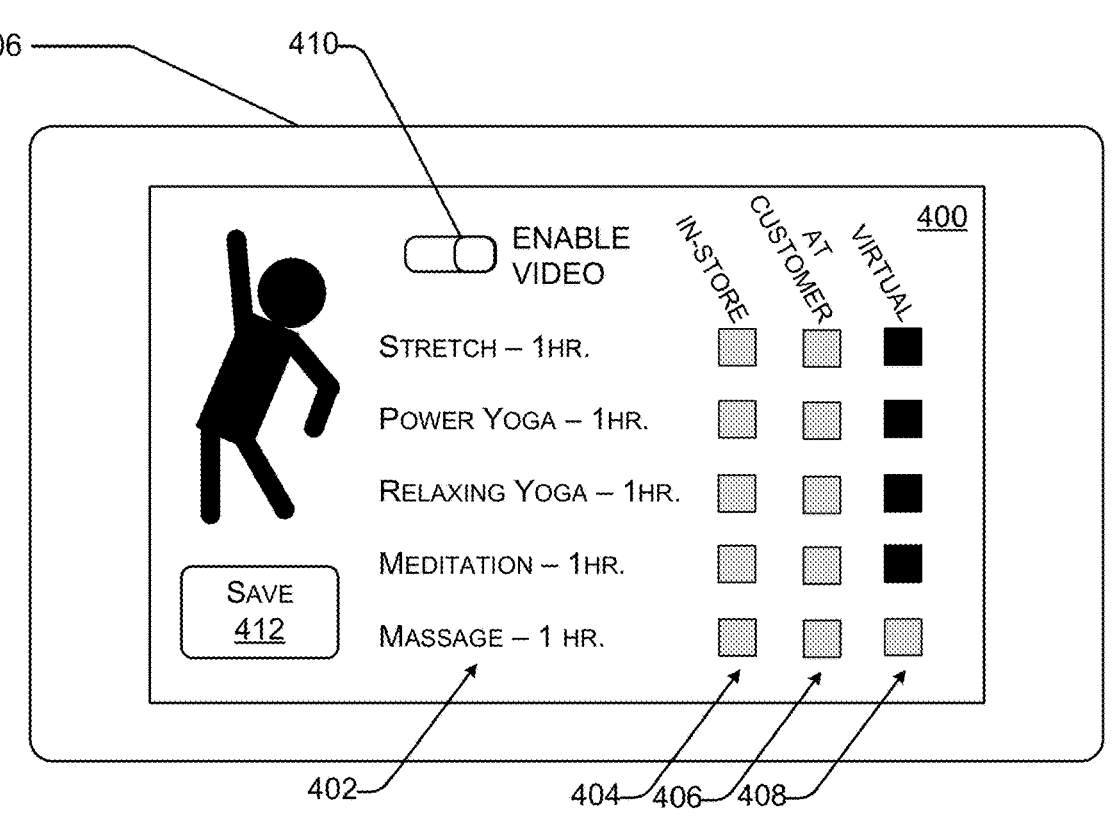
FIG. 4 illustrates yet another example GUI that can be presented by a merchant-facing user interface of a merchant device, as described herein.

FIG. 4 illustrates an example GUI 400 that can be presented via the merchant-facing user interface 116, which can enable the merchant to designate individual items as available virtually (i.e., virtualize such items). In at least one example, the GUI 400 can include user interface elements 402 that represent individual items offered for sale, or other means of acquisition, by the merchant. In some examples, the GUI 400 can include user interface elements that enable the merchant to designate individual items as available in-store (404), available at the customer's location (406), or available virtually (408). In at least one example, if all options (e.g., in-store, at customer, and virtual) are available (which can be determined based at least in part on a setting associated with the merchant, as designated by the merchant and/or the service provider), any of the options may be selectable by the merchant (in which case, the customer can select whether they want the appointment in-person (e.g., at the store or at their own location) or virtually). If an option (e.g., in-store or at customer) is not available for an individual item, individual of the user interface elements 404 or 406 may not be selectable. Further, if the virtual option is not available for an individual item, individual of the user interface elements 408 may not be selectable. As illustrated in FIG. 4, in-person services (e.g., in store or at customer) are not available, as such the user interface elements 404 and 406 are not selectable. Furthermore, massage services are not available virtually. As such, the user interface element associated with the virtual option for massage is also not selectable. However, the remaining user interface elements are selectable and have been selected by the merchant.

In some examples, the GUI 400 can be associated with a user interface element 410 that is toggleable or otherwise selectable to enable the merchant to enable video conferencing—or another media—for items offered for sale by the merchant. By actuating the user interface element 410 to indicate that video conferencing is available, the virtual option can become selectable as well. If the user interface element 410 is not associated with a selection wherein video conferencing being enabled, the user interface elements 408 may not be selectable.

In at least one example, the GUI 400 can include a control 412 or other user interface element that can be actuated to save the selection(s). Based at least in part on detecting that the control 412 has been actuated, the merchant-facing user interface 116 can send an indication of the selection(s) to the virtualization component 126. The virtualization component 126 can associate an indication of a virtual option with an indication of each of the items, for example, in the inventory data 132. In at least one example, a menu of items available for sale by the merchant can include indication(s) that such item(s) are available virtually and, in some examples, when a customer or merchant schedules an appointment, and indicates a virtual appointment (e.g., virtual option), the appointment component 120 can populate appointment details with a URL and/or provide a mechanism through which a merchant can add a URL to appointment details of an appointment.

In some examples, the order in which items are presented, for example in a menu or catalog of items available for sale that can be presented via the merchant-facing user interface 116 and/or the customer-facing user interface 118, can be determined based at least in part on whether a merchant is operating in a virtualized mode (e.g., the merchant profile is associated with a virtualized setting) or not. That is, if the merchant is operating in an in-person mode only (i.e., not offering virtualized items), items that are available in-person can be positioned at a top of a menu or catalog, in a predominate position, bolded or otherwise visually distinguishable from items that are not available in-person. If the merchant is operating in a virtualized mode only (i.e., only offering virtualized items), items that are virtualized can be positioned at a top of a menu or catalog, in a predominate position, bolded or otherwise visually distinguishable from items that are not virtualized. For example, in FIG. 3, the items that are virtualized are presented prior to the item (e.g., massage) that is not virtualized. In some examples where the merchant is operating in both an in-person mode and a virtualized mode, items available in-person can be presented separately from items that are not available in-person and/or are virtualized.

In some examples, the recommendation component 124 can compare inventories of similar merchants to determine which services qualify as capable of being virtualized. In another example, the recommendation component 124 can parse the metadata associated with the item to determine likelihood and ease of virtualization with respect to any item. For example, for items with metadata "yoga." "meditation." "Pilates." "dance" the recommendation component 124 may associate a high virtualization score. However, for items with metadata "massage" or "spin cycling" the recommendation component 124 may associate a low virtualization score. For items with metadata "TRX" or "barre." the recommendation component 124 may associate a "medium virtualization score." to allow the merchants or the customers to arrange for necessary accommodations prior to virtualizations. The virtualization score can be output and compared to a threshold to determine whether an item is a candidate for virtualization. Items having virtualization scores that meet or exceed the threshold can be determined to be candidates for virtualization. Such a "conditional" virtualization may be facilitated by merchants selling certain items, such as stretch bands, yoga mats, etc., prior to initiating such virtualization.

Figure 5:
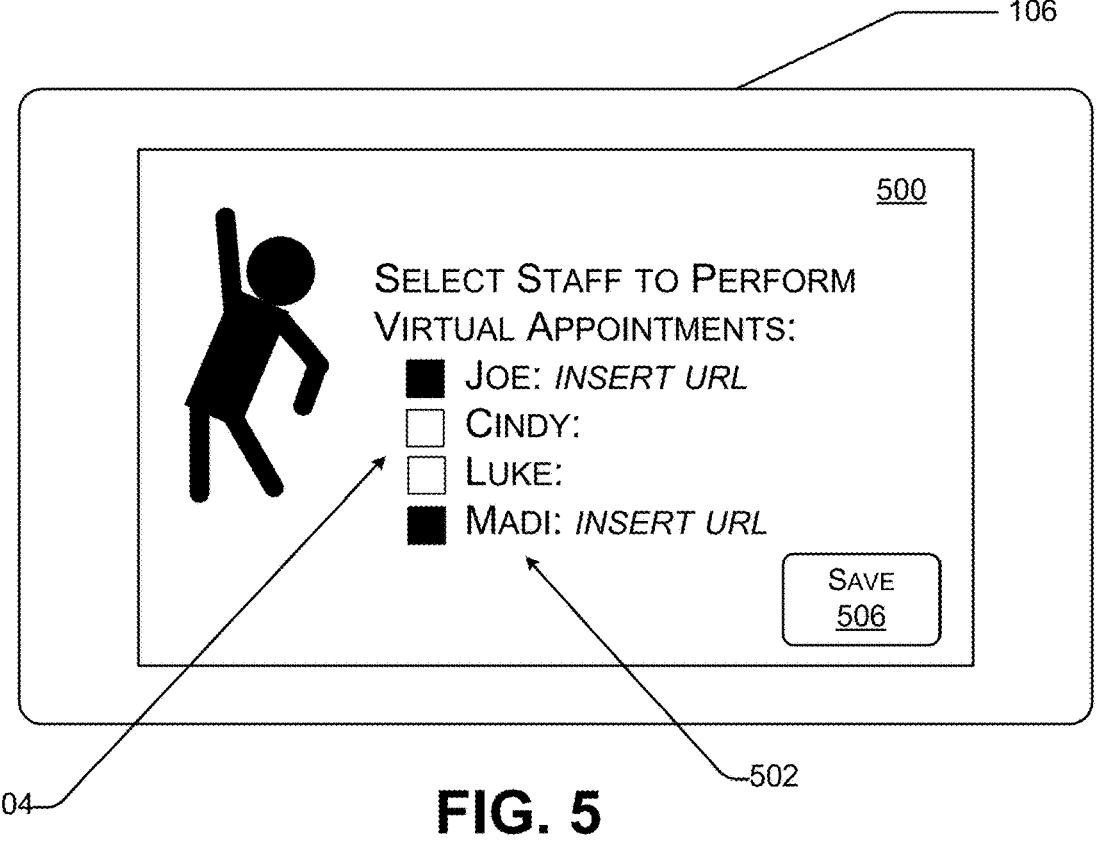
FIG. 5 illustrates an example GUI that can be presented by a merchant-facing user interface of a merchant device, as described herein.

FIG. 5 illustrates an example GUI 500 that can be presented via the merchant-facing user interface 116, which can enable the merchant to designate individual employees who are capable and/or permitted to perform virtual appointments. In at least one example, the GUI 500 can include user interface elements 502 that can represent individual employees (or other entities) that provide services and/or otherwise work for the merchant. In at least one example, the GUI 500 can include user interface elements 504 that are selectable. In at least one example, individual of the user interface elements 504 can correspond to individual of the employees represented by the user interface elements 502. In at least one example, the merchant can select individual of the employees for performing virtual appointments, and in some examples, can associate a unique URL or such identifier (of website, landing page, forum, video platform, media platform, social network platform, pre-recorded videos, ecommerce page, live streaming platform, etc.) for each employee selected for performing virtual appointments. The URLs can also be unique to a specific customer or a set of customers such that the merchant interacts with the set of customers at the same time, but the customers cannot interact with other customers or be privy to the direct communication between the merchant and another customer. This kind of logical separation, via URLs, allows a single communication channel for delivery of information when viewed from merchant's perspective, but multiple communication channels for interaction when viewed from merchant's and customer's perspective.

In at least one example, the GUI 500 can include a control 506 or other user interface element that can be actuated to save the selection(s). Based at least in part on detecting that the control 506 has been actuated, the merchant-facing user interface 116 can send an indication of the selection(s) to the virtualization component 126. The virtualization component 126 can associate an indication that the selected employees are available to perform virtual appointments with an indication of the employee and, in some examples, can associate the employee-specific URL with the indication of the employee. As such, when a customer or merchant schedules an appointment, and indicates a virtual appointment associated with a particular employee who has been selected to provide virtual appointments, the virtualization component 126 can populate appointment details with a URL specific to the employee and/or provide a mechanism through which a merchant can add a URL specific to the employee to appointment details of an appointment.

Figures 6, 7:
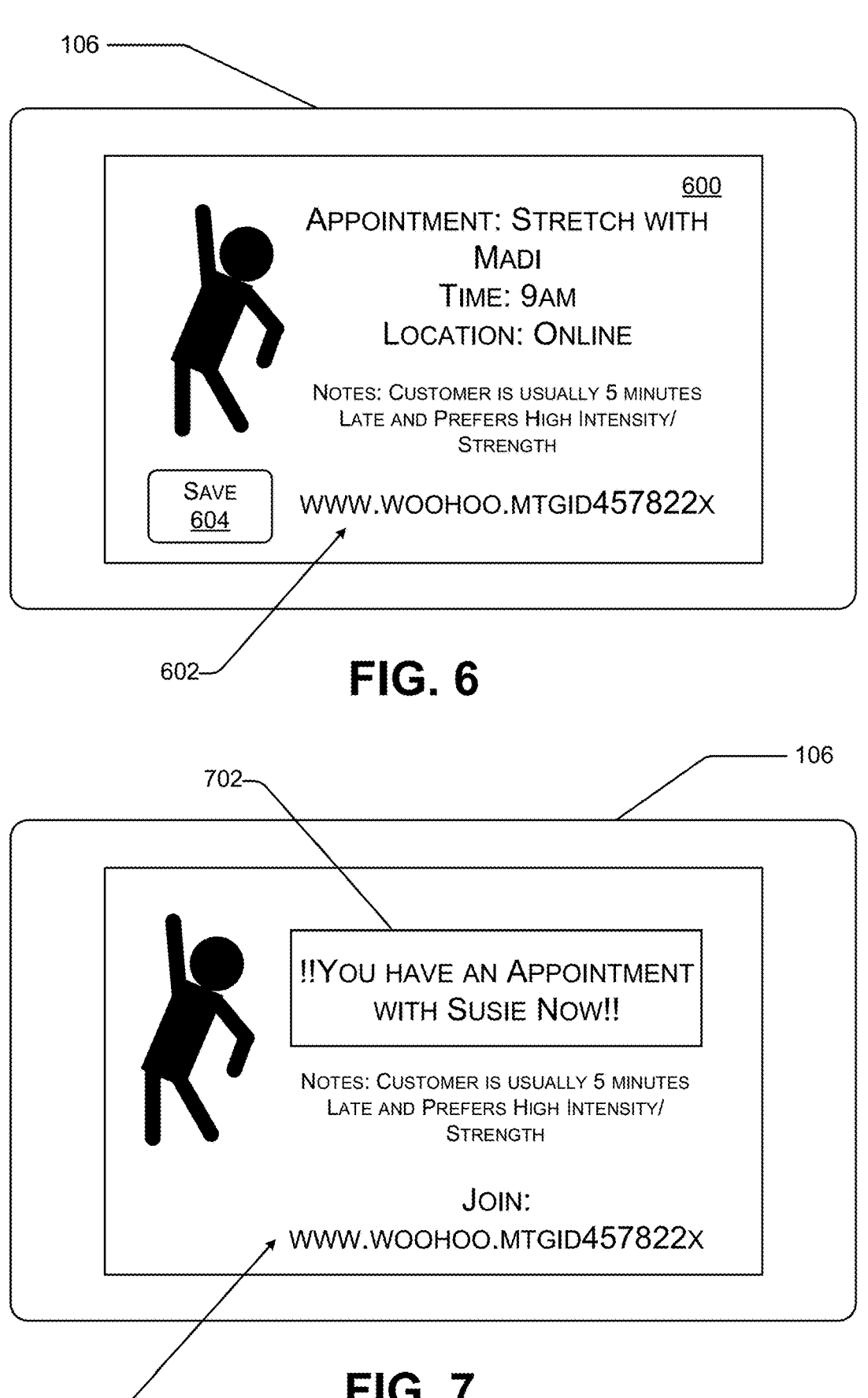
FIG. 6 illustrates another example GUI that can be presented by a merchant-facing user interface of a merchant device, as described herein.
FIG. 7 illustrates yet another example GUI that can be presented by a merchant-facing user interface of a merchant device, as described herein.

FIG. 6 illustrates an example GUI 600 that can be presented via the merchant-facing user interface 116, which can provide appointment details associated with an appointment to be scheduled with the merchant. As described above, in at least one example, when a customer or merchant desires to schedule a virtual appointment, the virtualization component 126 can populate appointment details with a URL and/or provide a mechanism through which a merchant can add a URL to appointment details of an appointment. In at least one example, the GUI 600 can present user interface elements 602 that represent appointment details of an appointment (e.g., service to be rendered, employee rendering the service, time, location, URL, notes from in-person or previous appointments, customer preferences, etc.). In at least one example, if an appointment is a virtual appointment, the merchant can indicate that the location of the appointment is "online." Further, in such an example, the URL associated with the merchant and/or the employee (e.g., Madi) can be associated with the appointment details. In some examples, the URL can be added by the appointment component 120, as described above, or the merchant. In some examples, the appointment component 120 can utilize merchant credentials to access a URL from the media server(s) 114 and/or can access a URL that is associated with the merchant profile of the merchant. In other examples, the merchant can add a URL to the appointment details. In at least one example, the GUI 600 can include a control 604 that when actuated can save the appointment and appointment details.

In at least one example, the same URL can be included in a GUI that can be presented prior to and/or at a start time of the scheduled appointment, as illustrated in FIG. 7. That is, in at least one example, the merchant-facing user interface 116 can present a GUI 700 that includes a user interface element 702 associated with a reminder of an upcoming appointment or an appointment that has not yet started. In at least one example, the GUI 700 can include the URL 704 so that the merchant can easily access the URL to start the virtual appointment. In some examples, instead of the URL being presented via the GUI 700, a control or other user interface element associated with the URL can be presented, the actuation of which can actuate the URL and initiate the virtual call. In some examples, the GUI 700 can include additional or alternative user interface elements that can be associated with additional or alternative appointment details, notes from previous appointments, customer preferences, or the like.

Figure 8:
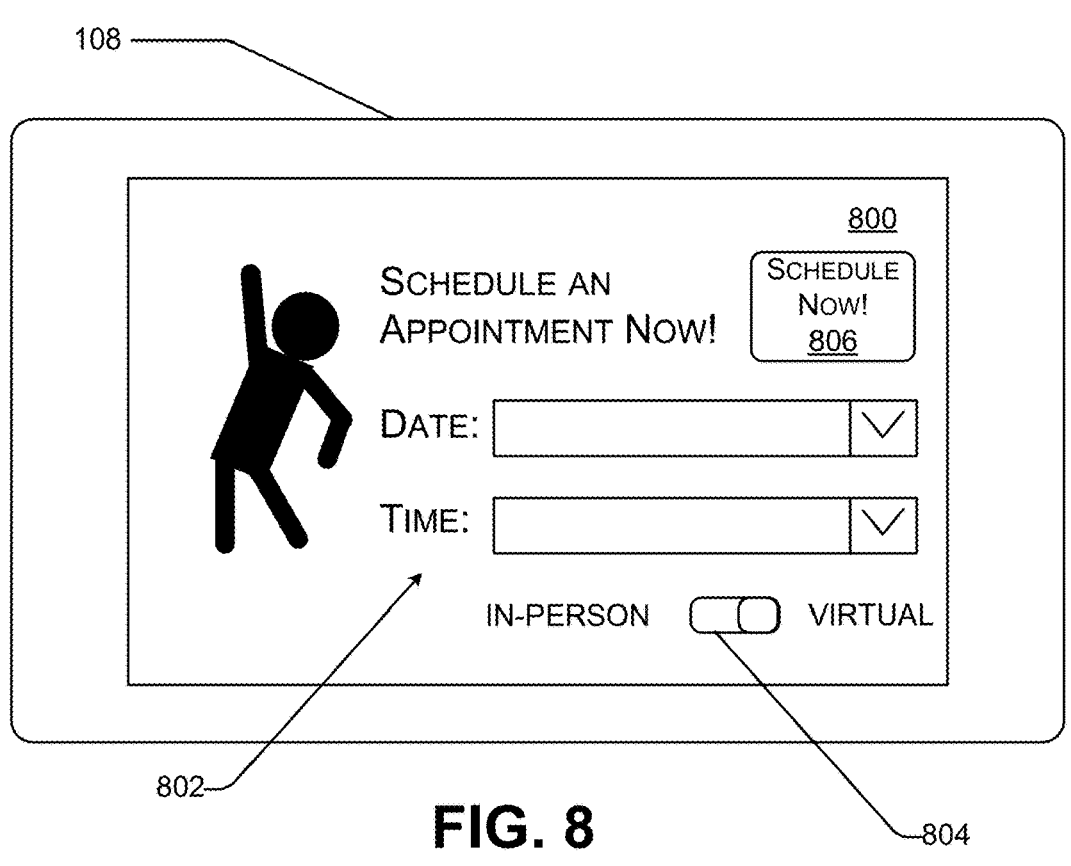
FIG. 8 illustrates an example GUI that can be presented by a customer-facing user interface of a customer device, as described herein.

FIG. 8 illustrates an example GUI 800 that can be presented by the customer-facing user interface 118, which can enable a customer to schedule an appointment with a merchant. In at least one example the GUI 800 can include one or more user interface elements 802 to enable a customer to select a date and time of an appointment. In at least one example, the GUI 800 can include a user interface element 804 that is toggleable between an in-person option and a virtual option for the appointment. In at least one example, if both options are available the customer can toggle the user interface element 804 to indicate which type of appointment they prefer. If one option is not available, the user interface element 804 can be locked to prohibit the customer from selecting such an option. In an alternative example, the GUI 800 can include a different user interface element that enables a customer to select a location, one of which can include an "online" (e.g., virtual) location.

In some examples, the customer can select any date or time by interacting with the user interface elements 802 and the appointment component 120 can determine whether the merchant can accommodate the requested date or time. In some examples, the user interface element 802 may only present available dates and/or times (which can be determined based at least in part on appointment data). In some examples, the customer can indicate whether the customer prefers an in-person or virtual appointment via an interaction with the user interface element 804. In some instances, after the customer specified choice of service, the appointment component 120 can determine whether that service is available, and if it is available in-person/virtual only, then the appointment component 120 can parse the data to determine whether it can be virtualized. In such an example, if an appointment can be virtualized, the virtualization component 126 can determine the redirection link to a prerecorded video or a custom link to a future event to virtualize the service. Thus, in this instance, the virtualization is triggered by the customer via a customer device. If the service cannot be virtualized, the appointment component 120 can send an error notification to the customer.

In at least one example, responsive to the customer selecting a date, time, or other appointment details (e.g., service, employee, etc.) and indicating whether the customer prefers an in-person or virtual appointment, the customer-facing user interface 118 can send an indication of such to the appointment component 120. In some examples, the GUI 800 can include a control 806 or other user interface element that can be actuated to submit the selection(s). Based at least in part on detecting that the control 806 has been actuated, the customer-facing user interface 118 can send an indication of the appointment details and indication of customer preference with respect to an in-person or virtual appointment to the appointment component 120. In at least one example, the appointment component 120 can receive the appointment details and indication of customer preference with respect to an in-person or virtual appointment and can schedule the appointment.

Figure 9:
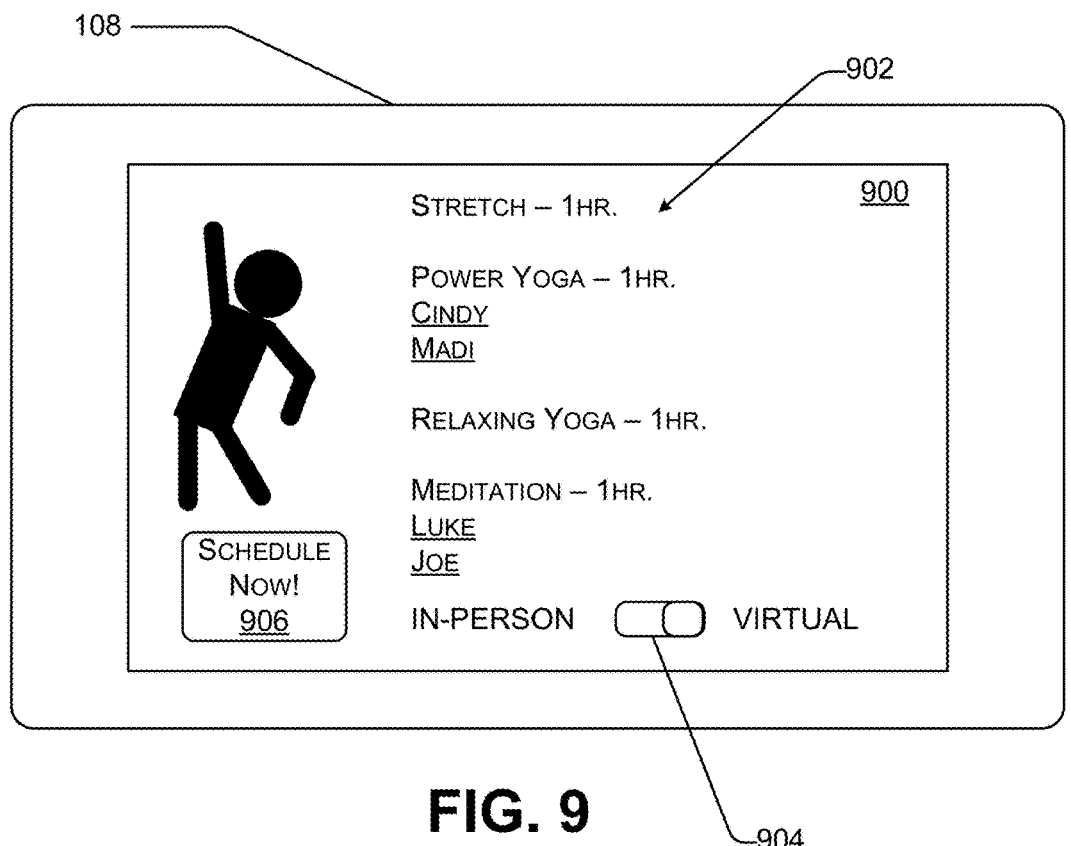
FIG. 9 illustrates another example GUI that can be presented by a customer-facing user interface of a customer device, as described herein.

FIG. 9 illustrates another example GUI 900 that can be presented by the customer-facing user interface 118, which can enable a customer to schedule an appointment with a merchant. In some examples, the customer-facing user interface 118 can present a catalog or menu of items available for sale, or other means of acquisition, from a merchant. That is, the GUI 900 can include user interface elements 902, which can represent individual items that the merchant has available for sale, or other means of acquisition. In some examples, the user interface elements 902 can include indications of which employees are available to provide a particular service, for example, if more than one employee is able to do so.

In at least one example, the GUI 900 can include a user interface element 904 that is toggleable between an in-person option and a virtual option for the appointment. In at least one example, if both options are available, the customer can toggle the user interface element 904 to indicate which type of appointment they prefer. If one option is not available, the user interface element 904 can be locked to prohibit the customer from selecting an in-person appointment. In some examples, the user interface element 904 can be toggleable for some employees providing a service but not for others. That is, in some examples, if an employee is not able to provide a service in-person, the user interface element 904 may be locked to only permit customers to schedule virtual appointments with that employee. In an additional or alternative example, the GUI 900 can update based at least in part on the customer toggling between in-person and virtual. In such an example, item(s) and/or employee(s) associated with in-person availability (e.g., as indicated in the inventory data 132) can be presented via the GUI 900 when the in-person option is selected, and item(s) and/or employee(s) associated with virtual availability can be presented via the GUI 900 when the virtual option is selected (e.g., as indicated in the inventory data 132).

In some examples, the customer can select a service, and in some examples, an employee for providing the service via an interaction with the user interface elements 902. In some examples, the customer can indicate whether the customer prefers an in-person or virtual appointment via an interaction with the user interface element 904. In at least one example, responsive to the customer selecting a service, an employee, or other appointment details (e.g., date, time, etc.) and indicating whether the customer prefers an in-person or virtual appointment (or designating a location as "online"), the customer-facing user interface 118 can send an indication of such to the appointment component 120. In some examples, the GUI 900 can include a control 906 or other user interface element that can be actuated to submit the selections. Based at least in part on detecting that the control 906 has been actuated, the customer-facing user interface 118 can send an indication of the appointment details and indication of customer preference with respect to an in-person or virtual appointment to the appointment component 120. In at least one example, the appointment component 120 can receive the appointment details and indication of customer preference with respect to an in-person or virtual appointment and can schedule the appointment. That is, the appointment component 120 can generate appointment data associated with the appointment and/or add the appointment to an electronic calendar of the merchant.

Figure 10:
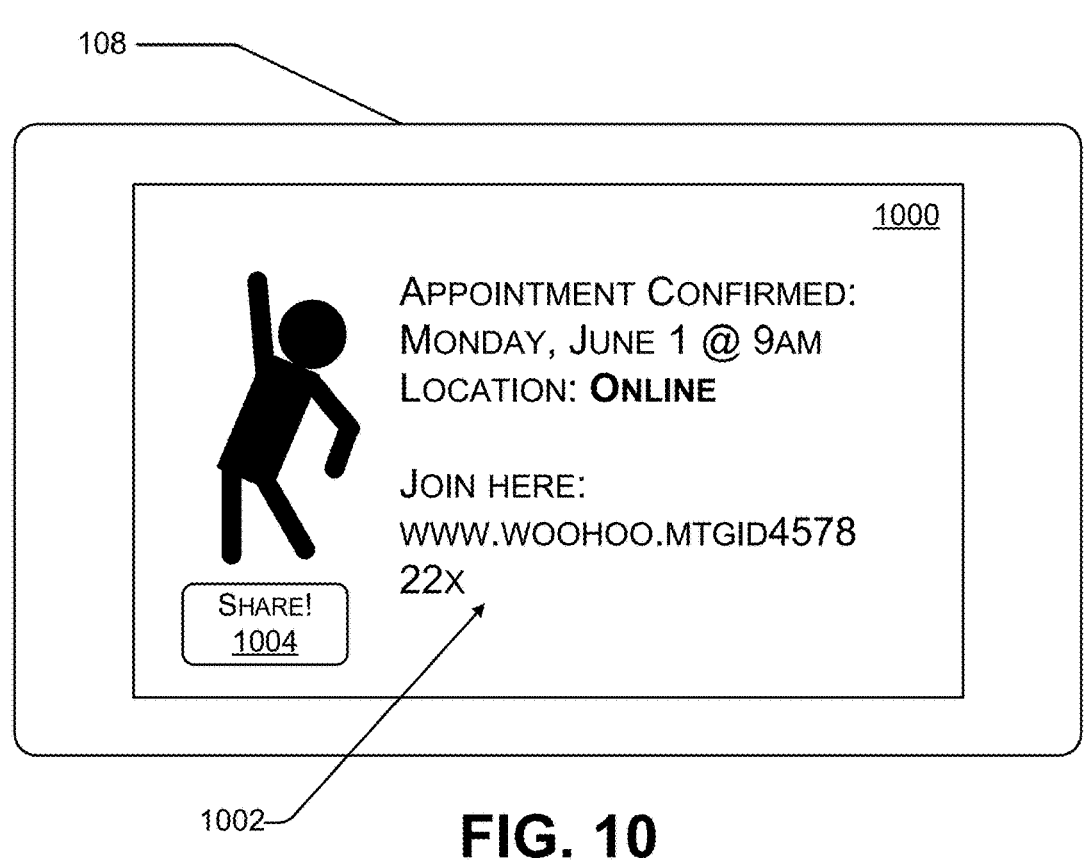
FIG. 10 illustrates yet another example GUI that can be presented by a customer-facing user interface of a customer device, as described herein.

FIG. 10 illustrates an example GUI 1000 that can be presented via the customer-facing user interface 118, which can provide appointment details associated with an appointment scheduled with the customer. As described above, in at least one example, when a merchant or customer schedules a virtual appointment, the appointment component 120 can populate appointment details with a URL and/or provide a mechanism through which a merchant can add a URL to appointment details of an appointment. In at least one example, the GUI 1000 can present user interface elements 1002 that represent appointment details of an appointment (e.g., service to be rendered, employee rendering the service, time, location, URL, etc.). In at least one example, if an appointment is a virtual appointment, the location of the appointment can indicate that the appointment is "online." That is, the GUI 1000 can conspicuously notify the customer that the appointment is virtual ("online"). Further, in such an example, the URL associated with the customer can be associated with the appointment details. In some examples, instead of the URL being presented via the GUI 1000, a control or other user interface element associated with the URL can be presented, the actuation of which can actuate the URL and initiate the virtual call.

In some examples, a customer can invite other customers to join the appointment, for example by sharing the URL with other customers. In such examples, the customer can actuate a control 1004 to request to share the URL with other customers. In such an example, the customer can provide contact information (e.g., email, phone number, etc.) which can be sent by the customer-facing user interface 118 to the appointment component 120. The appointment component 120 can add the additional customers to the appointment (e.g., update the appointment data) and can send the URL to customer devices of the respective customers.

Figure 11:
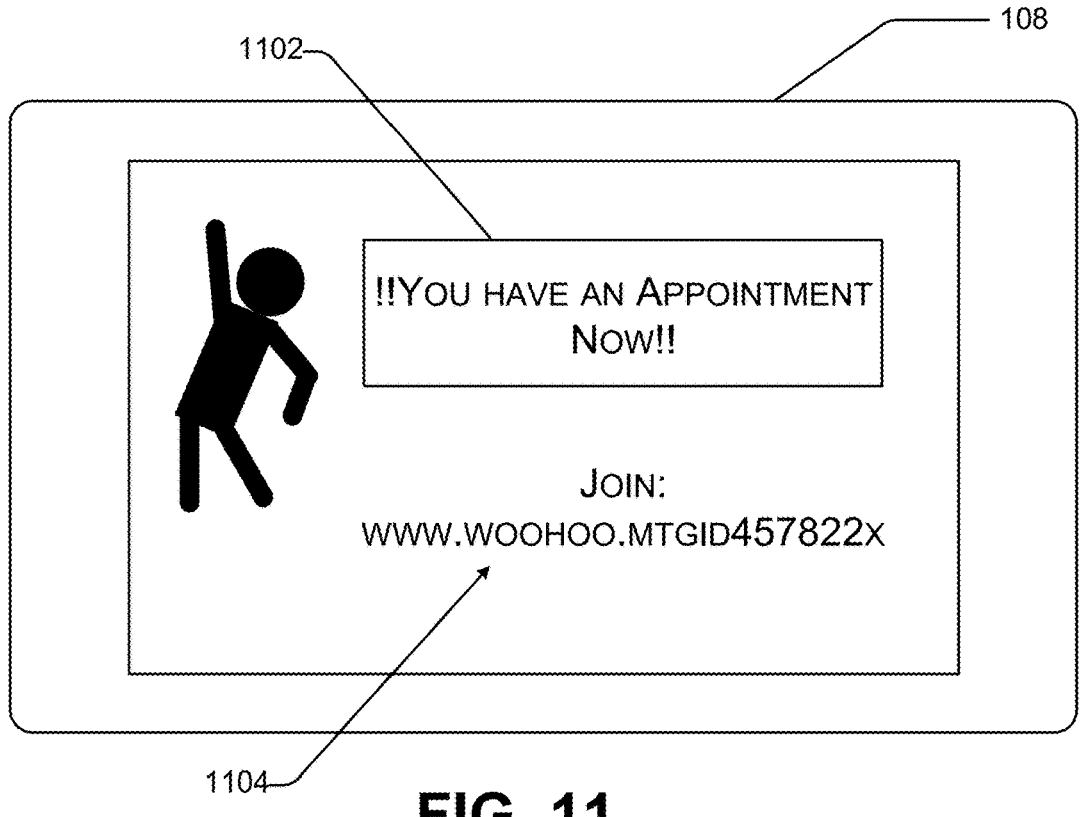
FIG. 11 illustrates an example GUI that can be presented by a customer-facing user interface of a customer device, as described herein.

In at least one example, the same URL can be included in a GUI that can be presented prior to and/or at a start time of the scheduled appointment, as illustrated in FIG. 11. That is, in at least one example, the customer-facing user interface 118 can present a GUI 1100 that includes a user interface element 1102 associated with a reminder of an upcoming appointment or an appointment that has not yet started. In at least one example, the GUI 1100 can include the URL 1104 so that the customer can easily access the URL to start the virtual appointment. In some examples, instead of the URL being presented via the GUI 1100, a control or other user interface element associated with the URL can be presented, the actuation of which can actuate the URL and initiate the virtual call. In some examples, the GUI 1100 can include additional or alternative user interface elements that can be associated with additional or alternative appointment details, notes for preparing for the appointment, or the like.

In examples where the customer has shared the URL, the appointment component 120 can send a reminder or notification to each customer device of a customer associated with the appointment. In such examples, the GUI 1100 can be presented via each of the respective customer devices so that the customers can easily join the virtual appointment.

It should be noted that the information described above with reference to the various GUIs can be presented via user interfaces on user devices as described above. In some examples, such GUIs can be presented via applications on the respective devices. In some examples, such GUIs can be presented responsive to in-app notifications received by such applications on the respective devices. In some examples, such GUIs can be presented in association with a text message, email, social media notification, or the like. For example, the GUI 700 can be presented responsive to a text message reminder sent to the merchant device 106. In an additional or alternative example, the GUI 1000 and/or GUI 1100 can be presented responsive to a text message confirmation or reminder sent to the customer device 108.

FIGS. 2-11 above describe various GUIs that facilitate enabling, scheduling, and/or conducting virtual appointments. In some of the examples above, the merchant or customer can interact with the various GUIs to provide inputs for selecting aspects of virtual appointments. However, in additional or alternative examples, the appointment component 120 and/or virtualization component 126 can intelligently select such aspects or offer recommendations (e.g., received from the recommendation component 124) for selecting aspects of virtual appointments which can be presented via the GUIs described above. Take for example, in FIG. 4, the recommendation component 124 can utilize data associated with other, different merchants to determine which items of the merchant to recommend for virtual appointments. In some examples, such items can be pre-selected for the merchant and/or the GUI 400 can include an indicator indicating such a recommendation. As an additional or alternative example, in FIG. 9, the recommendation component 124 can utilize data associated with the customer, or other customers similar to the customer, to recommend an item and/or an employee for providing such an item. In some examples, such items can be pre-selected for the customer and/or the GUI 900 can include an indicator indicating such a recommendation. Additional details associated with intelligent recommendations are described below.

FIGS. 12-16 are flowcharts showing example processes involving techniques as described herein. The processes illustrated in FIGS. 12-16 are described with reference to FIG. 1 for convenience and ease of understanding. FIGS. 17 and 18 provide additional details associated with the components of FIG. 1 above. The processes illustrated in FIGS. 12-16 are not limited to being performed using components described in FIG. 1, and such components are not limited to performing the processes illustrated in FIGS. 12-16.

The processes 1200-1600 are illustrated as collections of blocks in logical flowcharts, which represent sequences of operations that can be implemented in hardware, software, or a combination thereof. In the context of software, the blocks represent computer-executable instructions stored on one or more computer-readable storage media that, when executed by processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process can be omitted entirely. Moreover, the processes 1200-1600 can be combined in whole or in part with each other or with other processes.

FIG. 12 illustrates an example process 1200 for virtualizing a merchant and/or item(s) associated with the merchant, as described herein.

Block 1202 illustrates accessing data associated with merchant(s). In at least one example, the recommendation component 124 can access the user data 130 in the data store(s) 128 and can access merchant profile(s) stored therein. As described above, in at least one example, the merchant profile(s) can store, or otherwise be associated with, data associated with merchant(s). For instance, a merchant profile can store, or otherwise be associated with, data about a merchant (e.g., name of the merchant, geographic location of the merchant, operating hours of the merchant, employee data, etc.), settings associated with the merchant (e.g., virtualized, etc.), a merchant category classification (MCC), item(s) offered for sale by the merchant, hardware (e.g., device type) used by the merchant, transaction data associated with the merchant (e.g., transactions conducted by the merchant, payment data associated with the transactions, items associated with the transactions, descriptions of items associated with the transactions, itemized and/or total spends of each of the transactions, parties to the transactions, dates, times, and/or locations associated with the transactions, etc.), loan data associated with the merchant (e.g., previous loans made to the merchant, previous defaults on said loans, etc.), risk data associated with the merchant (e.g., indications of risk, instances of fraud, chargebacks, etc.), appointment data (e.g., previous appointments, upcoming (scheduled) appointments, timing of appointments, lengths of appointments, etc.), payroll data (e.g., employees, payroll frequency, payroll amounts, etc.), employee data, permission data (e.g., indications of which operations are associated with permission(s), which employees have said permission(s), etc.), reservations data (e.g., previous reservations, upcoming (scheduled) reservations, interactions associated with such reservations, etc.), inventory data, customer service data, etc. The merchant profile can securely store bank account data as provided by a merchant.

Block 1204 illustrates determining whether a merchant is a candidate for virtualization. In at least one example, the recommendation component 124 can analyze the merchant profile(s) to determine whether individual of the merchant(s) associated therewith are candidates for virtualization. In some examples, the recommendation component 124 can determining that a merchant is a candidate for virtualization based at least in part on a characteristic of the merchant (e.g., as determined from the merchant profile(s)). Such a characteristic can be a merchant category code (MCC), a geo-location, inventory (e.g., available inventory as determined from the inventory data 132, names of item(s) associated with the inventory data 132, etc.), transaction history, appointment history, or a sales trend, or the like. In some examples, the recommendation component 124 can determine that a merchant is a candidate for virtualization based at least in part on a characteristic of a merchant ecosystem. Such a characteristic can include an indication of a closure of in-person business (e.g., as mandated by a federal, state, or local order), sales trends (e.g., types of items that are selling or are not selling, etc.), payment processing trends (e.g., volume of transactions has increased or decreased, average spend associated with transactions has increased or decreased, etc.), appointments trends, or the like.

In some examples, the recommendation component 124 can utilize machine-trained data model(s) which can output indications of candidate merchant(s). In some examples, the machine-trained data model(s) can be trained based at least in part on merchant data (associated with the user data 130 of a set of merchants), the inventory data 132, and virtualization data indicating which merchant(s) associated with the merchant data provide and/or have provided virtualized item(s), sales trends associated with such merchant(s) and/or virtualized item(s), etc. The machine-trained data model(s) can analyze the merchant data accessed in the operation associated with block 1202 to output a recommendation regarding merchant(s) that are candidate(s) for virtualization.

In some examples, the recommendation component 124 can compare inventories of similar merchants to determine which services qualify as capable of being virtualized. In another example, the recommendation component 124 can parse the metadata associated with the item to determine likelihood and ease of virtualization with respect to any item and/or merchant. For example, for items with metadata "yoga." "meditation." "Pilates," "dance" the recommendation component 124 may associate a high virtualization score for such items and/or a merchant offering such items. However, for items with metadata "massage" or "spin cycling" the recommendation component 124 may associate a low virtualization score for such items and/or a merchant offering such items. For items with metadata "TRX" or "barre," the recommendation component 124 may associate a "medium virtualization score." to allow the merchants or the customers to arrange for necessary accommodations prior to virtualizations. The virtualization score can be output and compared to a threshold to determine whether an item and/or an associated merchant is a candidate for virtualization. Items and/or merchants having virtualization scores that meet or exceed the threshold can be determined to be candidates for virtualization.

If a merchant is not a candidate for virtualization, the recommendation component 124 can refrain from sending a recommendation, as illustrated at block 1206.

Block 1208 illustrates sending a recommendation to a merchant device of the merchant. Based at least in part on determining that a merchant is a candidate for virtualization, the recommendation component 124 can send a recommendation to the merchant device 106 of the merchant. In such an example, the recommendation can be presented via the merchant-facing user interface 116. In some examples, the recommendation can be a text message, email, push notification, in-app notification, or the like. In some examples, the recommendation can be presented during an onboarding process, in association with a dashboard of the merchant, or via its own GUI, such as the GUI illustrated in FIG. 2, or the like.

Block 1210 illustrates determining whether a request to virtualize is received. In at least one example, the merchant-facing user interface 116 can present the recommendation with a control that can be actuated (e.g., by the merchant) to indicate that the merchant desires to virtualize. That is, the merchant can interact with the merchant-facing user interface 116 to provide an input indicating an intent to virtualize and the merchant-facing user interface 116 can send a request to virtualize to the server(s) 110. In at least one example, the virtualization component 126 can receive the request.

Block 1212 illustrates virtualizing the merchant and/or item(s) associated with the merchant. In at least one example, based at least in part on receiving the request to virtualize, the virtualization component 126 can virtualize the merchant and/or item(s) associated with the merchant. As described above, in at least one example, responsive to receiving a request to virtualize, the virtualization component 126 can associate an indication of virtualization with a merchant profile of the merchant. That is, in at least one example, the virtualization component 126 can activate a setting associated with virtualization with the merchant profile of the merchant.

In some examples, where virtualization comprises availing item(s) via media platforms (e.g., a video conferencing platform), such that a merchant can provide services virtually, the virtualization component 126 can activate a setting, indicating that virtualized items are available, and in some examples, can cause a modification to appointment settings, thereby enabling virtual appointments. As such, when a customer or merchant schedules an appointment, a virtual (e.g., online) option becomes available. Thus, when a customer or a merchant schedules an appointment and indicates a virtual appointment, the appointment component 120 can populate appointment details with a URL and/or provide a mechanism through which a merchant can add a URL to appointment details of an appointment. In some examples, the virtualization component 126 can cause one or more GUIs to be presented to enable the merchant to customize which location(s) to virtualize, which items to virtualize, which employees can provide virtualized services, or the like. Additional details are described below.

In some examples, where virtualization comprises bundling items for selling as a do-it-yourself kit or project, the virtualization component 126 can add indicators to individual items in the inventory data 132 to indicate that such items are associated with a bundle. In some examples, the virtualization component 126 can generate instructions for assembling and/or otherwise using items associated with the bundle. In at least one example, the virtualization component 126 can generate a listing or other content that can be used to advertise and/or sell such bundled items.

In some examples, where virtualization comprises associating an item with a workshop and/or otherwise generating a workshop offering (e.g., that can be offered in-person or virtual), the virtualization component 126 can add indicators to individual items in the inventory data 132 to indicate that such an item is associated with a workshop and/or can add an indication of a workshop to the inventory data 132. In some examples, the virtualization component 126 can generate a listing or other content that can be used to advertise and/or sell such workshops.

If a request to virtualize is not received, the virtualization component 126 can refrain from virtualizing the merchant and/or item(s) associated with the merchant, as illustrated in block 1214.

In at least one example, based at least in part on virtualizing a merchant, any upcoming appointments that are scheduled for in-person services can be converted to virtual appointments. That is, based at least in part on a setting associated with a merchant transitioning from non-virtualized to virtualized and/or a virtualized setting otherwise being activated, the appointment component 120 can convert in-person appointments to virtual appointments. In such an example, the appointment component 120 can analyze appointment data associated with upcoming appointments, determine which of the appointments can be converted to virtual appointments, and convert such appointments to virtual appointments by modifying locations of the appointments and/or associating URLs with appointment details of such appointments. In at least one example, the appointment component 120 can send notifications to the customers associated with such appointments to indicate that the appointments have been converted. In some examples, the notifications can include a prompt for the customers to confirm or re-confirm the appointments now that the appointments are virtual appointments. Further, in some examples, the notifications can include the URLs for accessing the video calls associated with such virtual appointments.

In examples where both virtual appointments and in-person appointments are available, the appointment component 120 can send a notification to a customer device of a customer associated with an upcoming appointment that notifies the customer that a virtual option is available. If the customer selects a virtual option (e.g., via an input associated with the customer-facing user interface 118), the appointment component 120 can receive an indication of such and can convert the in-person appointment to a virtual appointment by at least one of modifying a location of the appointment (e.g., from a physical location to "online") and/or associating a URL with appointment details of the appointment.

Furthermore, in some examples, based at least in part on virtualizing a merchant, the appointment component 120 can modify available appointments and/or an electronic calendar of a merchant and/or of an employee to allow multiple customers to book a same appointment. That is, the appointment component 120 can modify an electronic calendar associated with the merchant and/or individual employees of the merchant to avail an appointment for multiple customers so that multiple customers can make an appointment for a same service at a same time. In some examples, the number of available appointments for a service and/or a time can be determined based at least in part on customer need (e.g., as determined based on the customer data), on the video conferencing platform, or other media platform, (e.g., maximum number of participants on a video call), or the like. In such an example, the appointment component 120 can access the same URL, which can be added to appointment details for each of the customers that book appointments at a same time for a same service.

FIG. 13 illustrates an example process 1300 for associating a uniform resource locator (URL) with a merchant and/or an item of the merchant, as described herein.

Block 1302 illustrates receiving, from a merchant device of a merchant, a request to virtualize. In at least one example, the virtualization component 126 can receive a request to virtualize a merchant and/or an item associated with the merchant from a merchant device 106 (e.g., via a merchant-facing user interface 116 associated therewith). In some examples, the request can be responsive to a recommendation sent from the recommendation component 124, described above with reference to FIG. 12. In other examples, the merchant device 106 can send the request without having first received a recommendation. For instance, in some examples, the merchant device 106 can send a request based at least in part on the merchant interacting with a dashboard presented via the merchant-facing user interface 116 (e.g., the dashboard can include a control associated with virtualization) or the merchant can interact with the merchant-facing user interface 116 during an onboarding flow to request virtualization.

In at least one example, based at least in part on receiving the request to virtualize, the virtualization component 126 can virtualize the merchant and/or item(s) associated with the merchant. As described above, in at least one example, responsive to receiving a request to virtualize, the virtualization component 126 can associate an indication of virtualization (e.g., activate a virtualized setting) with a merchant profile of the merchant. Depending on how a merchant intends to virtualize (e.g., via offering video appointments, bundling item(s) for do-it-yourself kits, workshop(s), etc.), the virtualization component 126 can perform different operations.

Block 1304 illustrates determining whether the request is associated with offering virtual appointments. In at least one example the virtualization component 126 can determine whether the request is associated with virtualizing the business of the merchant via enabling the merchant to offer services via virtual appointment(s) or another type of virtualization, as described herein. If the request is not associated with offering virtual appointments, the virtualization component 126 can virtualize the merchant and/or item(s) offered for sale by the merchant, as illustrated in block 1306. In such an example, the virtualization component 126 can effectuate modifications to the inventory data 132 to virtualize the merchant and/or item(s) associated therewith. Additional details are described above.

Block 1308 illustrates accessing a URL from a media platform. In some examples, where virtualization comprises availing item(s) via media platforms (e.g., a video conferencing platform), such that a merchant can provide services virtually, the virtualization component 126 can activate a setting, indicating that virtualized items are available, and in some examples, can cause a modification to appointment settings, thereby enabling virtual appointments. As such, when a customer or merchant schedules an appointment, a virtual (e.g., online) option becomes available. In some examples, as described above, a merchant can specify location(s), item(s), employee(s), etc. that are to be associated with virtual appointments.

In at least one example, the merchant can interact with the merchant-facing user interface 116 to provide credentials associated with a video conferencing platform (e.g., which can be provided by the media server(s) 114). In some examples, if a merchant does not have an account with a video conferencing platform, the virtualization component 126 can prompt the merchant to set up an account and provide their credentials. In at least one example, the virtualization component 126 can use the credentials to obtain a URL from the video conferencing platform.

Block 1310 illustrates associating the URL with the merchant. In at least one example, based at least in part on accessing the URL, the virtualization component 126 can associate the URL with the merchant. That is, the virtualization component 126 can map, or otherwise associate, the URL with a merchant profile of the merchant. In some examples, the URL can be mapped to, or otherwise associated with, a particular item. In some examples, the URL can be mapped to, or otherwise associated with, a particular employee. In some examples, multiple URLs can be mapped to, or otherwise associated with, the merchant.

In at least one example, when a customer or merchant schedules an appointment, and indicates a virtual appointment, the appointment component 120 can populate appointment details with the URL associated with the merchant. If an appointment is associated with a service and/or employee associated with particular URLs, the appointment component 120 can associate the particular URL with the appointment. That is, based at least in part on associating a URL with a merchant, the appointment component 120 can automatically associate the URL with an appointment, as described below.

While the process 1300 described above is directed to obtaining a URL for a merchant (e.g., from media server(s) 114 using credentials of the merchant), in some examples, as described above, the merchant can provide their own URL. In such an example, the virtualization component 126 can map, or otherwise associate, the provided URL to the profile of the merchant. Furthermore, in some examples, the virtualization component 126 may not use the same URL for each appointment or item, but instead can access new URLs on-the-fly (i.e., in real time or near-real time) using the stored credentials. In some examples, the virtualization component 126 can retrieve URLs and provide URLs to the appointment component 120 for integration into appointment details.

FIG. 14 illustrates an example process 1400 for generating recommendations, as described herein.

Block 1402 illustrates determining virtualization data associated with merchants associated with a service provider. In at least one example, the server(s) 110 can determine virtualization data associated with merchants that are associated with the service provider. For example, appointment data associated with appointments scheduled and/or managed by the appointment component 120 can indicate whether merchants offered appointments in-person and/or virtually, a length of time associated with virtual appointments, platforms used for facilitating virtual appointments, pricing associated with such appointments, etc. Such appointment data can be used to determine virtualization data. In some examples, the inventory data 132 can indicate item(s) that have been virtualized and/or are virtualized and prices associated with such items. Such inventory data 132 can be used to determine virtualization data. In some examples, transaction data can indicate sales rates, sales volumes, sales trends, etc. associated with merchants that use the service provider for payment processing. Such transaction data can be used to determine virtualization data. In at least one example the virtualization data can be stored, as illustrated at block 1404, for example, in the data store(s) 128.

Block 1406 illustrates accessing the virtualization data and merchant data associated with the merchants. In at least one example, a training component, described below, can access the virtualization data as described above with reference to block 1404. Further, in at least one example, the training component can access user data 130, and merchant profile(s) associated therewith, in the data store(s) 128. As described above, in at least one example, the merchant profile(s) can store, or otherwise be associated with, data associated with merchant(s). For instance, a merchant profile can store, or otherwise be associated with, data about a merchant (e.g., name of the merchant, geographic location of the merchant, operating hours of the merchant, employee data, etc.), setting(s) associated with the merchant (e.g., virtualized, etc.), a merchant category classification (MCC), item(s) offered for sale by the merchant, hardware (e.g., device type) used by the merchant, transaction data associated with the merchant (e.g., transactions conducted by the merchant, payment data associated with the transactions, items associated with the transactions, descriptions of items associated with the transactions, itemized and/or total spends of each of the transactions, parties to the transactions, dates, times, and/or locations associated with the transactions, etc.), loan data associated with the merchant (e.g., previous loans made to the merchant, previous defaults on said loans, etc.), risk data associated with the merchant (e.g., indications of risk, instances of fraud, chargebacks, etc.), appointment data (e.g., previous appointments, upcoming (scheduled) appointments, timing of appointments, lengths of appointments, etc.), payroll data (e.g., employees, payroll frequency, payroll amounts, etc.), employee data, permission data (e.g., indications of which operations are associated with permission(s), which employees have said permission(s), etc.), reservations data (e.g., previous reservations, upcoming (scheduled) reservations, interactions associated with such reservations, etc.), inventory data, customer service data, etc. In at least one example, the training component can access virtualization data and merchant data associated with all merchants associated with the service provider, a portion of relevant merchants associated with the service provider (e.g., different merchants that are similar and/or share a characteristic), or a single merchant.

Block 1408 illustrates analyzing the virtualization data and the merchant data using a machine learning mechanism. In at least one example, the training component can analyze the virtualization data and the merchant data using a machine learning mechanism. In at least one example, the machine learning mechanism can generate machine-trained model(s) that can output recommendations with respect to virtualization. In some examples, the machine-trained model(s) can be trained on different sets of training data such as virtualization data and merchant data associated with all merchants associated with the service provider, a portion of merchants associated with the service provider (e.g., different merchants that are similar and/or share a characteristic), or a single merchant. In at least one example, a machine-trained model can output a recommendation of merchant(s) that are candidate(s) for virtualization. Further, in some examples, a machine-trained model can output a recommendation with respect to item(s) that can be virtualized, a price of a virtualized item, etc. In at least one example, a machine-trained model can output a recommendation with respect to a length of time associated with a virtual appointment, an employee for providing a virtual appointment, whether a virtual appointment is suitable for multiple customers or a single customer, a platform for providing the virtual appointment or the like.

Block 1410 illustrates generating recommendation(s) based at least in part on machine-trained model(s). In at least one example, the recommendation component 124 can access merchant data, inventory data, transaction data, and the like, and can analyze such data using machine-trained model(s). As a result, the recommendation component 124 can generate recommendation(s) with respect to merchant(s) that are candidate(s) for virtualization, pricing for virtualized item(s), timing associated with a virtual appointment(s), employee(s) for providing virtual appointment(s), platform(s) for providing virtual appointment(s), or the like. In some examples, a machine-trained model can output a recommendation with respect to item(s) to be virtualized and/or a platform for virtualizing such item(s).

In at least one example, the process 1400 can return to block 1402 to access updated virtualization data and retrain (e.g., update) the machine-trained model(s). As such, the machine-trained model(s) can become more accurate and/or more relevant as more virtualization data is received and/or analyzed.

Block 1412 illustrates sending recommendation(s) to device(s) of merchant(s). In at least one example, the recommendation component 124 can send recommendation(s) to device(s) of merchant(s). In some examples, the recommendation can be a text message, email, push notification, in-app notification, or the like. In such an example, the recommendation can be presented via the merchant-facing user interface 116. In some examples, the recommendation can be presented during an onboarding process, in association with a dashboard of the merchant, or via its own GUI, such as the GUI illustrated in FIG. 2, or the like.

In some examples, with respect to determining item(s) that can be virtualized (e.g., in block 1408), in some examples, the machine-trained model can be trained to output a recommendation with respect to items that can be bundled. For example, the machine-trained model can be trained based at least in part on inventory data associated with the merchant data to determine recommendations associated with bundling items. In some examples, the recommendation component 124 can track inventory (e.g., items that sell, items that don't sell, perishability, etc.) and then the recommendation component 124 can leverage such information to determine which items to bundle (e.g., to be sold as a kit), instruction(s) (e.g., manual/video) associated with the bundled items, etc. In some examples, the recommendation component 124 can utilize image recognition, text parsing, or the like to analyze inventory data to determine items as candidate items to bundle in a kit and/or whether instruction(s) are needed. In some examples, items can be bundled from the same merchant or different merchants associated with the service provider. That is, in such examples, a recommendation can suggest that a merchant collaborate with one or more other merchants associated with the service provider to generate a bundle of items and/or instructions associated with the bundled items.

In some examples, with respect to determining item(s) that can be virtualized (e.g., in block 1408), in some examples, the machine-trained model can be trained to output a recommendation with respect to items that can be offered via a workshop, one-time class, or the like. For example, the machine-trained model can be trained based at least in part on inventory data associated with the merchant data to determine recommendations associated with offering workshops, classes, or the like associated with item(s) available in one or more merchant's inventory(s). In some examples, the recommendation component 124 can track inventory (e.g., items that sell, items that don't sell, perishability, etc.) and then the recommendation component 124 can leverage such information to determine which items to offer via a workshop, one-time class, etc. In some examples, the recommendation component 124 can utilize image recognition, text parsing, or the like to analyze inventory data to determine items as candidate items to offer via a workshop, class, or the like. In some examples, items availed via a workshop, class, or the like can be from the same merchant or different merchants associated with the service provider. That is, in such examples, a recommendation can suggest that a merchant collaborate with one or more other merchants associated with the service provider to offer a workshop, class, etc.

FIG. 15 illustrates an example process 1500 for scheduling a virtual appointment, as described herein.

Block 1502 illustrates receiving, from a customer device of a customer, a request to schedule an appointment for a service available from a merchant. In at least one example, a customer can interact with the customer-facing user interface 118 to schedule an appointment. In some examples, the customer-facing user interface 118 can present GUIs that include user interface element(s) to enable the customer to specify appointment details, such as a service, an employee, a date, a time, a location, etc. Example GUIs are described above.

In at least one example, a GUI can include a user interface element that is toggleable between an in-person option and a virtual option for an appointment. In at least one example, if both options are available the customer can toggle the user interface element to indicate which type of appointment they prefer. If one option is not available, the user interface element can be locked to prohibit the customer from selecting such an option. In an alternative example, a GUI can include a different user interface element that enables a customer to select a location, one of which can include an "online" (e.g., virtual) location.

In some examples, a GUI can include a control or other user interface element that can be actuated to submit the selections. Based at least in part on detecting that the control has been actuated, the customer-facing user interface 118 can send an indication of the appointment details and indication of customer preference with respect to an in-person or virtual appointment to the appointment component 120.

Block 1504 illustrates scheduling the appointment. In at least one example, the appointment component 120 can receive the appointment details and the indication of customer preference with respect to an in-person or virtual appointment and can schedule the appointment. That is, the appointment component 120 can receive data associated with the requested appointment and compare the data with appointment data of the merchant determine whether the merchant is available on the date and/or during the time requested. Further, if an employee is specified, the appointment component 120 can determine whether the employee is available. The appointment component 120 can schedule the appointment by adding the appointment into an electronic calendar of the merchant and/or otherwise generating appointment data associated with the appointment. Such appointment data can be mapped to, or otherwise associated with the merchant profile of the merchant.

Block 1506 illustrates determining whether the appointment is for a virtual service. In at least one example, the appointment component 120 can determine whether the appointment is for a virtual service. As described above, in an example, the customer can request an appointment for a virtual service by selecting an "online" location in association with the appointment request. In another example, the customer can request an appointment for a virtual service by otherwise providing an indication of such via an interaction with a user interface element presented via a GUI presented by the customer-facing user interface 118. In at least one example, if the appointment is not for a virtual service, the appointment component 120 can send a notification of the appointment to the customer device 108, as illustrated at operation 1508. The notification can be sent as a text message, email, in-app notification, or the like. In at least one example, the customer-facing user interface 118 can present the notification. In some examples, the notification can be associated with a request for confirmation or a link to add the appointment to an electronic calendar of the customer.

Block 1510 illustrates determining whether the appointment is associated with an employee with a particular URL. In at least one example, the appointment component 120 can determine whether the appointment details indicate that the appointment is associated with an employee that is associated with their own URL. As described above, in some examples, a merchant can utilize a same URL for each virtual appointment. In other examples, a merchant can associate a URL with individual employees. If the appointment component 120 determines that the appointment is associated with an employee that is associated with a particular URL, the appointment component 120 can access the particular URL, as illustrated at block 1512, and update the appointment details to include the URL. That is, the appointment component 120 can automatically populate the appointment details with the particular URL. In at least one example, the appointment component 120 can send a notification of the appointment to the customer device 108 which can include the URL, as illustrated in block 1514. The notification can be sent as a text message, email, in-app notification, or the like. In at least one example, the customer-facing user interface 118 can present the notification. In some examples, the notification can be associated with a request for confirmation or a link to add the appointment to an electronic calendar of the customer.

If the appointment component 120 determines that the appointment is not associated with an employee that is associated with a particular URL, the appointment component 120 can access a URL associated with the merchant, as illustrated at block 1516, and update the appointment details to include the URL. That is, the appointment component 120 can automatically populate the appointment details with the URL. In at least one example, the appointment component 120 can send a notification of the appointment to the customer device 108 which can include the URL, as illustrated in block 1518. The notification can be sent as a text message, email, in-app notification, or the like. In at least one example, the customer-facing user interface 118 can present the notification. In some examples, the notification can be associated with a request for confirmation or a link to add the appointment to an electronic calendar of the customer.

In some examples, the appointment component 120 can receive multiple requests for a service and/or a time associated with an appointment. In some examples, the appointment component 120 can modify an electronic calendar of a merchant and/or of an employee to allow multiple customers to book a same appointment. That is, the appointment component 120 can modify an electronic calendar associated with the merchant and/or individual employees of the merchant to avail an appointment for multiple customers so that multiple customers can make an appointment for a same service at a same time. In some examples, the number of available appointments for a service and/or a time can be determined based at least in part on customer need (e.g., as determined based on the customer data), on the video conferencing platform, or other media platform (e.g., maximum number of participants on a video call), or the like. In such an example, the appointment component 120 can access the same URL, which can be added to appointment details for each of the customers. Additional details associated with URLs and customer-specific URLs are described above with reference to FIG. 1.

In some examples, when an appointment is already scheduled, such a request (e.g., as described in association with block 1502) can be associated with a request to convert an existing appointment into an appointment availed via an alternative channel (e.g., in-person to virtual or virtual to in-person).

FIG. 16 illustrates an example process 1600 for identifying a customer for a virtual appointment and/or generating a recommendation for the customer to schedule the virtual appointment, as described herein.

Block 1602 illustrates accessing customer data associated with customers associated with a service provider. In at least one example, the recommendation component 124 can access user data 130 in the data store(s) 128. As described above, the user data 130 can include customer profiles. Customer profiles can store customer data including, but not limited to, customer data (e.g., name, phone number, address, email address, banking data, etc.), customer preferences (e.g., learned or customer-specified), purchase history data (e.g., identifying one or more items purchased (and respective item data), payment instruments used to purchase one or more items, returns associated with one or more orders, statuses of one or more orders (e.g., preparing, packaging, in transit, delivered, etc.), etc.), appointment data (e.g., previous appointments, upcoming (scheduled) appointments, timing of appointments, lengths of appointments, etc.), payroll data (e.g., employers, payroll frequency, payroll amounts, etc.), reservations data (e.g., previous reservations, upcoming (scheduled) reservations, reservation duration, interactions associated with such reservations, etc.), customer service data, location data (e.g., where the customer is at any point in time, location preferences, etc.), etc.

Block 1604 illustrates identifying, based on analyzing the customer data, a customer for a virtual appointment. In at least one example, the recommendation component 124 can analyze the customer data to identify a customer for an appointment. In some examples, the recommendation component 124 can determine a trend associated with a frequency at which a customer schedules or has an appointment and can identify the customer for such an appointment (e.g., now that an item has been virtualized). In some examples, the recommendation component 124 can determine that a customer has previously scheduled appointments associated with services that have been virtualized. In some examples, the recommendation component 124 can determine that other customers associated with a service provider have purchased and/or scheduled appointments associated with virtualized items. In some examples, such customers can be determined to be similar to the customer. In at least one example, the recommendation component 124 can access data indicative of social media interactions of a customer, which can indicate interests of the customer, desires of the customer, or other information associated with the customer. In some examples, the recommendation component 124 can utilize machine-trained model(s) to identify a customer that is a candidate for an appointment.

Block 1606 illustrates accessing appointment data associated with a merchant. As described above, appointment data can be stored in association with a merchant profile of the merchant. In at least one example, the recommendation component 124 can access appointment data associated with the merchant to determine available appointment times and/or employees for the virtual appointment, as illustrated in block 1608.

Block 1610 illustrates generating a recommendation for the customer to schedule the virtual appointment. In at least one example, based at least in part on identifying the customer and, in some examples, an appointment time and/or employee for the virtual appointment, the recommendation component 124 can generate a recommendation for the customer and can send the recommendation to a customer device 108 of the customer, as illustrated at block 1612. In some examples, the recommendation component 124 can generate a recommendation based on customer data without considering appointment data (e.g., as illustrated by the arrow from block 1604 to 1610). In other examples, the recommendation component 124 can use both customer data and appointment data. In at least one example, the recommendation component 124 can send the recommendation as a text message, email, in-app notification, or the like. In at least one example, the customer-facing user interface 118 can present the notification. In some examples, the notification can be associated with a control or other user interface element to enable the customer to request to schedule the virtual appointment.

Process 1600 can continue via block 1502 of FIG. 15, to determine whether the customer requests to schedule the virtual appointment.

In some examples, the recommendation component 124 can analyze the customer data and can determine that multiple customers are interested in a same service and/or a same time. In such examples, if multiple customers are interested in a same service, the recommendation component 124 can notify the appointment component 120. The appointment component 120 can modify an electronic calendar associated with the merchant and/or individual employees of the merchant to avail an appointment for multiple customers so that multiple customers can make an appointment for a same service at a same time. In some examples, the number of available appointments for a service and/or a time can be determined based at least in part on customer need (e.g., as determined based on the customer data), on the video conferencing platform, or other media platform. (e.g., maximum number of participants on a video call), or the like. In at least one example, the recommendation component 124 can generate a recommendation for individual of the multiple customers, which can be sent to respective customer devices of the customers. If multiple customers schedule an appointment, the appointment component 120 can access the same URL, which can be added to appointment details for each of the customers.

As described above, in some examples, a URL can be unique to a specific customer or a set of customers such that the merchant interacts with the set of customers at the same time, but the customers cannot interact with other customers or be privy to the direct communication between the merchant and another customer. This kind of logical separation, via URLs, allows a single communication channel for delivery of information when viewed from merchant's perspective, but multiple communication channels for interaction when viewed from merchant's and customer's perspective. In some examples, the multiple customers can be participating in a virtual appointment at a same time with a same merchant, but such a unique and customized URL can enable one-on-one interactions with the merchant and the customer, even though several customers may be taking the class at the same time.

As described above, in at least one example, a URL can be unique and customized for a customer so that only that customer can use the URL and, in some examples, the URL can enable bi-directional or uni-directional communication between the customer and the merchant such that the customer can ask questions to the merchant prior to, during, or after the appointment (e.g., "where can I buy yoga mats?"). In some examples, a URL can be associated with a purchase session to facilitate a transaction for an item (e.g., to purchase a yoga mat), which can occur before, during, or after a virtual appointment. That is, in some examples, payment processing functionality can be integrated into the media platform associated with the media server(s) 114 so that the customer can interact with content presented via the media platform to purchase an item (e.g., current class, future class, etc.) before, during, or after an appointment.

While FIGS. 15 and 16 are directed to identifying and/or scheduling an appointment for a customer, as described above, in some examples, the virtualization component 126 can convert appointments associated with in-person channels to online channels and vice versa, according to a predefined condition. For example, a channel of delivery of an item can switch from one channel to another based on time of day, customer preference, and/or merchant preference. The conversion can be automatic and without merchant or customer intervention, for example the conversion can also be triggered based on what other, similar merchants are currently doing.

Figure 17:
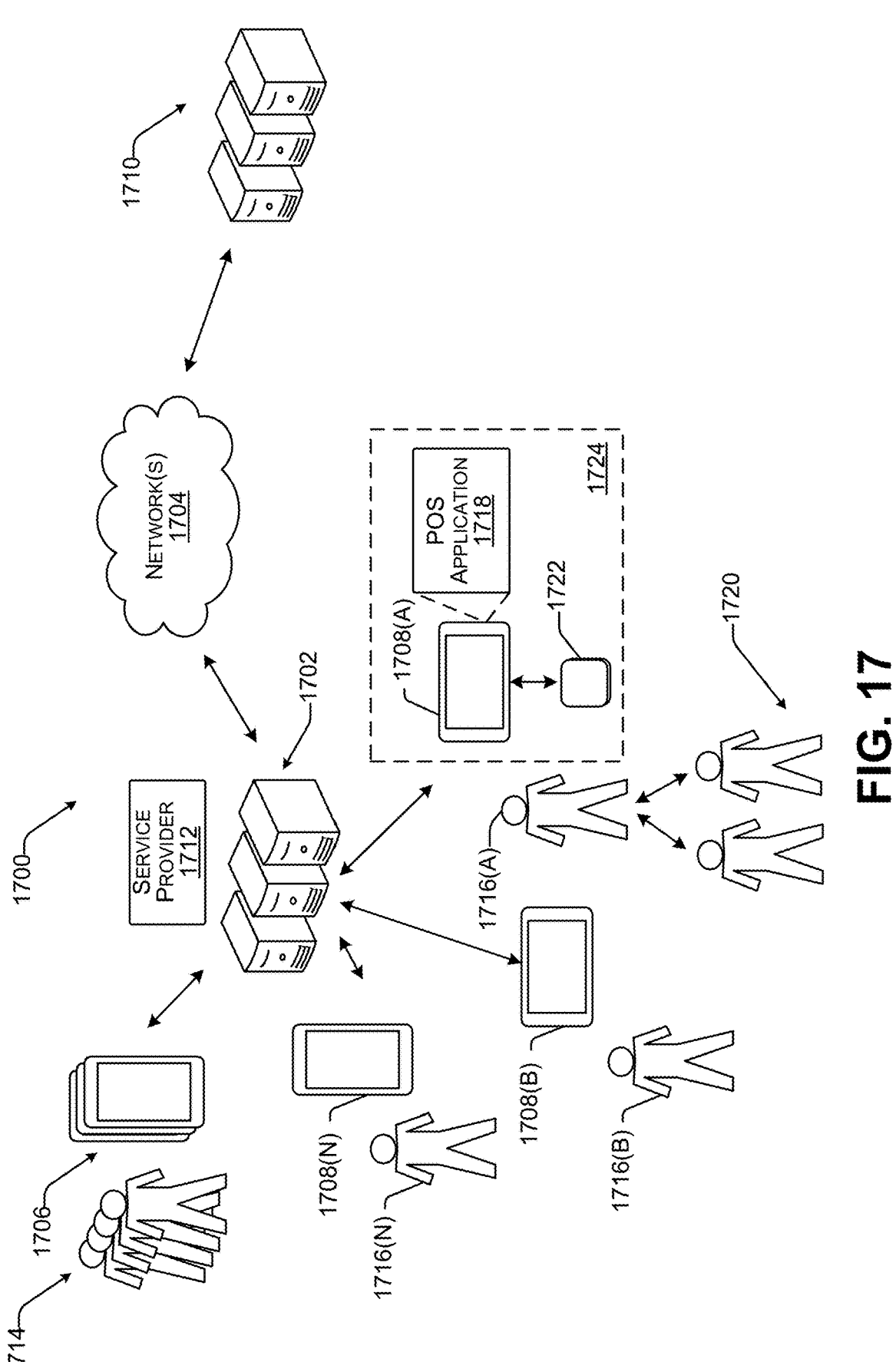
FIG. 17 illustrates an example merchant ecosystem for facilitating, among other things, techniques described herein.

FIG. 17 illustrates an example environment 1700. The environment 1700 includes server computing device(s) 1702 that can communicate over a network 1704 with user devices 1706 (which, in some examples can be merchant devices 1708 (individually, 1708(A)-1708(N))) and/or server computing device(s) 1710 associated with third-party service provider(s). The server computing device(s) 1702 can be associated with a service provider 1712 that can provide one or more services for the benefit of users 1714, as described below. Actions attributed to the service provider 1712 can be performed by the server computing device(s) 1702.

In at least one example, the server computing device(s) 1702 can correspond to the server(s) 110 of FIG. 1, the network(s) 1704 can correspond to the network(s) 112 of FIG. 1, and the user devices 1706 can correspond to the merchant device(s) 102, the merchant device 106, and/or the customer device 108 of FIG. 1.

As described, the environment 1700 can intelligently determine when to virtualize merchants and/or can effectuate virtualization. In at least one example, the environment 1700 can enable merchants and/or their customers to book appointments and conduct such appointments over a video call facilitated by a media platform (e.g., a video conferencing platform, etc.). In additional or alternative examples, the environment 1700 enable merchants to otherwise virtualize their items (e.g., goods or services), for example by identifying opportunities for merchants to bundle items for do-it-yourself kits or other projects that can be accompanied with instructions, offer workshops, or otherwise provide goods or services to customers via reduced or no-contact. As such, when merchants are required to shut down their in-person business operations, for example, due to state and local orders, health concerns, or the like, merchants no longer need to cease all business operations, and instead can leverage technology to provide items to customers via virtualization. Such techniques can therefore provide some reprieve or relief when in-person business operations are restricted and/or provide an additional commerce channel that can be leveraged by merchants to increase revenue and sales (e.g., even when in-person business operations are not restricted).

In at least one example, the service provider 1712 can offer one or more services, which can include a payment processing service, an appointments service, an employee management service, and/or the like. In some examples, the service provider 1712 can leverage data generated from use of individual services to identify opportunities for merchants to virtualize their goods and/or services. That is, in some examples, the service provider 1712 can analyze data generated from the use of individual services offered by the service provider 1712 using machine-trained models. The machine-trained models can intelligently identify items that are candidates for virtualization and/or merchants that are candidates for virtualization. In some examples, the machine-trained models can determine pricing for virtualized items, timing associated with providing virtualized items (e.g., length of virtual appointment, when to offer a workshop, etc.), platforms for providing virtualized items, or the like. As such, the service provider 1712 can generate recommendations for recommending that a merchant virtualize one or more items, pricing for such virtualized items, timing associated with offering virtualized items, platforms for virtualizing items, and the like. Thus, the environment 1700 can intelligently generate recommendations based on data generated from use of individual services availed via the service provider 1712 to identify opportunities for merchants to virtualize their goods and/or services via a customized and/or personalized process.

As described above, for the purpose of this discussion, "virtualization" can refer to offering and/or providing an item via a media platform, identifying and/or providing opportunities for merchants to bundle items for do-it-yourself kits or other projects that can be accompanied with instructions, offering and/or providing workshops, or otherwise identifying and/or offering goods or services to customers via reduced or no-contact. Based at least in part on a merchant providing an indication to virtualize their business, a location of their business, an item, or the like, the service provider 1712 can effectuate such virtualization. That is, the service provider 1712 can receive an input indicating that a merchant desires to virtualize an item and the service provider 1712 can provide end-to-end service to streamline such virtualization. As such, the environment 1700 can reduce friction traditionally associated with virtualization and can provide a better user experience for users (e.g., merchants and customers alike).

As described above, the environment 1700 can offer end-to-end virtualization of items. Such end-to-end service is available due to the distributed, network-based components of the environment 1700 and components associated therewith that are specially configured for performing operations described herein. As such, the environment 1700 can offer improvements to existing technologies at least by leveraging unconventional network configurations and specially configured components.

The environment 1700 can include a plurality of user devices 1706, as described above. Each one of the plurality of user devices 1706 can be any type of computing device such as a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IOT) device, etc. In some examples, individual ones of the user devices can be operable by users 1714. The users 1714 can be referred to as customers, buyers, merchants, sellers, borrowers, employees, employers, pavors, payees, couriers and so on. The users 1714 can interact with the user devices 1706 via user interfaces presented via the user devices 1706. In at least one example, a user interface can be presented via a web browser, or the like. In other examples, a user interface can be presented via an application, such as a mobile application or desktop application, which can be provided by the service provider 1712 or which can be an otherwise dedicated application. In some examples, individual of the user devices 1706 can have an instance or versioned instance of an application, which can be downloaded from an application store, for example, which can present the user interface(s) described herein. In at least one example, a user 1714 can interact with the user interface via touch input, spoken input, or any other type of input.

As described above, in at least one example, the users 1714 can include merchants 1716 (individually. 1716(A)-1716(N)). In an example, the merchants 1716 can operate respective merchant devices 1708, which can be user devices 1706 configured for use by merchants 1716. For the purpose of this discussion, a "merchant" can be any entity that offers items (e.g., goods or services) for purchase or other means of acquisition (e.g., rent, borrow, barter, etc.). The merchants 1716 can offer items for purchase or other means of acquisition via brick-and-mortar stores, mobile stores (e.g., pop-up shops, food trucks, etc.), online stores, combinations of the foregoing, and so forth. In some examples, at least some of the merchants 1716 can be associated with a same entity but can have different merchant locations and/or can have franchise/franchisee relationships. In additional or alternative examples, the merchants 1716 can be different merchants. That is, in at least one example, the merchant 1716(A) is a different merchant than the merchant 1716(B) and/or the merchant 1716(C).

For the purpose of this discussion. "different merchants" can refer to two or more unrelated merchants. "Different merchants" therefore can refer to two or more merchants that are different legal entities (e.g., natural persons and/or corporate persons) that do not share accounting, employees, branding, etc. "Different merchants." as used herein, have different names, employer identification numbers (EIN)s, lines of business (in some examples), inventories (or at least portions thereof), and/or the like. Thus, the use of the term "different merchants" does not refer to a merchant with various merchant locations or franchise/franchisee relationships. Such merchants—with various merchant locations or franchise/franchisee relationships—can be referred to as merchants having different merchant locations and/or different commerce channels.

Each merchant device 1708 can have an instance of a POS application 1718 stored thereon. The POS application 1718 can configure the merchant device 1708 as a POS terminal, which enables the merchant 1716(A) to interact with one or more customers 1720. As described above, the users 1714 can include customers, such as the customers 1720 shown as interacting with the merchant 1716(A). For the purpose of this discussion, a "customer" can be any entity that acquires items from merchants. While only two customers 1720 are illustrated in FIG. 17, any number of customers 1720 can interact with the merchants 1716. Further, while FIG. 17 illustrates the customers 1720 interacting with the merchant 1716(A), the customers 1720 can interact with any of the merchants 1716.

In at least one example, interactions between the customers 1720 and the merchants 1716 that involve the exchange of funds (from the customers 1720) for items (from the merchants 1716) can be referred to as "POS transactions" and/or "transactions." In at least one example, the POS application 1718 can determine transaction data associated with the POS transactions. Transaction data can include payment information, which can be obtained from a reader device 1722 associated with the merchant device 1708(A), user authentication data, purchase amount information, point-of-purchase information (e.g., item(s) purchased, date of purchase, time of purchase, etc.), etc. The POS application 1718 can send transaction data to the server computing device(s) 1702. Furthermore, the POS application 1718 can present a UI to enable the merchant 1716(A) to interact with the POS application 1718 and/or the service provider 1712 via the POS application 1718.

In at least one example, the merchant device 1708(A) can be a special-purpose computing device configured as a POS terminal (via the execution of the POS application 1718). In at least one example, the POS terminal may be connected to a reader device 1722, which is capable of accepting a variety of payment instruments, such as credit cards, debit cards, gift cards, short-range communication based payment instruments, and the like, as described below: In at least one example, the reader device 1722 can plug in to a port in the merchant device 1708(A), such as a microphone port, a headphone port, an audio-jack, a data port, or other suitable port. In additional or alternative examples, the reader device 1722 can be coupled to the merchant device 1708(A) via another wired or wireless connection, such as via a Bluetooth®, BLE, and so on. Additional details are described below with reference to FIG. 18. In some examples, the reader device 1722 can read information from alternative payment instruments including, but not limited to, wristbands and the like.

In some examples, the reader device 1722 may physically interact with payment instruments such as magnetic stripe payment cards. EMV payment cards, and/or short-range communication (e.g., near field communication (NFC), radio frequency identification (RFID). Bluetooth®, Bluetooth® low energy (BLE), etc.) payment instruments (e.g., cards or devices configured for tapping). The POS terminal may provide a rich user interface, communicate with the reader device 1722, and communicate with the server computing device(s) 1702, which can provide, among other services, a payment processing service. The server computing device(s) 1702 associated with the service provider 1712 can communicate with server computing device(s) 1710, as described below. In this manner, the POS terminal and reader device 1722 may collectively process transaction(s) between the merchants 1716 and customers 1720. In some examples, POS terminals and reader devices can be configured in one-to-one pairings. In other examples, the POS terminals and reader devices can be configured in many-to-one pairings (e.g., one POS terminal coupled to multiple reader devices or multiple POS terminals coupled to one reader device). In some examples, there could be multiple POS terminal(s) connected to a number of other devices, such as "secondary" terminals, e.g., back-of-the-house systems, printers, line-buster devices. POS readers, and the like, to allow for information from the secondary terminal to be shared between the primary POS terminal(s) and secondary terminal(s), for example via short-range communication technology. This kind of arrangement may also work in an offline-online scenario to allow one device (e.g., secondary terminal) to continue taking user input, and synchronize data with another device (e.g., primary terminal) when the primary or secondary terminal switches to online mode. In other examples, such data synchronization may happen periodically or at randomly selected time intervals.

While, the POS terminal and the reader device 1722 of the POS system 1724 are shown as separate devices, in additional or alternative examples, the POS terminal and the reader device 1722 can be part of a single device. In some examples, the reader device 1722 can have a display integrated therein for presenting information to the customers 1720. In additional or alternative examples, the POS terminal can have a display integrated therein for presenting information to the customers 1720. POS systems, such as the POS system 1724, may be mobile, such that POS terminals and reader devices may process transactions in disparate locations across the world. POS systems can be used for processing card-present transactions and card-not-present (CNP) transactions, as described below.

A card-present transaction is a transaction where both a customer 1720 and his or her payment instrument are physically present at the time of the transaction. Card-present transactions may be processed by swipes, dips, taps, or any other interaction between a physical payment instrument (e.g., a card), or otherwise present payment instrument, and a reader device 1722 whereby the reader device 1722 is able to obtain payment data from the payment instrument. A swipe is a card-present transaction where a customer 1720 slides a card, or other payment instrument, having a magnetic strip through a reader device 1722 that captures payment data contained in the magnetic strip. A dip is a card-present transaction where a customer 1720 inserts a payment instrument having an embedded microchip (i.e., chip) into a reader device 1722 first. The dipped payment instrument remains in the payment reader until the reader device 1722 prompts the customer 1720 to remove the card, or other payment instrument. While the payment instrument is in the reader device 1722, the microchip can create a one-time code which is sent from the POS system 1724 to the server computing device(s) 1710 (which can be associated with third-party service providers that provide payment services, including but not limited to, an acquirer bank, an issuer, and/or a card payment network (e.g., Mastercard®, VISA®, etc.)) to be matched with an identical one-time code. A tap is a card-present transaction where a customer 1720 may tap or hover his or her payment instrument (e.g., card, electronic device such as a smart phone running a payment application, etc.) over a reader device 1722 to complete a transaction via short-range communication (e.g., NFC, RFID, Bluetooth®, BLE, etc.). Short-range communication enables the payment instrument to exchange information with the reader device 1722. A tap may also be called a contactless payment.

A CNP transaction is a transaction where a card, or other payment instrument, is not physically present at the POS such that payment data is required to be manually keyed in (e.g., by a merchant, customer, etc.), or payment data is required to be recalled from a card-on-file data store, to complete the transaction.

The POS system 1724, the server computing device(s) 1702, and/or the server computing device(s) 1710 may exchange payment information and transaction data to determine whether transactions are authorized. For example, the POS system 1724 may provide encrypted payment data, user authentication data, purchase amount information, point-of-purchase information, etc. (collectively, transaction data) to server computing device(s) 1702 over the network(s) 1704. The server computing device(s) 1702 may send the transaction data to the server computing device(s) 1710. As described above, in at least one example, the server computing device(s) 1710 can be associated with third-party service providers that provide payment services, including but not limited to, an acquirer bank, an issuer, and/or a card payment network (e.g., Mastercard®, VISA®, etc.)

For the purpose of this discussion, the "payment service providers" can be acquiring banks ("acquirer"), issuing banks ("issuer"), card payment networks, and the like. In an example, an acquirer is a bank or financial institution that processes payments (e.g., credit or debit card payments) and can assume risk on behalf of merchants(s). An acquirer can be a registered member of a card association (e.g., Visa®, MasterCard®), and can be part of a card payment network. The acquirer (e.g., the server computing device(s) 1710 associated therewith) can send a fund transfer request to a server computing device of a card payment network (e.g., Mastercard®, VISA®, etc.) to determine whether the transaction is authorized or deficient. In at least one example, the service provider 1712 can serve as an acquirer and connect directly with the card payment network.

The card payment network (e.g., the server computing device(s) 1710 associated therewith) can forward the fund transfer request to an issuing bank (e.g., "issuer"). The issuer is a bank or financial institution that offers a financial account (e.g., credit or debit card account) to a user. An issuer can issue payment cards to users and can pay acquirers for purchases made by cardholders to which the issuing bank has issued a payment card. The issuer (e.g., the server computing device(s) 1710 associated therewith) can make a determination as to whether the customer has the capacity to absorb the relevant charge associated with the payment transaction. In at least one example, the service provider

1712 can serve as an issuer and/or can partner with an issuer. The transaction is either approved or rejected by the issuer and/or the card payment network (e.g., the server computing device(s) 1710 associated therewith), and a payment authorization message is communicated from the issuer to the POS device via a path opposite of that described above, or via an alternate path.

As described above, the server computing device(s) 1710, which can be associated with payment service provider(s), may determine whether the transaction is authorized based on the transaction data, as well as information relating to parties to the transaction (e.g., the customer 1720 and/or the merchant 1716(A)). The server computing device(s) 1710 may send an authorization notification over the network(s) 1704 to the server computing device(s) 1702, which may send the authorization notification to the POS system 1724 over the network(s) 1704 to indicate whether the transaction is authorized. The server computing device(s) 1702 may also transmit additional information such as transaction identifiers to the POS system 1724. In one example, the server computing device(s) 1702 may include a merchant application and/or other functional components for communicating with the POS system 1724 and/or the server computing device(s) 1710 to authorize or decline transactions.

Based on the authentication notification that is received by the POS system 1724 from server computing device(s) 1702, the merchant 1716(A) may indicate to the customer 1720 whether the transaction has been approved. In some examples, approval may be indicated at the POS system 1724, for example, at a display of the POS system 1724. In other examples, such as with a smart phone or watch operating as a short-range communication payment instrument, information about the approved transaction may be provided to the short-range communication payment instrument for presentation via a display of the smart phone or watch. In some examples, additional or alternative information can additionally be presented with the approved transaction notification including, but not limited to, receipts, special offers, coupons, or loyalty program information.

As mentioned above, the service provider 1712 can provide, among other services, payment processing services, inventory management services, catalog management services, business banking services, financing services, lending services, reservation management services, web-development services, payroll services, employee management services, appointment services, loyalty tracking services, restaurant management services, order management services, fulfillment services, peer-to-peer payment services, onboarding services, identity verification (IDV) services, and so on. In some examples, the users 1714 can access all of the services of the service provider 1712. In other examples, the users 1714 can have gradated access to the services, which can be based on risk tolerance, IDV outputs, subscriptions, and so on. In at least one example, access to such services can be availed to the merchants 1716 via the POS application 1718. In additional or alternative examples, each service can be associated with its own access point (e.g., application, web browser, etc.).

The service provider 1712 can offer payment processing services for processing payments on behalf of the merchants 1716, as described above. For example, the service provider 1712 can provision payment processing software, payment processing hardware and/or payment processing services to merchants 1716, as described above, to enable the merchants 1716 to receive payments from the customers 1720 when conducting POS transactions with the customers 1720. For instance, the service provider 1712 can enable the merchants 1716 to receive cash payments, payment card payments, and/or electronic payments from customers 1720 for POS transactions and the service provider 1712 can process transactions on behalf of the merchants 1716.

As the service provider 1712 processes transactions on behalf of the merchants 1716, the service provider 1712 can maintain accounts or balances for the merchants 1716 in one or more ledgers. For example, the service provider 1712 can analyze transaction data received for a transaction to determine an amount of funds owed to a merchant 1716(A) for the transaction. In at least one example, such an amount can be a total purchase price less fees charged by the service provider 1712 for providing the payment processing services. Based on determining the amount of funds owed to the merchant 1716(A), the service provider 1712 can deposit funds into an account of the merchant 1716(A). The account can have a stored balance, which can be managed by the service provider 1712. The account can be different from a conventional bank account at least because the stored balance is managed by a ledger of the service provider 1712 and the associated funds are accessible via various withdrawal channels including, but not limited to, scheduled deposit, same-day deposit, instant deposit, and a linked payment instrument.

A scheduled deposit can occur when the service provider 1712 transfers funds associated with a stored balance of the merchant 1716(A) to a bank account of the merchant 1716 (A) that is held at a bank or other financial institution (e.g., associated with the server computing device(s) 1710). Scheduled deposits can occur at a prearranged time after a POS transaction is funded, which can be a business day after the POS transaction occurred, or sooner or later. In some examples, the merchant 1716(A) can access funds prior to a scheduled deposit. For instance, the merchant 1716(A) may have access to same-day deposits (e.g., wherein the service provider 1712 deposits funds from the stored balance to a linked bank account of the merchant on a same day as POS transaction, in some examples prior to the POS transaction being funded) or instant deposits (e.g., wherein the service provider 1712 deposits funds from the stored balance to a linked bank account of the merchant on demand, such as responsive to a request). Further, in at least one example, the merchant 1716(A) can have a payment instrument that is linked to the stored balance that enables the merchant to access the funds without first transferring the funds from the account managed by the service provider 1712 to the bank account of the merchant 1716(A).

In at least one example, the service provider 1712 may provide inventory management services. That is, the service provider 1712 may provide inventory tracking and reporting. Inventory management services may enable the merchant 1716(A) to access and manage a database storing data associated with a quantity of each item that the merchant 1716(A) has available (i.e., an inventory). Furthermore, in at least one example, the service provider 1712 can provide catalog management services to enable the merchant 1716 (A) to maintain a catalog, which can be a database storing data associated with items that the merchant 1716(A) has available for acquisition (i.e., catalog management services). In at least one example, the catalog may include a plurality of data items and a data item of the plurality of data items may represent an item that the merchant 1761(A) has available for acquisition. The service provider 1712 can offer recommendations related to pricing of the items, placement of items on the catalog, and multi-party fulfilment of the inventory.

In at least one example, the service provider 1712 can provide business banking services, which allow the merchant 1716(A) to track deposits (from payment processing and/or other sources of funds) into an account of the merchant 1716(A), payroll payments from the account (e.g., payments to employees of the merchant 1716(A)), payments to other merchants (e.g., business-to-business) directly from the account or from a linked debit card, withdrawals made via scheduled deposit and/or instant deposit, etc. Furthermore, the business banking services can enable the merchant 1716(A) to obtain a customized payment instrument (e.g., credit card), check how much money they are earning (e.g., via presentation of available earned balance), understand where their money is going (e.g., via deposit reports (which can include a breakdown of fees), spend reports, etc.), access/use earned money (e.g., via scheduled deposit, instant deposit, linked payment instrument, etc.), feel in control of their money (e.g., via management of deposit schedule, deposit speed, linked instruments, etc.), etc. Moreover, the business banking services can enable the merchants 1716 to visualize their cash flow to track their financial health, set aside money for upcoming obligations (e.g., savings), organize money around goals, etc.

In at least one example, the service provider 1712 can provide financing services and products, such as via business loans, consumer loans, fixed term loans, flexible term loans, and the like. In at least one example, the service provider 1712 can utilize one or more risk signals to determine whether to extend financing offers and/or terms associated with such financing offers.

In at least one example, the service provider 1712 can provide financing services for offering and/or lending a loan to a borrower that is to be used for, in some instances, financing the borrower's short-term operational needs (e.g., a capital loan). For instance, a potential borrower that is a merchant can obtain a capital loan via a capital loan product in order to finance various operational costs (e.g., rent, payroll, inventory, etc.). In at least one example, the service provider 1712 can offer different types of capital loan products. For instance, in at least one example, the service provider 1712 can offer a daily repayment loan product, wherein a capital loan is repaid daily, for instance, from a portion of transactions processed by the payment processing service on behalf of the borrower. Additionally and/or alternatively, the service provider 1712 can offer a monthly repayment loan product, wherein a capital loan is repaid monthly, for instance, via a debit from a bank account linked to the payment processing service. The credit risk of the merchant may be evaluated using risk models that take into account factors, such as payment volume, credit risk of similarly situated merchants, past transaction history, seasonality, credit history, and so on.

Additionally or alternatively, the service provider 1712 can provide financing services for offering and/or lending a loan to a borrower that is to be used for, in some instances, financing the borrower's consumer purchase (e.g., a consumer loan). In at least one example, a borrower can submit a request for a loan to enable the borrower to purchase an item from a merchant, which can be one of the merchants 1716. The service provider 1712 can generate the loan based at least in part on determining that the borrower purchased or intends to purchase the item from the merchant. The loan can be associated with a balance based on an actual purchase price of the item and the borrower can repay the loan over time. In some examples, the borrower can repay the loan via installments, which can be paid via funds managed and/or maintained by the service provider 1712 (e.g., from payments owed to the merchant from payments processed on behalf of the merchant, funds transferred to the merchant, etc.). The service provider 1712 can offer specific financial products, such as payment instruments, tied specifically to the loan products. For example, in one implementation, the server provider 1712 associates capital to a merchant or customer's debit card, where the use of the debit card is defined by the terms of the loan. In some examples, the merchant may only use the debit card for making specific purchases. In other examples, the "installment" associated with the loan product is credited directly via the payment instrument. The payment instrument is thus customized to the loan and/or the parties associated with the loan.

The service provider 1712 can provide web-development services, which enable users 1714 who are unfamiliar with HTML, XML, Javascript, CSS, or other web design tools to create and maintain professional and aesthetically pleasing websites. Some of these web page editing applications allow users to build a web page and/or modify a web page (e.g., change, add, or remove content associated with a web page). Further, in addition to websites, the web-development services can create and maintain other online omni-channel presences, such as social media posts for example. In some examples, the resulting web page(s) and/or other content items can be used for offering item(s) for sale via an online/e-commerce platform. That is, the resulting web page(s) and/or other content items can be associated with an online store or offering by the one or more of the merchants 1716. In at least one example, the service provider 1712 can recommend and/or generate content items to supplement omni-channel presences of the merchants 1716. That is, if a merchant of the merchants 1716 has a web page, the service provider 1712—via the web-development or other services—can recommend and/or generate additional content items to be presented via other channel(s), such as social media, email, etc.

Furthermore, the service provider 1712 can provide payroll services to enable employers to pay employees for work performed on behalf of employers. In at least one example, the service provider 1712 can receive data that includes time worked by an employee (e.g., through imported timecards and/or POS interactions), sales made by the employee, gratuities received by the employee, and so forth. Based on such data, the service provider 1712 can make payroll payments to employee(s) on behalf of an employer via the payroll service. For instance, the service provider 1712 can facilitate the transfer of a total amount to be paid out for the payroll of an employee from the bank of the employer to the bank of the service provider 1712 to be used to make payroll payments. In at least one example, when the funds have been received at the bank of the service provider 1712, the service provider 1712 can pay the employee, such as by check or direct deposit, often a day, a week, or more after when the work was actually performed by the employee. In additional or alternative examples, the service provider 1712 can enable employee(s) to receive payments via same-day or instant deposit based at least in part on risk and/or reliability analyses performed by the service provider 1712.

Moreover, in at least one example, the service provider 1712 can provide employee management services for managing schedules of employees. Further, the service provider 1712 can provide appointment services for enabling users 1714 to set schedules for scheduling appointments and/or users 1714 to schedule appointments.

In some examples, the service provider 1712 can provide restaurant management services to enable users 1714 to make and/or manage reservations, to monitor front-of-house and/or back-of-house operations, and so on. In such examples, the merchant device(s) 1708 and/or server computing device(s) 1702 can be configured to communicate with one or more other computing devices, which can be located in the front-of-house (e.g., POS device(s)) and/or back-of-house (e.g., kitchen display system(s) (KDS)). In at least one example, the service provider 1712 can provide order management services and/or fulfillment services to enable restaurants to manage open tickets, split tickets, and so on and/or manage fulfillment services. In some examples, such services can be associated with restaurant merchants, as described above. In additional or alternative examples, such services can be any type of merchant.

In at least one example, the service provider 1712 can provide fulfilment services, which can use couriers for delivery, wherein couriers can travel between multiple locations to provide delivery services, photography services, etc. Couriers can be users 1714 who can travel between locations to perform services for a requesting user 1714 (e.g., deliver items, capture images, etc.). In some examples, the courier can receive compensation from the service provider 1712. The courier can employ one or more vehicles, such as automobiles, bicycles, scooters, motorcycles, buses, airplanes, helicopters, boats, skateboards, etc. Although, in other instances the courier can travel by foot or otherwise without a vehicle. Some examples discussed herein enable people to participate as couriers in a type of crowdsourced service economy. Here, essentially any person with a mobile device is able to immediately become a courier, or cease to be a courier, in a courier network that provides services as described herein. In at least one example, the couriers can be unmanned aerial vehicles (e.g., drones), autonomous vehicles, or any other type of vehicle capable of receiving instructions for traveling between locations. In some examples, the service provider 1712 can receive requests for courier services, automatically assign the requests to active couriers, and communicate dispatch instructions to couriers via user interface (e.g., application, web browser, or other access point) presented via respective devices 1706.

In some examples, the service provider 1712 can provide omni-channel fulfillment services. For instance, if a customer places an order with a merchant and the merchant cannot fulfill the order because one or more items are out of stock or otherwise unavailable, the service provider 1712 can leverage other merchants and/or sales channels that are part of the platform of the service provider 1712 to fulfill the customer's order. That is, another merchant can provide the one or more items to fulfill the order of the customer. Furthermore, in some examples, another sales channel (e.g., online, brick-and-mortar, etc.) can be used to fulfill the order of the customer.

In some examples, the service provider 1712 can enable conversational commerce via conversational commerce services, which can use one or more machine learning mechanisms to analyze messages exchanged between two or more users 1714, voice inputs into a virtual assistant or the like, to determine intents of user(s) 1714. In some examples, the service provider 1712 can utilize determined intents to automate customer service, offer promotions, provide recommendations, or otherwise interact with customers in real-time. In at least one example, the service provider 1712 can integrate products and services, and payment mechanisms into a communication platform (e.g., messaging, etc.) to enable customers to make purchases, or otherwise transact, without having to call, email, or visit a web page or other channel of a merchant. That is, conversational commerce alleviates the need for customers to toggle back and forth between conversations and web pages to gather information and make purchases.

In at least one example, the service provider 1712 can provide a peer-to-peer payment service that enables peer-to-peer payments between two or more users 1714. In at least one example, the service provider 1712 can communicate with instances of a payment application (or other access point) installed on devices 1706 configured for operation by users 1714. In an example, an instance of the payment application executing on a first device operated by a payor can send a request to the service provider 1712 to transfer an amount of funds (e.g., fiat currency or non-fiat currency such as cryptocurrency, securities, and related assets) from an account of the payor to an account of a payee (e.g., a peer-to-peer payment). The service provider 1712 can facilitate the transfer and can send a notification to an instance of the payment application executing on a second mobile device operated by the payee that the transfer is in process (or has been completed). In some examples, the service provider 1712 can send additional or alternative information to the instances of the payment application (e.g., low balance to the payor, current balance to the payor or the payee, etc.). In some implementations, the payor and/or payee can be identified automatically, e.g., based on context, proximity, prior transaction history, and so on. In other examples, the payee can send a request for funds to the payor prior to the payor initiating the transfer of funds. The funds transferred can be associated with any digital currency type, including, but not limited to, cash, cryptocurrency, etc. In some embodiments, the service provider 1712 funds the request to payee on behalf of the payor, to speed up the transfer process and compensate for any lags that may be attributed to payor's financial network.

In some implementations, the service provider 1712 can trigger the peer-to-peer payment process through identification of a "payment proxy" having a particular syntax. For example, the syntax includes a monetary currency indicator prefixing one or more alphanumeric characters (e.g., $Cash). The currency indicator operates as the tagging mechanism that indicates to a computer system to treat the inputs as a request from the sender to transfer cash, where detection of the syntax (which includes one or more alphanumeric characters tagged by a monetary currency indicator) triggers a transfer of cash. The currency indicator can correspond to various currencies including but not limited to, dollar ($), euro (€), pound (£), rupee (₹), yuan (¥), etc. Although use of the dollar currency indicator ($) is used herein, it is to be understood that any currency symbol could equally be used. The peer-to-peer process can be initiated through a particular application executing on the user devices 1706.

In some embodiments, the peer-to-peer process can be implemented within a forum context. The term "forum." as used here, refers to a content provider's media channel (e.g., a social networking platform, a microblog, a blog, video sharing platform, a music sharing platform, etc.) that enables user interaction and engagement through comments, posts, messages on electronic bulletin boards, messages on a social networking platform, and/or any other types of messages. The forum can be employed by a content provider to enable users of the forum to interact with one another. (e.g., through creating messages, posting comments, etc.). In some embodiments. "forum" may also refer to an application or webpage of an e-commerce or retail organization that offers products and/or services. Such websites can provide an online "form" to complete before or after the products or services are added to a virtual cart. The online form may include one or more fields to receive user interaction and engagement. Examples include name and other identification of the user, shipping address of the user, etc. Some of these fields may be configured to receive payment information, such as a payment proxy, in lieu of other kinds of payment mechanisms, such as credit cards, debit cards, prepaid cards, gift cards, virtual wallets, etc.

In some embodiments, the peer-to-peer process can be implemented within a communication application context, such as a messaging application context. The term "messaging application." as used here, refers to any messaging application that enables communication between users (e.g., sender and recipient of a message) over a wired or wireless communications network, through use of a communication message. The messaging application can be employed by the service provider 1712. For instance, the service provider 1712 can offer messaging services that provides a communication service to users via a messaging application (e.g., chat or messaging capability). The messaging application can include, for example, a text messaging application for communication between phones (e.g., conventional mobile telephones or smartphones), or a cross-platform instant messaging application for smartphones and phones that use the Internet for communication. The messaging application can be executed on a user device 1706 (e.g., mobile device or conventional personal computer (PC)) based on instructions transmitted to and from the server computing device(s) 1702 (which, in such an example can be called a "messaging server"). In some instances, the messaging application can include a payment application with messaging capability that enables users of the payment application to communicate with one another. In such instances, the payment application can be executed on the a user device 1706 based on instructions transmitted to and from the server computing device(s) 1702 (e.g., the payment service discussed in this description or another payment service that supports payment transactions).

In at least some embodiments, the peer-to-peer process can be implemented within a landing page context. The term "landing page," as used here, refers to a virtual location identified by a personalized location address that is dedicated to collect payments on behalf of a recipient associated with the personalized location address. The personalized location address that identifies the landing page can include a payment proxy discussed above. The service provider 1712 can generate the landing page to enable the recipient to conveniently receive one or more payments from one or more senders. In some embodiments, the personalized location address identifying the landing page is a uniform resource locator (URL) that incorporates the payment proxy. In such embodiments, the landing page is a web page, e.g., www.cash.me/$Cash.

In at least one example, a user 1714 may be new to the service provider 1712 such that the user 1714 that has not registered (e.g., subscribed to receive access to one or more services offered by the service provider) with the service provider 1712. The service provider 1712 can offer onboarding services for registering a potential user 1714 with the service provider 1712. In some examples, onboarding can involve presenting various questions, prompts, and the like to a potential user 1714 to obtain information that can be used to generate a profile for the potential user 1714. In at least one example, the service provider 1712 can provide limited or short-term access to its services prior to, or during, onboarding (e.g., a user of a peer-to-peer payment service can transfer and/or receive funds prior to being fully onboarded, a merchant can process payments prior to being fully onboarded, etc.). In at least one example, responsive to the potential user 1714 providing all necessary information, the potential user 1714 can be onboarded to the service provider 1712. In such an example, any limited or short-term access to services of the service provider 1712 can be transitioned to more permissive (e.g., less limited) or longer-term access to such services.

The service provider 1712 can be associated with IDV services, which can be used by the service provider 1712 for compliance purposes and/or can be offered as a service, for instance to third-party service providers (e.g., associated with the server computing device(s) 1710). That is, the service provider 1712 can offer IDV services to verify the identity of users 1714 seeking to use or using their services. Identity verification requires a customer (or potential customer) to provide information that is used by compliance departments to prove that the information is associated with an identity of a real person or entity. In at least one example, the service provider 1712 can perform services for determining whether identifying information provided by a user 1714 accurately identifies the customer (or potential customer) (i.e., Is the customer who they say they are?).

The service provider 1712 is capable of providing additional or alternative services and the services described above are offered as a sampling of services. In at least one example, the service provider 1712 can exchange data with the server computing device(s) 1710 associated with third-party service providers. Such third-party service providers can provide information that enables the service provider 1712 to provide services, such as those described above. In additional or alternative examples, such third-party service providers can access services of the service provider 1712. That is, in some examples, the third-party service providers can be subscribers, or otherwise access, services of the service provider 1712.

Techniques described herein can be configured to operate in both real-time/online and offline modes. "Online" modes refer to modes when devices are capable of communicating with the service provider 1712 (e.g., the server computing device(s) 1702) and/or the server computing device(s) 1710 via the network(s) 1704. In some examples, the merchant device(s) 1708 are not capable of connecting with the service provider 1712 (e.g., the server computing device(s) 1702) and/or the server computing device(s) 1710, due to a network connectivity issue, for example. In additional or alternative examples, the server computing device(s) 1702 are not capable of communicating with the server computing device(s) 1710 due to network connectivity issue, for example. In such examples, devices may operate in "offline" mode where at least some payment data is stored (e.g., on the merchant device(s) 1708) and/or the server computing device(s) 1702 until connectivity is restored and the payment data can be transmitted to the server computing device(s) 1702 and/or the server computing device(s) 1710 for processing.

In at least one example, the service provider 1712 can be associated with a hub, such as an order hub, an inventory hub, a fulfillment hub and so on, which can enable integration with one or more additional service providers (e.g., associated with the additional server computing device(s) 1710). In some examples, such additional service providers can offer additional or alternative services and the service provider 1712 can provide an interface or other computer-readable instructions to integrate functionality of the service provider 1712 into the one or more additional service providers.

Techniques described herein are directed to services provided via a distributed system of user devices 1706 that are in communication with one or more server computing devices 1702 of the service provider 1712. That is, techniques described herein are directed to a specific implementation—or, a practical application—of utilizing a distributed system of user devices 1706 that are in communication with one or more server computing devices 1702 of the service provider 1712 to perform a variety of services, as described above. The unconventional configuration of the distributed system described herein enables the server computing device(s) 1702 that are remotely-located from end-users (e.g., users 1714) to intelligently offer services based on aggregated data associated with the end-users, such as the users 1714 (e.g., data associated with multiple, different merchants and/or multiple, different buyers), in some examples, in near-real time. Accordingly, techniques described herein are directed to a particular arrangement of elements that offer technical improvements over conventional techniques for performing payment processing services and the like. For small business owners in particular, the business environment is typically fragmented and relies on unrelated tools and programs, making it difficult for an owner to manually consolidate and view such data. The techniques described herein constantly or periodically monitor disparate and distinct merchant accounts, e.g., accounts within the control of the service provider 1712, and those outside of the control of the service provider 1712, to track the business standing (payables, receivables, payroll, invoices, appointments, capital, etc.) of the merchants. The techniques herein provide a consolidated view of a merchant's cash flow, predict needs, preemptively offer recommendations or services, such as capital, coupons, etc., and/or enable money movement between disparate accounts (merchant's, another merchant's, or even payment service's) in a frictionless and transparent manner.

As described herein, artificial intelligence, machine learning, and the like can be used to dynamically make determinations, recommendations, and the like, thereby adding intelligence and context-awareness to an otherwise one-size-fits-all scheme for providing payment processing services and/or additional or alternative services described herein. In some implementations, the distributed system is capable of applying the intelligence derived from an existing user base to a new user, thereby making appointments and/or virtualization personalized and frictionless when compared to traditional onboarding methods. Thus, techniques described herein improve existing technological processes.

As described above, various graphical user interfaces (GUIs) can be presented to facilitate techniques described herein. Some of the techniques described herein are directed to user interface features presented via GUIs to improve interaction between users 1714 and user devices 1706. Furthermore, such features are changed dynamically based on the profiles of the users involved interacting with the GUIs. As such, techniques described herein are directed to improvements to computing systems.

Figure 18:
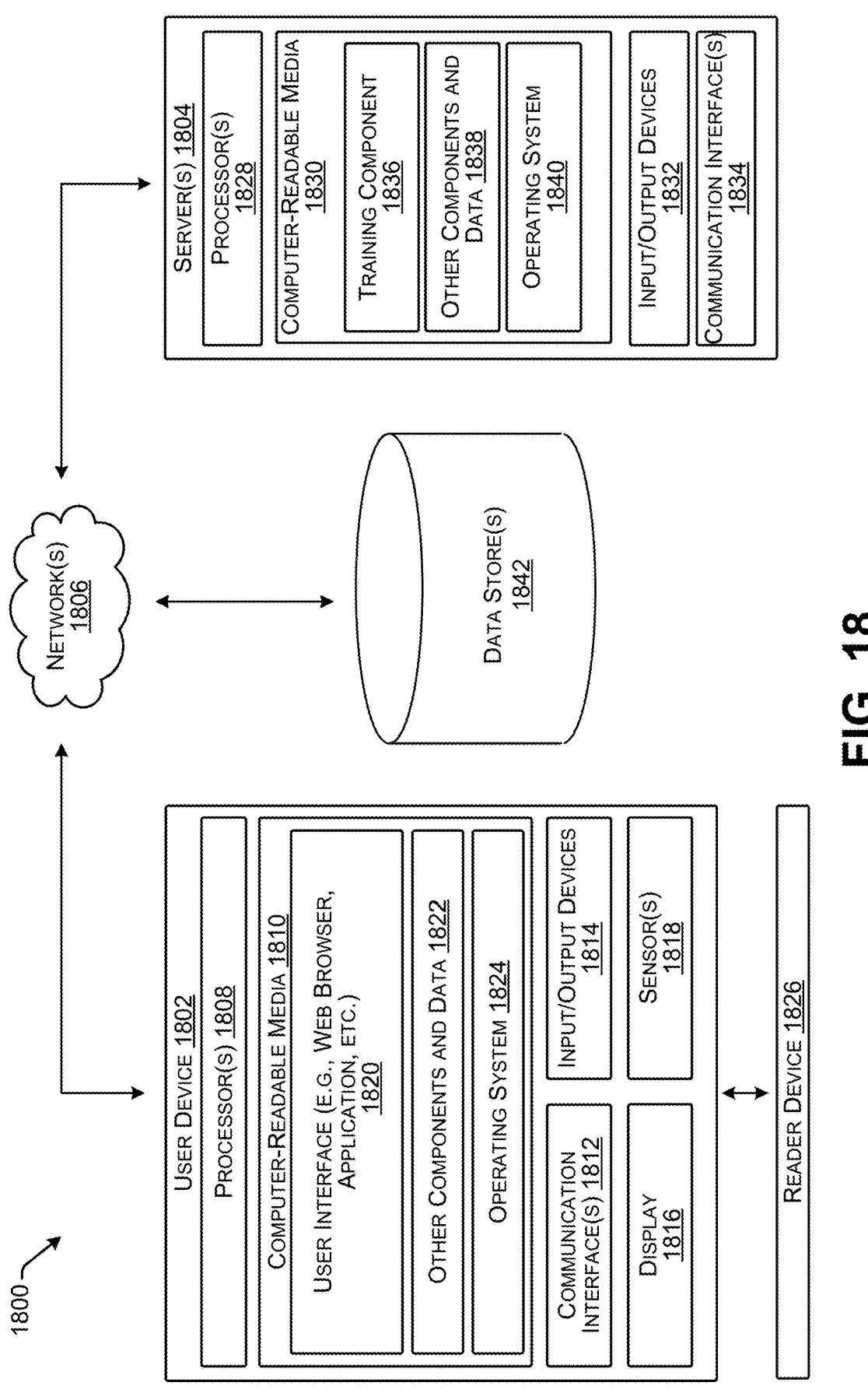
FIG. 18 illustrates additional details associated with individual components of the merchant ecosystem described above in FIG. 17.

FIG. 18 depicts an illustrative block diagram illustrating a system 1800 for performing techniques described herein. The system 1800 includes a user device 1802, that communicates with server computing device(s) (e.g., server(s) 1804) via network(s) 1806 (e.g., the Internet, cable network(s), cellular network(s), cloud network(s), wireless network(s) (e.g., Wi-Fi) and wired network(s), as well as close-range communications such as Bluetooth®, Bluetooth® low energy (BLE), and the like). While a single user device 1802 is illustrated, in additional or alternate examples, the system 1800 can have multiple user devices, as described above with reference to FIG. 17.

In at least one example, the user device 1802 can correspond to any one of the merchant device(s) 102, the merchant device 106, and/or the customer device 108 of FIG. 1, the server computing device(s) 1804 can correspond to the server(s) 110 of FIG. 1, and the network(s) 1806 can correspond to the network(s) 112 of FIG. 1.

As described, the system 1800 can intelligently determine when to virtualize merchants and/or can effectuate virtualization. In at least one example, the system 1800 can enable merchants and/or their customers to book appointments and conduct such appointments over a video call facilitated by a media platform (e.g., a video conferencing platform). In additional or alternative examples, the system 1800 enable merchants to otherwise virtualize their items (e.g., goods or services), for example by identifying opportunities for merchants to bundle items for do-it-yourself kits or other projects that can be accompanied with instructions, offer workshops, or otherwise provide goods or services to customers via reduced or no-contact. As such, when merchants are required to shut down their in-person business operations, for example, due to state and local orders, health concerns, or the like, merchants no longer need to cease all business operations, and instead can leverage technology to provide items to customers via virtualization. Such techniques can therefore provide some reprieve or relief when in-person business operations are restricted and/or provide an additional commerce channel that can be leveraged by merchants to increase revenue and sales (e.g., even when in-person business operations are not restricted).

In at least one example, the service provider 1712, described above with reference to FIG. 17 and with which the server computing device(s) 1804 are associated, can offer one or more services, which can include a payment processing service, an appointments service, an employee management service, and/or the like. In some examples, the service provider 1712 can leverage data generated from use of individual services to identify opportunities for merchants to virtualize their goods and/or services. That is, in some examples, the service provider 1712 can analyze data generated from the use of individual services offered by the service provider 1712 using machine-trained models. The machine-trained models can intelligently identify items that are candidates for virtualization and/or merchants that are candidates for virtualization. In some examples, the machine-trained models can determine pricing for virtualized items, timing associated with providing virtualized items (e.g., length of virtual appointment, when to offer a workshop, etc.), platforms for providing virtualized items, or the like. As such, the service provider 1712 can generate recommendations for recommending that a merchant virtualize one or more items, pricing for such virtualized items, timing associated with offering virtualized items, platforms for virtualizing items, and the like. Thus, the system 1800 can intelligently generate recommendations based on data generated from use of individual services availed via the service provider 1712 to identify opportunities for merchants to virtualize their goods and/or services via a customized and/or personalized process.

As described above, for the purpose of this discussion, "virtualization" can refer to offering and/or providing an item via a media platform (e.g., a video conferencing platform, etc.), identifying and/or providing opportunities for merchants to bundle items for do-it-yourself kits or other projects that can be accompanied with instructions, offering and/or providing workshops, or otherwise identifying and/or offering goods or services to customers via reduced or no-contact. Based at least in part on a merchant providing an indication to virtualize their business, a location of their business, an item, or the like, the service provider 1712 can effectuate such virtualization. That is, the service provider 1712 can receive an input indicating that a merchant desires to virtualize an item and the service provider 1712 can provide end-to-end service to streamline such virtualization. As such, the system 1800 can reduce friction traditionally associated with virtualization and can provide a better user experience for users (e.g., merchants and customers alike).

As described above, the system 1800 can offer end-to-end virtualization of items. Such end-to-end service is available due to the distributed, network-based system 1800 and components associated therewith that are specially configured for performing operations described herein. As such, the system 1800 can offer improvements to existing technologies at least by leveraging unconventional network configurations and specially configured components.

In at least one example, the user device 1802 can be any suitable type of computing device, e.g., portable, semi-portable, semi-stationary, or stationary. Some examples of the user device 1802 can include, but are not limited to, a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. That is, the user device 1802 can be any computing device capable of sending communications and performing the functions according to the techniques described herein. The user device 1802 can include devices, e.g., payment card readers, or components capable of accepting payments, as described below.

In the illustrated example, the user device 1802 includes one or more processors 1808, one or more computer-readable media 1810, one or more communication interface (s) 1817, one or more input/output (I/O) devices 1814, a display 1816, and sensor(s) 1818.

In at least one example, each processor 1808 can itself comprise one or more processors or processing cores. For example, the processor(s) 1808 can be implemented as one or more microprocessors, microcomputers, microcontrollers, digital signal processors, central processing units, state machines, logic circuitries, and/or any devices that manipulate signals based on operational instructions. In some examples, the processor(s) 1808 can be one or more hardware processors and/or logic circuits of any suitable type specifically programmed or configured to execute the algorithms and processes described herein. The processor(s) 1808 can be configured to fetch and execute computer-readable processor-executable instructions stored in the computer-readable media 1810.

Depending on the configuration of the user device 1802, the computer-readable media 1810 can be an example of tangible non-transitory computer storage media and can include volatile and nonvolatile memory and/or removable and non-removable media implemented in any type of technology for storage of information such as computer-readable processor-executable instructions, data structures, program components or other data. The computer-readable media 1810 can include, but is not limited to, RAM, ROM, EEPROM, flash memory, solid-state storage, magnetic disk storage, optical storage, and/or other computer-readable media technology. Further, in some examples, the user device 1802 can access external storage, such as RAID storage systems, storage arrays, network attached storage, storage area networks, cloud storage, or any other medium that can be used to store information and that can be accessed by the processor(s) 1808 directly or through another computing device or network. Accordingly, the computer-readable media 1810 can be computer storage media able to store instructions, components or components that can be executed by the processor(s) 1808. Further, when mentioned, non-transitory computer-readable media exclude media such as energy, carrier signals, electromagnetic waves, and signals per se.

The computer-readable media 1810 can be used to store and maintain any number of functional components that are executable by the processor(s) 1808. In some implementations, these functional components comprise instructions or programs that are executable by the processor(s) 1808 and that, when executed, implement operational logic for performing the actions and services attributed above to the user device 1802. Functional components stored in the computer-readable media 1810 can include a user interface 1820 to enable users to interact with the user device 1802, and thus the server(s) 1804 and/or other networked devices. In at least one example, the user interface 1820 can be presented via a web browser, or the like. In other examples, the user interface 1820 can be presented via an application, such as a mobile application or desktop application, which can be provided by a service provider 1712 associated with the server(s) 1804, or which can be an otherwise dedicated application. In some examples, the user interface 1820 can be merchant-facing user interface 116 or the customer-facing user interface 118, as described above with reference to FIG. 1. In at least one example, a user can interact with the user interface via touch input, spoken input, gesture, or any other type of input. The word "input" is also used to describe "contextual" input that may not be directly provided by the user via the user interface 1820. For example, user's interactions with the user interface 1820 are analyzed using, e.g., natural language processing techniques, to determine context or intent of the user, which may be treated in a manner similar to "direct" user input.

Depending on the type of the user device 1802, the computer-readable media 1810 can also optionally include other functional components and data, such as other components and data 1822, which can include programs, drivers, etc., and the data used or generated by the functional components. In addition, the computer-readable media 1810 can also store data, data structures and the like, that are used by the functional components. Further, the user device 1802 can include many other logical, programmatic and physical components, of which those described are merely examples that are related to the discussion herein.

In at least one example, the computer-readable media 1810 can include additional functional components, such as an operating system 1824 for controlling and managing various functions of the user device 1802 and for enabling basic user interactions.

The communication interface(s) 1817 can include one or more interfaces and hardware components for enabling communication with various other devices, such as over the network(s) 1806 or directly. For example, communication interface(s) 1817 can enable communication through one or more network(s) 1806, which can include, but are not limited any type of network known in the art, such as a local area network or a wide area network, such as the Internet, and can include a wireless network, such as a cellular network, a cloud network, a local wireless network, such as Wi-Fi and/or close-range wireless communications, such as Bluetooth®, BLE, NFC, RFID, a wired network, or any other such network, or any combination thereof. Accordingly, network(s) 1806 can include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

Embodiments of the disclosure may be provided to users through a cloud computing infrastructure. Cloud computing refers to the provision of scalable computing resources as a service over a network, to enable convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud." without regard for the underlying physical systems (or locations of those systems) used to provide the computing resources.

The user device 1802 can further include one or more input/output (I/O) devices 1814. The I/O devices 1814 can include speakers, a microphone, a camera, and various user controls (e.g., buttons, a joystick, a keyboard, a keypad, etc.), a haptic output device, and so forth. The I/O devices 1814 can also include attachments that leverage the accessories (audio-jack, USB-C, Bluetooth, etc.) to connect with the user device 1802.

In at least one example, user device 1802 can include a display 1816. Depending on the type of computing device(s) used as the user device 1802, the display 1816 can employ any suitable display technology. For example, the display 1816 can be a liquid crystal display, a plasma display, a light emitting diode display, an OLED (organic light-emitting diode) display, an electronic paper display, or any other suitable type of display able to present digital content thereon. In at least one example, the display 1816 can be an augmented reality display, a virtually reality display, or any other display able to present and/or project digital content. In some examples, the display 1816 can have a touch sensor associated with the display 1816 to provide a touchscreen display configured to receive touch inputs for enabling interaction with a graphic interface presented on the display 1816. Accordingly, implementations herein are not limited to any particular display technology. Alternatively, in some examples, the user device 1802 may not include the display 1816, and information can be presented by other means, such as aurally, haptically, etc.

In addition, the user device 1802 can include sensor(s) 1818. The sensor(s) 1818 can include a GPS device able to indicate location information. Further, the sensor(s) 1818 can include, but are not limited to, an accelerometer, gyroscope, compass, proximity sensor, camera, microphone, and/or a switch.

In some example, the GPS device can be used to identify a location of a user. In at least one example, the location of the user can be used by the service provider 1712, described above, to provide one or more services. That is, in some examples, the service provider 1712 can implement geofencing to provide particular services to users. As an example, with a lending service, location can be used to confirm that a stated purpose of a loan corresponds to evidence of use (e.g., Is the user using the loan consistent with what he or she said he or she was going to use it for?). Furthermore, in some examples, location can be used for payroll purposes. As an example, if a contractor completes a project, the contractor can provide a geo-tagged image (e.g., tagged based on location information availed by the GPS device). In some examples, location can be used for facilitating peer-to-peer payments between nearby users 1714 and/or for sending users 1714 notifications regarding available appointments with merchant(s) located proximate to the users 1714. In at least one example, location can be used for taking payments from nearby customers when they leave a geofence, or location can be used to initiate an action responsive to users 1714 enter a brick-and-mortar store of a merchant. Location can be used in additional or alternative ways as well.

Additionally, the user device 1802 can include various other components that are not shown, examples of which include removable storage, a power source, such as a battery and power control unit, a barcode scanner, a printer, a cash drawer, and so forth.

In addition, in some examples, the user device 1802 can include, be connectable to, or otherwise be coupled to a reader device 1826, for reading payment instruments and/or identifiers associated with payment objects. In some examples, as described above, the reader device 1826 can plug in to a port in the user device 1802, such as a microphone port, a headphone port, an audio-jack, a data port, or other suitable port. In additional or alternative examples, the reader device 1826 can be coupled to the user device 1802 via another wired or wireless connection, such as via a Bluetooth®, BLE, and so on. The reader device 1826 can include a read head for reading a magnetic strip of a payment card, and further can include encryption technology for encrypting the information read from the magnetic strip. Additionally or alternatively, the reader device 1826 can be an EMV payment reader, which in some examples, can be embedded in the user device 1802. Moreover, numerous other types of readers can be employed with the user device 1802 herein, depending on the type and configuration of the user device 1802.

The reader device 1826 may be a portable magnetic stripe card reader, optical scanner, smartcard (card with an embedded IC chip) reader (e.g., an EMV-compliant card reader or short-range communication-enabled reader). RFID reader, or the like, configured to detect and obtain data off any payment instrument. Accordingly, the reader device 1826 may include hardware implementation, such as slots, magnetic tracks, and rails with one or more sensors or electrical contacts to facilitate detection and acceptance of a payment instrument. That is, the reader device 1826 may include hardware implementations to enable the reader device 1826 to interact with a payment instrument via a swipe (i.e., a card-present transaction where a customer slides a card having a magnetic strip through a payment reader that captures payment data contained in the magnetic strip), a dip (i.e., a card-present transaction where a customer inserts a card having an embedded microchip (i.e., chip) into a payment reader first until the payment reader prompts the customer to remove the card), or a tap (i.e., a card-present transaction where a customer may tap or hover his or her electronic device such as a smart phone running a payment application over a payment reader to complete a transaction via short-range communication) to obtain payment data associated with a customer. Additionally or optionally, the reader device 1826 may also include a biometric sensor to receive and process biometric characteristics and process them as payment instruments, given that such biometric characteristics are registered with the service provider 1712 and connected to a financial account with a bank server.

The reader device 1826 may include processing unit(s), computer-readable media, a reader chip, a transaction chip, a timer, a clock, a network interface, a power supply, and so on. The processing unit(s) of the reader device 1826 may execute one or more components and/or processes to cause the reader device 1826 to perform a variety of functions, as set forth above and explained in further detail in the following disclosure. In some examples, the processing unit(s) may include a central processing unit (CPU), a graphics processing unit (GPU), a CPU and a GPU, or processing units or components known in the art. Additionally, each of the processing unit(s) may possess its own local memory, which also may store program components, program data, and/or one or more operating systems. Depending on the exact configuration and type of the reader device 1826, the computer-readable media may include volatile memory (such as RAM), non-volatile memory (such as ROM, flash memory, miniature hard drive, memory card, or the like), or some combination thereof. In at least one example, the computer-readable media of the reader device 1826 may include at least one component for performing various functions as described herein.

The reader chip may perform functionalities to control the operations and processing of the reader device 1826. That is, the reader chip may perform functionalities to control payment interfaces (e.g., a contactless interface, a contact interface, etc.), a wireless communication interface, a wired interface, a user interface (e.g., a signal condition device (FPGA)), etc. Additionally, the reader chip may perform functionality to control the timer, which may provide a timer signal indicating an amount of time that has lapsed following a particular event (e.g., an interaction, a power-down event, etc.). Moreover, the reader chip may perform functionality to control the clock 186, which may provide a clock signal indicating a time. Furthermore, the reader chip may perform functionality to control the network interface, which may interface with the network(s) 1806, as described below:

Additionally, the reader chip may perform functionality to control the power supply. The power supply may include one or more power supplies such as a physical connection to AC power or a battery. Power supply may include power conversion circuitry for converting AC power and generating a plurality of DC voltages for use by components of reader device 1826. When power supply includes a battery, the battery may be charged via a physical power connection, via inductive charging, or via any other suitable method.

The transaction chip may perform functionalities relating to processing of payment transactions, interfacing with payment instruments, cryptography, and other payment-specific functionality. That is, the transaction chip may access payment data associated with a payment instrument and may provide the payment data to a POS terminal, as described above. The payment data may include, but is not limited to, a name of the customer, an address of the customer, a type (e.g., credit, debit, etc.) of a payment instrument, a number associated with the payment instrument, a verification value (e.g., PIN Verification Key Indicator (PVKI), PIN Verification Value (PVV). Card Verification Value (CVV). Card Verification Code (CVC), etc.) associated with the payment instrument, an expiration data associated with the payment instrument, a primary account number (PAN) corresponding to the customer (which may or may not match the number associated with the payment instrument), restrictions on what types of charges/debts may be made, etc. Additionally, the transaction chip may encrypt the payment data upon receiving the payment data.

It should be understood that in some examples, the reader chip may have its own processing unit(s) and computer-readable media and/or the transaction chip may have its own processing unit(s) and computer-readable media. In other examples, the functionalities of reader chip and transaction chip may be embodied in a single chip or a plurality of chips, each including any suitable combination of processing units and computer-readable media to collectively perform the functionalities of reader chip and transaction chip as described herein.

While, the user device 1802, which can be a POS terminal, and the reader device 1826 are shown as separate devices, in additional or alternative examples, the user device 1802 and the reader device 1826 can be part of a single device, which may be a battery-operated device. In such an example, components of both the user device 1802 and the reader device 1826 may be associated with the single device. In some examples, the reader device 1826 can have a display integrated therewith, which can be in addition to (or as an alternative of) the display 1816 associated with the user device 1802.

The server(s) 1804 can include one or more servers or other types of computing devices that can be embodied in any number of ways. For example, in the example of a server, the components, other functional components, and data can be implemented on a single server, a cluster of servers, a server farm or data center, a cloud-hosted computing service, a cloud-hosted storage service, and so forth, although other computer architectures can additionally or alternatively be used.

Further, while the figures illustrate the components and data of the server(s) 1804 as being present in a single location, these components and data can alternatively be distributed across different computing devices and different locations in any manner. Consequently, the functions can be implemented by one or more server computing devices, with the various functionality described above distributed in various ways across the different computing devices. Multiple server(s) 1804 can be located together or separately, and organized, for example, as virtual servers, server banks and/or server farms. The described functionality can be provided by the servers of a single merchant or enterprise, or can be provided by the servers and/or services of multiple different customers or enterprises.

In the illustrated example, the server(s) 1804 can include one or more processors 1828, one or more computer-readable media 1830, one or more I/O devices 1832, and one or more communication interfaces 1834. Each processor 1828 can be a single processing unit or a number of processing units, and can include single or multiple computing units or multiple processing cores. The processor(s) 1828 can be implemented as one or more microprocessors, microcomputers, microcontrollers, digital signal processors, central processing units, state machines, logic circuitries, and/or any devices that manipulate signals based on operational instructions. For example, the processor(s) 1828 can be one or more hardware processors and/or logic circuits of any suitable type specifically programmed or configured to execute the algorithms and processes described herein. The processor(s) 1828 can be configured to fetch and execute computer-readable instructions stored in the computer-readable media 1830, which can program the processor(s) 1828 to perform the functions described herein.

The computer-readable media 1830 can include volatile and nonvolatile memory and/or removable and non-removable media implemented in any type of technology for storage of information, such as computer-readable instructions, data structures, program components, or other data. Such computer-readable media 1830 can include, but is not limited to, RAM, ROM, EEPROM, flash memory or other memory technology, optical storage, solid state storage, magnetic tape, magnetic disk storage. RAID storage systems, storage arrays, network attached storage, storage area networks, cloud storage, or any other medium that can be used to store the desired information and that can be accessed by a computing device. Depending on the configuration of the server(s) 1804, the computer-readable media 1830 can be a type of computer-readable storage media and/or can be a tangible non-transitory media to the extent that when mentioned, non-transitory computer-readable media exclude media such as energy, carrier signals, electromagnetic waves, and signals per se.

The computer-readable media 1830 can be used to store any number of functional components that are executable by the processor(s) 1828. In many implementations, these functional components comprise instructions or programs that are executable by the processors 1828 and that, when executed, specifically configure the one or more processors 1828 to perform the actions attributed above to the service provider 1712 and/or payment processing service. Functional components stored in the computer-readable media 1830 can optionally include a merchant component 1836, a training component 1838, and one or more other components and data 1840.

The merchant component 1836 can be configured to receive transaction data from POS systems, such as the POS system 1724 described above with reference to FIG. 17. The merchant component 1836 can transmit requests (e.g., authorization, capture, settlement, etc.) to payment service server computing device(s) to facilitate POS transactions between merchants and customers. The merchant component 1836 can communicate the successes or failures of the POS transactions to the POS systems.

The training component 1838 can be configured to train models using machine-learning mechanisms. For example, a machine-learning mechanism can analyze training data to train a data model that generates an output, which can be a recommendation, a score, and/or another indication. Machine-learning mechanisms can include, but are not limited to supervised learning algorithms (e.g., artificial neural networks. Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc.), statistical models, etc. In at least one example, machine-trained data models can be stored in a datastore associated with the user device(s) 1802 and/or the server(s) 1804 for use at a time after the data models have been trained (e.g., at runtime).

The one or more other components and data 1840 can include the appointment component 120, the payment processing component 122, the recommendation component 124, and/or the virtualization component 126, the functionality of which is described, at least partially, above. Further, the one or more other components and data 1840 can include programs, drivers, etc., and the data used or generated by the functional components. Further, the server(s) 1804 can include many other logical, programmatic and physical components, of which those described above are merely examples that are related to the discussion herein.

The one or more "components" referenced herein may be implemented as more components or as fewer components, and functions described for the components may be redistributed depending on the details of the implementation. The term "component." as used herein, refers broadly to software stored on non-transitory storage medium (e.g., volatile or non-volatile memory for a computing device), hardware, or firmware (or any combination thereof) components. Components are typically functional such that they that may generate useful data or other output using specified input(s). A component may or may not be self-contained. An application program (also called an "application") may include one or more components, or a component may include one or more application programs that can be accessed over a network or downloaded as software onto a device (e.g., executable code causing the device to perform an action). An application program (also called an "application") may include one or more components, or a component may include one or more application programs. In additional and/or alternative examples, the component(s) may be implemented as computer-readable instructions, various data structures, and so forth via at least one processing unit to configure the computing device(s) described herein to execute instructions and to perform operations as described herein.

In some examples, a component may include one or more application programming interfaces (APIs) to perform some or all of its functionality (e.g., operations). In at least one example, a software developer kit (SDK) can be provided by the service provider to allow third-party developers to include service provider functionality and/or avail service provider services in association with their own third-party applications. Additionally or alternatively, in some examples, the service provider can utilize a SDK to integrate third-party service provider functionality into its applications. That is, API(s) and/or SDK(s) can enable third-party developers to customize how their respective third-party applications interact with the service provider or vice versa.

The computer-readable media 1830 can additionally include an operating system 1840 for controlling and managing various functions of the server(s) 1804.

The communication interface(s) 1834 can include one or more interfaces and hardware components for enabling communication with various other devices, such as over the network(s) 1806 or directly. For example, communication interface(s) 1834 can enable communication through one or more network(s) 1806, which can include, but are not limited any type of network known in the art, such as a local area network or a wide area network, such as the Internet, and can include a wireless network, such as a cellular network, a local wireless network, such as Wi-Fi and/or close-range wireless communications, such as Bluetooth®, BLE, NFC, RFID, a wired network, or any other such network, or any combination thereof. Accordingly, network(s) 1806 can include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

The server(s) 1804 can further be equipped with various I/O devices 1832. Such I/O devices 1832 can include a display, various user interface controls (e.g., buttons, joystick, keyboard, mouse, touch screen, biometric or sensory input devices, etc.), audio speakers, connection ports and so forth.

In at least one example, the system 1800 can include a data store(s) 1842 that can be configured to store data that is accessible, manageable, and updatable. In at least one example, the data store(s) 1842 can correspond to the data store(s) 128, described above with reference to FIG. 1. In some examples, the data store(s) 1842 can be integrated with the user device 1802 and/or the server(s) 1804. In other examples, as shown in FIG. 18, the data store(s) 1842 can be located remotely from the server(s) 1804 and can be accessible to the server(s) 1804. The data store(s) 1842 can comprise multiple databases and/or servers connected locally and/or remotely via the network(s) 1806.

In at least one example, the data store(s) 1842 can store user profiles, which can include merchant profiles, customer profiles, and so on, as described above.

Furthermore, in at least one example, the data store(s) 1842 can store inventory data and/or catalog data. As described above, an inventory can store data associated with a quantity of each item that a merchant has available to the merchant. Furthermore, a catalog can store data associated with items that a merchant has available for acquisition. The data store(s) 1842 can store additional or alternative types of data as described herein.

The phrases "in some examples," "according to various examples," "in the examples shown," "in one example," "in other examples," "various examples," "some examples," and the like generally mean the particular feature, structure, or characteristic following the phrase is included in at least one example of the present invention, and may be included in more than one example of the present invention. In addition, such phrases do not necessarily refer to the same examples or to different examples.

If the specification states a component or feature "can," "may," "could," or "might" be included or have a characteristic, that particular component or feature is not required to be included or have the characteristic.

Further, the aforementioned description is directed to devices and applications that are related to payment technology. However, it will be understood, that the technology can be extended to any device and application. Moreover, techniques described herein can be configured to operate irrespective of the kind of payment object reader. POS terminal, web applications, mobile applications. POS topologies, payment cards, computer networks, and environments.

Various figures included herein are flow charts showing example methods involving techniques as described herein. The methods illustrated are described with reference to FIGS. 1, 17, and 18 for convenience and ease of understanding. However, the methods illustrated are not limited to being performed using components described in FIGS. 1, 17, and 18, and such components are not limited to performing the methods illustrated herein.

Furthermore, the methods described above are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process can be omitted entirely. Moreover, the methods can be combined in whole or in part with each other or with other methods.

Example Clauses

A. A method, implemented at least in part by a server computing device associated with a service provider, comprising: receiving, from merchant devices operable by merchants associated with the service provider, transaction data associated with transactions processed on behalf of the merchants by a payment processing service available via the service provider; determining, based on a transaction history associated with the transaction data and a characteristic of a merchant, that the merchant is a candidate for providing virtual services instead of, or in addition to, in-person services: sending, to a merchant device operable by the merchant, a recommendation to virtualize at least one service offered by the merchant, wherein the recommendation is presented via a merchant-facing user interface that includes a user interface element to allow the merchant to virtualize the at least one service: receiving, from the merchant device and based at least in part on sending the recommendation to the merchant device, a request to virtualize the at least one service: and based at least in part on receiving the request, associating an indication that the at least one service is available as a virtual service with an indication of the at least one service.

B. The method as clause A recites, further comprising, based at least in part on receiving the request to virtualize the at least one service: accessing a uniform resource locator (URL) associated with a media platform; and associating the URL with at least one of an indication of the merchant or an indication of the service in a data store associated with the server computing device.

C. The method as clause B recites, further comprising: receiving, from a customer device of a customer, an appointment request to schedule an appointment for the virtual service via an appointment service associated with the service provider; and sending, to the customer device, a notification of the appointment that includes either the URL or a custom URL and at least one detail associated with the appointment, wherein actuation of the URL or the custom URL enables the customer to access the virtual service from the merchant via the media platform, wherein the custom URL is configured to enable bi-directional communication between the merchant and the customer.

D. The method as any of clauses A-C recites, further comprising: identifying, based at least in part on employment data associated with a merchant, one or more employees of the merchant that provide the at least one service; accessing one or more uniform resource locators (URLs) associated with a media platform; and associating an indication of an employee of the one or more employees with a URL of the one or more URLs in a data store associated with the server computing device.

E. The method as clause D recites, further comprising: receiving, from a customer device of a customer, an appointment request to schedule an appointment for the virtual service via an appointment service associated with the service provider, wherein the appointment request is associated with the employee; and sending, to the customer device, a notification of the appointment that includes the URL that corresponds to the employee and at least one detail associated with the appointment, wherein actuation of the URL enables at least the customer to access the virtual service from the employee via the media platform.

F. The method as clause E recites, further comprising: causing a customer-facing user interface to be presented via the customer device, wherein the customer-facing user interface includes indications of the one or more employees that provide the service; and receiving the appointment request based at least in part on causing the customer-facing user interface to be presented via the customer device, wherein the appointment request is in association with an existing in-person appointment and wherein the request for the virtual service is for converting the existing in-person appointment to a virtual appointment.

G. A system comprising: one or more processors: and one or more computer-readable media storing instructions that, when executed by the one or more processors, cause the system to perform operations comprising: receiving, from one or more merchant devices operable by one or more merchants associated with a service provider, interaction data indicative of one or more interactions between the one or more merchants and a service provider: accessing inventory data of a merchant of the one or more merchants; determining, based at least in part on the interaction data and the inventory data, whether the merchant is a candidate for virtualization: and sending, to a merchant device operable by the merchant, a recommendation to virtualize an item based at least in part on the determining.

H. The system as clause G recites, wherein virtualizing an item comprises at least one of: offering the item as a virtual service via a media platform; offering the item via a workshop with one or more customers; or determining a bundle of items, including the item, to offer as a kit with instructions for assembling the bundle of items into another item.

I. The system as clause G or H recites, wherein the interaction data comprises at least one of: transaction data associated with one or more transactions processed on behalf of the one or more merchants by a payment processing service available via the service provider; or appointment data associated with one or more appointments scheduled with the one or more merchants using an appointment service available via the service provider.

J. The system as any of clauses G-I recites, wherein determining whether the merchant is a candidate for virtualization is further based at least in part on a characteristic of the merchant.

K. The system as clause J recites, wherein the characteristic comprises at least one of a merchant category code, a geolocation of the merchant, a transaction history, an appointment history, or a sales trend.

L. The system as any of clauses G-K recites, wherein the recommendation is presented via a merchant-facing user interface that includes a user interface element to allow the merchant to virtualize the item.

M. The system as clause L recites, the operations further comprising: receiving, from the merchant device and based at least in part on sending the recommendation to the merchant device, a request to virtualize the item: and based at least in part on receiving the request, associating an indication that the item is virtualized with an indication of the item in a data store associated with the system.

N. The system as any of clauses G-M recites, further comprising: receiving, from the merchant device, a request to virtualize the merchant; associating a setting with a merchant profile of the merchant indicating virtualization of the merchant; converting an in-person appointment scheduled with the merchant into a virtual appointment; and sending, to a customer device operable by a customer associated with the appointment an indication that the in-person appointment has been converted in to the virtual appointment, wherein the indication includes a uniform resource locator (URL) for accessing a media platform.

O. One or more computer-readable media storing instructions that, when executed by one or more processors, cause the one or more processors to perform operations comprising: receiving, from one or more merchant devices operable by one or more merchants associated with a service provider, interaction data indicative of one or more interactions between the one or more merchants and a service provider; accessing inventory data of a merchant of the one or more merchants; determining, based at least in part on the interaction data and the inventory data, whether the merchant is a candidate for virtualization; and sending, to a merchant device operable by the merchant and based at least in part on the determining, a recommendation to virtualize an item, wherein the recommendation is presented via a merchant-facing user interface that includes a first user interface element to allow the merchant to virtualize the item.

P. The one or more computer-readable media as clause O recites, the operations further comprising: receiving, from the merchant device and based at least in part on sending the recommendation to the merchant device, a request to virtualize the item; and based at least in part on receiving the request, associating an indication that the item is virtualized with an indication of the item in a data store associated with the service provider.

Q. The one or more computer-readable media as clause P recites, the operations further comprising: accessing, from a data store associated with the service provider, customer data associated with one or more customers that have transacted with the one or more merchants; identifying at least one customer as a candidate for the virtualized item; and sending, to a customer device operable by the customer, a notification that the item is virtualized, wherein the notification, when presented via a customer-facing user interface, includes a second user interface element to enable the customer to at least one of schedule or purchase the virtualized item.

R. The one or more computer-readable media as clause Q recites, wherein the virtualized item is a virtualized service available via a media platform, the operations further comprising: accessing a uniform resource locator (URL) associated with the media platform; and sending the URL to the customer device in association with at least one of an appointment, a reminder of an upcoming appointment, or a receipt, wherein actuation of the URL enables the customer to access the service from the merchant via the media platform.

S. The one or more computer-readable media as any of clauses P-R recites, wherein the virtualized item is a service available via a media platform, the operations further comprising: receiving, from at least two customer devices operable by at least two customers, at least two requests for the virtualized service, wherein the at least two requests are associated with a same period of time during which the virtualized service is to be provided; modifying an electronic calendar of a merchant to enable multiple customers to schedule an appointment at the same period of time; accessing a uniform resource locator (URL) associated with the media platform; and sending the URL to the at least two customer devices in association with at least one of an appointment, a reminder of an upcoming appointment, or a receipt, wherein actuation of the URL enables the at least two customers to access the service from the merchant via the media platform and during the same period of time.

T. The one or more computer-readable media as any of clauses O-S recites, the operations further comprising: determining, based at least in part on a portion of the interaction data associated with at least one other merchant that is different than the merchant, at least one of a price associated with virtualizing the item, a timing associated with offering the virtualized item, or a platform for offering the virtualized item; and sending an indication of at least one of the price, the timing, or the platform with the recommendation.

While the example clauses described above are described with respect to one particular implementation, it should be understood that, in the context of this document, the content of the example clauses can also be implemented via a method, device, system, a computer-readable medium, and/or another implementation. Additionally, any of example clauses A-T may be implemented alone or in combination with any other one or more of the example clauses A-T.

What is claimed is:

1. A system comprising:

one or more processors; and one or more non-transitory computer-readable media storing instructions that, when executed by the one or more processors, cause the system to perform operations comprising:

receiving, by a server computing device associated with a service provider, interaction data indicative of one or more interactions between one or more merchants and the service provider via a network, wherein the interaction data comprises transaction data;

processing, by the server computing device, and based at least in part on the transaction data, payments for one or more transactions associated with the transaction data;

accessing, by the server computing device and from a data store associated with the system, inventory data of a merchant of the one or more merchants;

determining, by the server computing device and based at least in part on the interaction data and the inventory data, that the merchant is a candidate for conversion between different types of appointments, wherein the different types of appointments comprise in-person and virtual;

identifying, by the server computing device, one or more appointments associated with the merchant;

determining, by the server computing device, that an appointment of the one or more appointments is a first type of appointment, wherein the first type is one of in-person or virtual;

causing, by the server computing device, presentation of a user interface on a customer device operable by a customer associated with the appointment, wherein the user interface includes a toggle switch, and wherein user input to the toggle switch comprises a request to convert the appointment from the first type of appointment to a second type of appointment, wherein the second type is a different one of in-person or virtual than the first type; and based at least in part on receiving an indication of the user input to the toggle switch:

converting, by the server computing device, the appointment to the second type of appointment; and causing, by the server computing device, presentation of an updated user interface on the customer device, wherein the updated user interface includes information associated with the appointment.

2. The system of claim 1, wherein determining that the merchant is the candidate for conversion is based at least in part on one or more predefined conditions, wherein the one or more predefined conditions comprise availability of the one or more appointments, time of day, customer preference, or merchant preference.

3. The system of claim 1, wherein the first type of appointment is in-person, the second type of appointment is virtual, and wherein converting the appointment to the second type of appointment comprises at least one of:

offering a virtual service via a media platform;

offering a workshop with one or more customers; or determining a bundle of items to offer as a kit with assembly instructions for assembling the bundle of items into another item.

4. The system of claim 1, wherein the interaction data further comprises appointment data associated with a plurality of appointments scheduled with the one or more merchants using an appointment service available via the service provider.

5. The system of claim 1, wherein determining that the merchant is the candidate for conversion is based at least in part on a characteristic of the merchant, wherein the characteristic comprises at least one of a merchant category code, a geolocation of the merchant, a transaction history, an appointment history, or a sales trend.

6. The system of claim 1, wherein the first type of appointment is in-person, the second type of appointment is virtual, and wherein the indication that the appointment has been converted includes a uniform resource locator (URL) for accessing a media platform.

7. A method comprising:

receiving, by a server computing device associated with a service provider, interaction data indicative of one or more interactions between one or more merchants and the service provider via a network, wherein the interaction data comprises transaction data;

processing, by the server computing device, and based at least in part on the transaction data, payments for one or more transactions associated with the transaction data;

accessing, by the server computing device and from a data store associated with the service provider, inventory data of a merchant of the one or more merchants;

determining, by the server computing device and based at least in part on the interaction data and the inventory data, that the merchant is a candidate for conversion between different types of appointments, wherein the different types of appointments comprise in-person and virtual;

identifying, by the server computing device, one or more appointments associated with the merchant;

determining, by the server computing device, that an appointment of the one or more appointments is a first type of appointment, wherein the first type is one of in-person or virtual;

causing, by the server computing device, presentation of a user interface on a customer device operable by a customer associated with the appointment, wherein the user interface includes a toggle switch, and wherein user input to the toggle switch comprises a request to convert the appointment from the first type of appointment to a second type of appointment, wherein the second type is a different one of in-person or virtual than the first type; and based at least in part on receiving an indication of the user input to the toggle switch, converting, by the server computing device, the appointment to the second type of appointment.

8. The method of claim 7, wherein the first type of appointment is in-person, the second type of appointment is virtual, and wherein the indication that the appointment has been converted includes a uniform resource locator (URL) for accessing a media platform.

9. The method of claim 7, wherein determining that the merchant is the candidate for conversion is based at least in part on one or more predefined conditions, wherein the one or more predefined conditions comprise availability of the one or more appointments, time of day, customer preference, or merchant preference.

10. The method of claim 7, wherein the interaction data further comprises appointment data associated with a plurality of appointments scheduled with the one or more merchants using an appointment service available via the service provider.

11. The method of claim 7, wherein determining that the merchant is the candidate for conversion is based at least in part on a characteristic of the merchant, wherein the characteristic comprises at least one of a merchant category code, a geolocation of the merchant, a transaction history, an appointment history, or a sales trend.

12. One or more non-transitory computer-readable media storing instructions that, when executed by one or more processors, cause the one or more processors to perform operations comprising:

receiving, by a server computing device associated with a service provider, interaction data indicative of one or more interactions between one or more merchants and the service provider via a network, wherein the interaction data comprises transaction data;

processing, by the server computing device, and based at least in part on the transaction data, payments for one or more transactions associated with the transaction data;

accessing, by the server computing device and from a data store associated with the service provider, inventory data of a merchant of the one or more merchants;

determining, by the server computing device and based at least in part on the interaction data and the inventory data, that the merchant is a candidate for conversion between different types of appointments, wherein the different types of appointments comprise in-person and virtual;

identifying, by the server computing device, one or more appointments associated with the merchant;

determining, by the server computing device, that an appointment of the one or more appointments is a first type of appointment, wherein the first type is one of in-person or virtual;

causing, by the server computing device, presentation of a user interface on a customer device operable by a customer associated with the appointment, wherein the user interface includes a toggle switch, and wherein user input to the toggle switch comprises a request to convert the appointment from the first type of appointment to a second type of appointment, wherein the second type is a different one of in-person or virtual than the first type; and based at least in part on receiving an indication of the user input to the toggle switch, converting, by the server computing device, the appointment to the second type of appointment.

13. The one or more non-transitory computer-readable media of claim 12, wherein determining that the merchant is the candidate for conversion is based at least in part on one or more predefined conditions, wherein the one or more predefined conditions comprise availability of the one or more appointments, time of day, customer preference, or merchant preference.

14. The one or more non-transitory computer-readable media of claim 12, wherein the first type of appointment is in-person, the second type of appointment is virtual, and wherein the indication that the appointment has been converted includes a uniform resource locator (URL) for accessing a media platform.

15. The one or more non-transitory computer-readable media of claim 12, wherein the interaction data further comprises appointment data associated with a plurality of appointments scheduled with the one or more merchants using an appointment service available via the service provider.

16. The one or more non-transitory computer-readable media of claim 15, the operations further comprising:

causing, by the server computing device, a modification of an electronic calendar of the merchant, wherein the modification reflects conversion of the appointment.

17. The one or more non-transitory computer-readable media of claim 12, wherein the toggle switch is a first toggle switch, and the operations further comprising causing, by the server computing device, presentation of a second toggle switch on the customer device actuatable to change the type of the appointment on an electronic calendar of the customer.

18. The one or more non-transitory computer-readable media of claim 12, wherein the user interface comprises at least one of an in-app notification, an email, a social media notification, or a text message.

19. The one or more non-transitory computer-readable media of claim 12, the operations further comprising:

processing, by the server computing device, payment for the appointment.

20. The one or more non-transitory computer-readable media of claim 12, wherein determining, based at least in part on the interaction data and the inventory data, that the merchant is the candidate for conversion comprises inputting the interaction data and inventory data into a machine-trained model, the operations further comprising:

retraining, by the server computing device, the machine-trained model using data associated with converting the appointment to the second type of appointment.

\* \* \* \* \*